(12) United States Patent
Flury et al.

(10) Patent No.: US 8,702,485 B2
(45) Date of Patent: Apr. 22, 2014

(54) DANCE GAME AND TUTORIAL

(75) Inventors: Marc A. Flury, Cambridge, MA (US);
Kasson D. Crooker, Arlington, MA (US); Matthew C. Boch, Somerville, MA (US); Eran B. Egozy, Brookline, MA (US); Dean N. Tate, Cambridge, MA (US); Seth Goldstein, Exeter, NH (US); Isaac Adams, Revere, MA (US); Adam Carriuolo, Rehoboth, MA (US)

(73) Assignee: Harmonix Music Systems, Inc., Cambridge, MA (US)

( * ) Notice: Subject to any disclaimer, the term of this patent is extended or adjusted under 35 U.S.C. 154(b) by 2 days.

(21) Appl. No.: 12/940,794

(22) Filed: Nov. 5, 2010

(65) Prior Publication Data
US 2011/0306396 A1    Dec. 15, 2011

Related U.S. Application Data

(60) Provisional application No. 61/354,073, filed on Jun. 11, 2010.

(51) Int. Cl.
*G06F 9/24*    (2006.01)

(52) U.S. Cl.
USPC ...................................... 463/7; 463/8; 463/34

(58) Field of Classification Search
USPC .................................. 463/7, 8, 34
See application file for complete search history.

(56) References Cited

U.S. PATENT DOCUMENTS

| D211,666 S | 7/1968 | MacGillavry |
| 3,430,530 A | 3/1969 | Fletcher |
| 3,897,711 A | 8/1975 | Elledge |
| D245,038 S | 7/1977 | Ebata et al. |
| D247,795 S | 4/1978 | Darrell |
| 4,128,037 A | 12/1978 | Montemurro |
| D259,785 S | 7/1981 | Kushida et al. |
| 4,295,406 A | 10/1981 | Smith |
| D262,017 S | 11/1981 | Frakes, Jr. |
| D265,821 S | 8/1982 | Okada et al. |
| D266,664 S | 10/1982 | Hoshino et al. |

(Continued)

FOREIGN PATENT DOCUMENTS

| AT | 468071 T | 6/2010 |
| AU | 741239 B2 | 4/1999 |

(Continued)

OTHER PUBLICATIONS

[VIDEO] "E3 2010 Live Demo", where Ubi talked about MJ:TE for Kinect (<http://www.gametrailers.com/video/e3-2010-michael-jackson/101449>).

(Continued)

*Primary Examiner* — Pierre E Elisca
(74) *Attorney, Agent, or Firm* — Wilmer Cutler Pickering Hale and Dorr LLP

(57) ABSTRACT

Presented herein are methods, apparatuses, programs, and systems for scoring a player performance comprising one or more poses in a dance-based video game. a performance 3D skeleton is received that indicates a pose of the player. A score is calculated by comparing a position, a timing, or both, associated with one or more joints of the performance 3D skeleton to a position, a timing, or both, associated with one or more joints of a target pose and altering one or more characteristics of the dance-based video game based on the score.

52 Claims, 9 Drawing Sheets

(56) References Cited

U.S. PATENT DOCUMENTS

| | | |
|---|---|---|
| D287,521 S | 12/1986 | Obara |
| 4,644,495 A | 2/1987 | Crane |
| 4,766,541 A | 8/1988 | Bleich et al. |
| 4,783,812 A | 11/1988 | Kaneoka |
| 4,794,838 A | 1/1989 | Corrigau, III |
| 4,843,568 A | 6/1989 | Krueger et al. |
| 4,890,833 A | 1/1990 | Lantz et al. |
| D310,668 S | 9/1990 | Takada |
| 5,074,182 A | 12/1991 | Capps et al. |
| 5,107,443 A | 4/1992 | Smith et al. |
| 5,107,743 A | 4/1992 | Decker |
| 5,109,482 A | 4/1992 | Bohrman |
| 5,140,889 A | 8/1992 | Segan et al. |
| 5,194,683 A | 3/1993 | Tsumura et al. |
| 5,208,413 A | 5/1993 | Tsumura et al. |
| 5,250,745 A | 10/1993 | Tsumura |
| 5,262,765 A | 11/1993 | Tsumura et al. |
| 5,287,789 A | 2/1994 | Zimmerman |
| D345,554 S | 3/1994 | Dones |
| 5,362,049 A | 11/1994 | Hofer |
| 5,368,309 A | 11/1994 | Monroe et al. |
| 5,393,926 A | 2/1995 | Johnson |
| 5,395,123 A | 3/1995 | Kondo |
| 5,398,585 A | 3/1995 | Starr |
| 5,399,799 A | 3/1995 | Gabriel |
| 5,434,949 A | 7/1995 | Jeong |
| 5,453,570 A | 9/1995 | Umeda et al. |
| 5,464,946 A | 11/1995 | Lewis |
| 5,471,576 A | 11/1995 | Yee |
| 5,482,087 A | 1/1996 | Overbergh et al. |
| 5,488,196 A | 1/1996 | Zimmerman et al. |
| 5,491,297 A | 2/1996 | Johnson et al. |
| 5,510,573 A | 4/1996 | Cho et al. |
| 5,513,129 A | 4/1996 | Bolas et al. |
| 5,524,637 A | 6/1996 | Erickson |
| 5,534,917 A | 7/1996 | MacDougall |
| 5,537,528 A | 7/1996 | Takahashi et al. |
| 5,553,864 A | 9/1996 | Sitrick |
| 5,557,056 A | 9/1996 | Hong et al. |
| 5,557,057 A | 9/1996 | Starr |
| 5,563,358 A | 10/1996 | Zimmerman |
| 5,565,639 A | 10/1996 | Bae |
| 5,567,162 A | 10/1996 | Park |
| 5,568,275 A | 10/1996 | Norton et al. |
| 5,574,238 A | 11/1996 | Mencher |
| 5,588,096 A | 12/1996 | Sato et al. |
| 5,613,909 A | 3/1997 | Stelovsky |
| 5,616,078 A | 4/1997 | Oh |
| 5,627,335 A | 5/1997 | Rigopulos et al. |
| 5,631,433 A | 5/1997 | Iida et al. |
| 5,634,849 A | 6/1997 | Abecassis |
| 5,663,517 A | 9/1997 | Oppenheim |
| 5,670,729 A | 9/1997 | Miller et al. |
| 5,681,223 A | 10/1997 | Weinreich |
| 5,689,618 A | 11/1997 | Gasper et al. |
| 5,693,903 A | 12/1997 | Heidorn et al. |
| 5,701,511 A | 12/1997 | Smith |
| D389,216 S | 1/1998 | Isetani et al. |
| 5,704,836 A | 1/1998 | Norton et al. |
| 5,711,715 A | 1/1998 | Ringo et al. |
| 5,715,179 A | 2/1998 | Park |
| 5,719,344 A | 2/1998 | Pawate |
| 5,723,802 A | 3/1998 | Johnson et al. |
| 5,734,961 A | 3/1998 | Castille |
| 5,739,457 A | 4/1998 | Devecka |
| 5,763,804 A | 6/1998 | Rigopulos et al. |
| 5,768,396 A | 6/1998 | Sone |
| 5,777,251 A | 7/1998 | Hotta et al. |
| 5,782,692 A | 7/1998 | Stelovsky |
| D398,916 S | 9/1998 | Bernardi |
| 5,804,752 A | 9/1998 | Sone et al. |
| D399,887 S | 10/1998 | Schultz et al. |
| D400,196 S | 10/1998 | Cameron et al. |
| 5,824,933 A | 10/1998 | Gabriel |
| 5,825,427 A | 10/1998 | MacLeod |
| 5,830,065 A | 11/1998 | Sitrick |
| 5,833,469 A | 11/1998 | Ito et al. |
| D403,024 S | 12/1998 | Muraki et al. |
| 5,861,881 A | 1/1999 | Freeman et al. |
| 5,874,686 A | 2/1999 | Ghias et al. |
| 5,880,788 A | 3/1999 | Bregler |
| 5,886,275 A | 3/1999 | Kato et al. |
| 5,889,224 A | 3/1999 | Tanaka |
| 5,906,494 A | 5/1999 | Ogawa et al. |
| D411,258 S | 6/1999 | Isetani et al. |
| 5,913,727 A | 6/1999 | Ahdoot |
| 5,915,288 A | 6/1999 | Gabriel |
| 5,915,972 A | 6/1999 | Tada |
| 5,915,975 A | 6/1999 | McGrath |
| 5,925,843 A | 7/1999 | Miller et al. |
| 5,953,005 A | 9/1999 | Liu |
| 5,953,485 A | 9/1999 | Abecassis |
| 5,969,716 A | 10/1999 | Davis et al. |
| 5,983,280 A | 11/1999 | Hunt |
| 5,990,405 A | 11/1999 | Auten et al. |
| 5,999,173 A | 12/1999 | Ubillos |
| 6,001,013 A | 12/1999 | Ota |
| 6,009,457 A | 12/1999 | Moller |
| 6,011,212 A | 1/2000 | Rigopulos et al. |
| 6,016,380 A | 1/2000 | Norton |
| 6,018,121 A | 1/2000 | Devecka |
| 6,032,156 A | 2/2000 | Marcus |
| 6,065,042 A | 5/2000 | Reimer et al. |
| 6,066,792 A | 5/2000 | Sone |
| 6,067,126 A | 5/2000 | Alexander |
| 6,067,566 A | 5/2000 | Moline |
| 6,072,113 A | 6/2000 | Tohgi et al. |
| 6,072,480 A | 6/2000 | Gorbet et al. |
| 6,073,489 A | 6/2000 | French et al. |
| 6,074,215 A | 6/2000 | Tsurumi |
| 6,075,197 A | 6/2000 | Chan |
| 6,077,162 A | 6/2000 | Weiss |
| 6,083,009 A | 7/2000 | Kim et al. |
| 6,091,408 A | 7/2000 | Treibitz et al. |
| 6,098,458 A | 8/2000 | French et al. |
| 6,118,444 A | 9/2000 | Garmon et al. |
| 6,121,531 A | 9/2000 | Kato |
| 6,142,870 A | 11/2000 | Wada et al. |
| 6,150,947 A | 11/2000 | Shima |
| 6,162,981 A | 12/2000 | Newcomer et al. |
| 6,166,314 A | 12/2000 | Weinstock et al. |
| 6,177,623 B1 | 1/2001 | Ooseki |
| 6,182,044 B1 | 1/2001 | Fong et al. |
| 6,184,899 B1 | 2/2001 | Akemann |
| 6,191,350 B1 | 2/2001 | Okulov et al. |
| 6,191,773 B1 | 2/2001 | Maruno et al. |
| 6,206,782 B1 | 3/2001 | Walker et al. |
| 6,215,411 B1 | 4/2001 | Gothard |
| 6,224,486 B1 | 5/2001 | Walker et al. |
| 6,225,547 B1 | 5/2001 | Toyama et al. |
| 6,227,968 B1 | 5/2001 | Suzuki et al. |
| 6,227,974 B1 | 5/2001 | Eilat et al. |
| 6,243,087 B1 | 6/2001 | Davis et al. |
| 6,243,092 B1 | 6/2001 | Okita et al. |
| 6,252,153 B1 | 6/2001 | Toyama |
| 6,262,724 B1 | 7/2001 | Crow et al. |
| 6,263,392 B1 | 7/2001 | McCauley |
| 6,268,557 B1 | 7/2001 | Devecka |
| 6,283,860 B1 | 9/2001 | Lyons et al. |
| 6,287,198 B1 | 9/2001 | McCauley |
| 6,288,727 B1 | 9/2001 | Akemann |
| 6,292,620 B1 | 9/2001 | Ohmori et al. |
| 6,307,576 B1 | 10/2001 | Rosenfeld |
| 6,308,565 B1 | 10/2001 | French et al. |
| 6,309,301 B1 | 10/2001 | Sano |
| 6,319,129 B1 | 11/2001 | Igarashi et al. |
| 6,319,130 B1 | 11/2001 | Ooseki et al. |
| 6,320,110 B1 | 11/2001 | Ishikawa et al. |
| 6,326,536 B1 | 12/2001 | Wang |
| 6,329,620 B1 | 12/2001 | Oishi et al. |
| 6,337,433 B1 | 1/2002 | Nishimoto |
| 6,342,665 B1 | 1/2002 | Okita et al. |
| 6,347,998 B1 | 2/2002 | Yoshitomi et al. |
| 6,350,942 B1 | 2/2002 | Thomson |

(56) References Cited

U.S. PATENT DOCUMENTS

| | | |
|---|---|---|
| 6,352,432 B1 | 3/2002 | Tsai et al. |
| 6,353,174 B1 | 3/2002 | Schmidt et al. |
| D455,792 S | 4/2002 | Isetani et al. |
| 6,369,313 B2 | 4/2002 | Devecka |
| 6,379,244 B1 | 4/2002 | Sagawa et al. |
| 6,380,474 B2 | 4/2002 | Taruguchi et al. |
| 6,380,950 B1 | 4/2002 | Montgomery et al. |
| 6,384,736 B1 | 5/2002 | Gothard |
| 6,390,923 B1 | 5/2002 | Yoshitomi et al. |
| 6,392,133 B1 | 5/2002 | Georges |
| 6,407,324 B1 | 6/2002 | Hulcher |
| 6,410,835 B2 | 6/2002 | Suzuki et al. |
| 6,417,432 B1 | 7/2002 | Downing |
| 6,425,822 B1 | 7/2002 | Hayashida et al. |
| 6,425,825 B1 | 7/2002 | Sitrick |
| 6,425,827 B1 | 7/2002 | Nimura |
| 6,425,828 B2 | 7/2002 | Walker et al. |
| 6,429,863 B1 | 8/2002 | LoPiccolo et al. |
| 6,430,997 B1 | 8/2002 | French et al. |
| 6,437,227 B1 | 8/2002 | Theimer |
| 6,438,611 B1 | 8/2002 | Hara et al. |
| D462,698 S | 9/2002 | Sturm |
| 6,444,887 B1 | 9/2002 | Hiraoka et al. |
| 6,450,886 B1 | 9/2002 | Oishi et al. |
| 6,450,888 B1 | 9/2002 | Takase et al. |
| 6,461,239 B1 | 10/2002 | Sagawa et al. |
| 6,463,205 B1 | 10/2002 | Aschbrenner et al. |
| 6,464,585 B1 | 10/2002 | Miyamoto et al. |
| 6,468,161 B1 | 10/2002 | Shimomura |
| 6,471,584 B1 | 10/2002 | Wada et al. |
| 6,482,087 B1 | 11/2002 | Egozy et al. |
| 6,483,018 B2 | 11/2002 | Mead |
| 6,504,089 B1 | 1/2003 | Negishi et al. |
| 6,504,990 B1 | 1/2003 | Abecassis |
| 6,506,969 B1 | 1/2003 | Baron |
| 6,514,083 B1 | 2/2003 | Kumar et al. |
| 6,527,639 B2 | 3/2003 | Suzuki |
| 6,530,834 B2 | 3/2003 | Kondo |
| 6,530,839 B2 | 3/2003 | Horio |
| 6,535,269 B2 | 3/2003 | Sherman et al. |
| 6,540,613 B2 | 4/2003 | Okubo et al. |
| 6,541,692 B2 | 4/2003 | Miller |
| 6,542,155 B1 | 4/2003 | Mifune et al. |
| 6,542,168 B2 | 4/2003 | Negishi et al. |
| 6,544,119 B2 | 4/2003 | Kubo et al. |
| 6,544,122 B2 | 4/2003 | Araki et al. |
| 6,544,125 B2 | 4/2003 | Horigami et al. |
| 6,554,706 B2 | 4/2003 | Kim et al. |
| 6,554,711 B1 | 4/2003 | Kawasaki et al. |
| 6,555,737 B2 | 4/2003 | Miyaki et al. |
| 6,570,078 B2 | 5/2003 | Ludwig |
| 6,577,330 B1 | 6/2003 | Tsuda et al. |
| 6,582,235 B1 | 6/2003 | Tsai et al. |
| 6,582,309 B2 | 6/2003 | Higurashi et al. |
| 6,589,120 B1 | 7/2003 | Takahashi |
| 6,597,861 B1 | 7/2003 | Tozaki et al. |
| 6,598,074 B1 | 7/2003 | Moller et al. |
| 6,599,195 B1 | 7/2003 | Araki et al. |
| 6,607,446 B1 | 8/2003 | Shimomura et al. |
| 6,608,249 B2 | 8/2003 | Georges |
| 6,609,979 B1 | 8/2003 | Wada |
| 6,611,278 B2 | 8/2003 | Rosenfeld |
| 6,612,931 B2 | 9/2003 | Kojima et al. |
| 6,613,100 B2 | 9/2003 | Miller |
| 6,618,053 B1 | 9/2003 | Tanner |
| 6,621,503 B1 | 9/2003 | Ubillos |
| 6,623,358 B2 | 9/2003 | Harima |
| 6,625,388 B2 | 9/2003 | Winter et al. |
| 6,629,892 B2 | 10/2003 | Oe et al. |
| 6,634,886 B2 | 10/2003 | Oyama et al. |
| 6,636,238 B1 | 10/2003 | Amir et al. |
| 6,636,877 B1 | 10/2003 | Doleac et al. |
| 6,638,160 B2 | 10/2003 | Yoshitomi |
| 6,645,067 B1 | 11/2003 | Okita et al. |
| 6,645,076 B1 | 11/2003 | Sugai |
| 6,645,784 B2 | 11/2003 | Tayebati et al. |
| 6,653,545 B2 | 11/2003 | Redmann et al. |
| 6,654,863 B2 | 11/2003 | Nishio |
| 6,659,873 B1 | 12/2003 | Kitano et al. |
| 6,661,496 B2 | 12/2003 | Sherman et al. |
| 6,663,491 B2 | 12/2003 | Watabe et al. |
| 6,666,764 B1 | 12/2003 | Kudo |
| 6,669,563 B1 | 12/2003 | Kitami et al. |
| 6,676,523 B1 | 1/2004 | Kasai et al. |
| 6,682,424 B2 | 1/2004 | Yamauchi et al. |
| 6,684,480 B2 | 2/2004 | Conrad |
| 6,685,480 B2 | 2/2004 | Nishimoto et al. |
| 6,695,694 B2 | 2/2004 | Ishikawa et al. |
| 6,712,692 B2 | 3/2004 | Basson et al. |
| 6,725,108 B1 | 4/2004 | Hall |
| 6,727,889 B2 | 4/2004 | Shaw |
| 6,733,382 B2 | 5/2004 | Oe et al. |
| 6,738,052 B1 | 5/2004 | Manke et al. |
| 6,740,802 B1 | 5/2004 | Browne, Jr. |
| 6,740,803 B2 | 5/2004 | Brinkman et al. |
| 6,743,099 B2 | 6/2004 | Yabe et al. |
| 6,749,432 B2 | 6/2004 | French et al. |
| 6,749,508 B2 | 6/2004 | Kohira et al. |
| 6,750,848 B1 | 6/2004 | Pryor |
| 6,758,753 B1 | 7/2004 | Nagata et al. |
| 6,758,756 B1 | 7/2004 | Horigami et al. |
| 6,764,399 B2 | 7/2004 | Nagata et al. |
| 6,765,590 B1 | 7/2004 | Watahiki et al. |
| 6,765,726 B2 | 7/2004 | French et al. |
| 6,767,282 B2 | 7/2004 | Matsuyama et al. |
| 6,769,689 B1 | 8/2004 | Shimomura et al. |
| 6,786,821 B2 | 9/2004 | Nobe et al. |
| 6,788,880 B1 | 9/2004 | Fuchigami et al. |
| 6,801,930 B1 | 10/2004 | Dionne et al. |
| 6,802,019 B1 | 10/2004 | Lauder |
| 6,811,491 B1 | 11/2004 | Levenberg et al. |
| 6,821,203 B2 | 11/2004 | Suga et al. |
| 6,831,220 B2 | 12/2004 | Varme |
| 6,831,656 B2 | 12/2004 | Kitao |
| 6,835,136 B2 | 12/2004 | Kitao |
| 6,835,887 B2 | 12/2004 | Devecka |
| 6,838,608 B2 | 1/2005 | Koike |
| 6,843,726 B1 | 1/2005 | Nomi et al. |
| 6,850,252 B1 | 2/2005 | Hoffberg |
| 6,852,034 B2 | 2/2005 | Nagata et al. |
| 6,856,923 B2 | 2/2005 | Jung |
| 6,857,960 B2 | 2/2005 | Okubo et al. |
| D503,407 S | 3/2005 | Kaku |
| 6,860,810 B2 | 3/2005 | Cannon et al. |
| 6,876,496 B2 | 4/2005 | French et al. |
| 6,881,148 B2 | 4/2005 | Yotsugi et al. |
| 6,881,887 B2 | 4/2005 | Berens |
| 6,890,262 B2 | 5/2005 | Oishi et al. |
| 6,893,343 B2 | 5/2005 | Suda et al. |
| 6,894,693 B1 | 5/2005 | Nash |
| 6,898,637 B2 | 5/2005 | Curtin |
| 6,905,413 B1 | 6/2005 | Terao et al. |
| 6,909,420 B1 | 6/2005 | Nicolas et al. |
| 6,915,488 B2 | 7/2005 | Omori et al. |
| 6,921,332 B2 | 7/2005 | Fukunaga et al. |
| 6,924,425 B2 | 8/2005 | Naples et al. |
| 6,930,235 B2 | 8/2005 | Sandborn et al. |
| 6,930,236 B2 | 8/2005 | Jung |
| 6,949,023 B1 | 9/2005 | Okubo et al. |
| 6,953,887 B2 | 10/2005 | Nagashima et al. |
| 6,964,610 B2 | 11/2005 | Yamauchi et al. |
| 6,967,275 B2 | 11/2005 | Ozick |
| 6,976,918 B2 | 12/2005 | Hosokawa |
| 6,991,542 B2 | 1/2006 | Asami et al. |
| 6,995,765 B2 | 2/2006 | Boudier |
| 6,995,869 B2 | 2/2006 | Onodera |
| 6,998,527 B2 | 2/2006 | Agnihotri |
| 7,000,200 B1 | 2/2006 | Martins |
| 7,001,272 B2 | 2/2006 | Yamashita et al. |
| 7,010,291 B2 | 3/2006 | Iwanaga |
| D519,569 S | 4/2006 | Kiyono et al. |
| 7,022,905 B1 | 4/2006 | Hinman et al. |
| 7,027,046 B2 | 4/2006 | Zhang |
| 7,027,124 B2 | 4/2006 | Foote et al. |

(56) References Cited

U.S. PATENT DOCUMENTS

| | | | |
|---|---|---|---|
| 7,030,307 | B2 | 4/2006 | Wedel |
| 7,030,311 | B2 | 4/2006 | Brinkman et al. |
| 7,037,197 | B2 | 5/2006 | Watanabe |
| 7,038,855 | B2 | 5/2006 | French et al. |
| 7,044,856 | B2 | 5/2006 | Suzuki |
| 7,044,857 | B1 | 5/2006 | Klitsner et al. |
| 7,064,672 | B2 | 6/2006 | Gothard |
| 7,066,818 | B2 | 6/2006 | Ikeda |
| 7,069,296 | B2 | 6/2006 | Moller et al. |
| 7,070,500 | B1 | 7/2006 | Nomi et al. |
| 7,071,914 | B1 | 7/2006 | Marks |
| 7,074,999 | B2 | 7/2006 | Sitrick et al. |
| 7,076,052 | B2 | 7/2006 | Yoshimura |
| 7,079,026 | B2 | 7/2006 | Smith |
| 7,079,114 | B1 | 7/2006 | Smith et al. |
| 7,084,855 | B2 | 8/2006 | Kaku et al. |
| 7,084,888 | B2 | 8/2006 | Takahama et al. |
| 7,098,392 | B2 | 8/2006 | Sitrick et al. |
| 7,098,921 | B2 | 8/2006 | Nash et al. |
| 7,103,873 | B2 | 9/2006 | Tanner et al. |
| 7,119,268 | B2 | 10/2006 | Futamase et al. |
| 7,122,751 | B1 | 10/2006 | Anderson et al. |
| 7,123,272 | B2 | 10/2006 | Moriyama |
| 7,126,607 | B2 | 10/2006 | Emerson |
| 7,128,649 | B2 | 10/2006 | Nobe et al. |
| 7,129,408 | B2 | 10/2006 | Uehara |
| 7,134,876 | B2 | 11/2006 | Hou |
| 7,142,807 | B2 | 11/2006 | Lee |
| 7,143,353 | B2 | 11/2006 | McGee et al. |
| 7,145,070 | B2 | 12/2006 | Barry |
| D535,659 | S | 1/2007 | Hally et al. |
| 7,164,075 | B2 | 1/2007 | Tada |
| 7,164,076 | B2 | 1/2007 | McHale et al. |
| 7,169,998 | B2 | 1/2007 | Kondo et al. |
| 7,170,510 | B2 | 1/2007 | Kawahara et al. |
| 7,174,510 | B2 | 2/2007 | Salter |
| 7,181,636 | B2 | 2/2007 | Kim et al. |
| 7,189,912 | B2 | 3/2007 | Jung |
| 7,192,353 | B2 | 3/2007 | Okubo |
| 7,194,676 | B2 | 3/2007 | Fayan et al. |
| 7,199,298 | B2 | 4/2007 | Funaki |
| 7,199,801 | B2 | 4/2007 | Tsunashima et al. |
| 7,201,659 | B2 | 4/2007 | Nakayama et al. |
| 7,221,852 | B2 | 5/2007 | Iizuka et al. |
| 7,223,913 | B2 | 5/2007 | Knapp et al. |
| 7,227,526 | B2 | 6/2007 | Hildreth et al. |
| 7,259,357 | B2 | 8/2007 | Walker |
| 7,259,971 | B1 | 8/2007 | Allen et al. |
| 7,263,668 | B1 | 8/2007 | Lentz |
| 7,271,329 | B2 | 9/2007 | Franzblau |
| 7,272,780 | B2 | 9/2007 | Abbott et al. |
| 7,274,803 | B1 | 9/2007 | Sharma et al. |
| 7,304,232 | B1 | 12/2007 | Nicholes |
| 7,317,812 | B1 | 1/2008 | Krahnstoever et al. |
| 7,320,643 | B1 | 1/2008 | Brosius et al. |
| 7,323,631 | B2 | 1/2008 | Miyaki et al. |
| 7,324,165 | B2 | 1/2008 | Shan et al. |
| 7,336,890 | B2 | 2/2008 | Lu et al. |
| 7,346,472 | B1 | 3/2008 | Moskowitz et al. |
| 7,352,359 | B2 | 4/2008 | Zalewski et al. |
| 7,352,952 | B2 | 4/2008 | Herberger et al. |
| 7,359,121 | B2 | 4/2008 | French et al. |
| 7,359,617 | B2 | 4/2008 | Ma |
| D568,659 | S | 5/2008 | Ophardt et al. |
| D568,892 | S | 5/2008 | Stabb et al. |
| D569,382 | S | 5/2008 | Yow et al. |
| 7,367,887 | B2 | 5/2008 | Watabe et al. |
| 7,383,508 | B2 | 6/2008 | Toyama et al. |
| 7,386,782 | B2 | 6/2008 | Comps et al. |
| 7,391,409 | B2 | 6/2008 | Zalewski et al. |
| 7,391,874 | B1 | 6/2008 | Semmes, Jr. et al. |
| D572,265 | S | 7/2008 | Guimaraes et al. |
| 7,398,002 | B2 | 7/2008 | Hsiao et al. |
| 7,408,106 | B2 | 8/2008 | Weiner et al. |
| 7,423,213 | B2 | 9/2008 | Sitrick |
| 7,430,360 | B2 | 9/2008 | Abecassis |
| 7,432,810 | B2 | 10/2008 | Menache et al. |
| 7,435,178 | B1 | 10/2008 | Tam et al. |
| 7,453,035 | B1 | 11/2008 | Evans et al. |
| 7,458,025 | B2 | 11/2008 | Crow et al. |
| 7,459,324 | B1 | 12/2008 | Ptasinski et al. |
| 7,459,624 | B2 | 12/2008 | Schmidt et al. |
| 7,462,772 | B2 | 12/2008 | Salter |
| 7,480,446 | B2 | 1/2009 | Bhadkamkar et al. |
| 7,480,873 | B2 | 1/2009 | Kawahara |
| 7,488,886 | B2 | 2/2009 | Kemp |
| D590,407 | S | 4/2009 | Watanabe et al. |
| 7,521,619 | B2 | 4/2009 | Salter |
| 7,528,315 | B2 | 5/2009 | Goodwin |
| 7,536,654 | B2 | 5/2009 | Anthony et al. |
| 7,546,130 | B2 | 6/2009 | Vance |
| 7,559,834 | B1 | 7/2009 | York |
| 7,559,841 | B2 | 7/2009 | Hashimoto |
| 7,579,543 | B2 | 8/2009 | Haruyama et al. |
| D599,812 | S | 9/2009 | Hirsch |
| D599,819 | S | 9/2009 | Lew |
| 7,582,015 | B2 | 9/2009 | Onoda et al. |
| 7,589,727 | B2 | 9/2009 | Haeker |
| 7,593,618 | B2 | 9/2009 | Xu et al. |
| 7,599,554 | B2 | 10/2009 | Agnihotri et al. |
| 7,605,322 | B2 | 10/2009 | Nakamura |
| 7,612,278 | B2 | 11/2009 | Sitrick et al. |
| 7,625,284 | B2 | 12/2009 | Kay et al. |
| 7,628,699 | B2 | 12/2009 | Onoda et al. |
| 7,640,069 | B1 | 12/2009 | Johnston |
| D607,892 | S | 1/2010 | Murchie et al. |
| 7,649,134 | B2 | 1/2010 | Kashioka |
| D609,715 | S | 2/2010 | Chaudhri |
| 7,660,510 | B2 | 2/2010 | Kawahara et al. |
| 7,660,700 | B2 | 2/2010 | Moskowitz et al. |
| 7,690,017 | B2 | 3/2010 | Stecyk et al. |
| 7,692,630 | B2 | 4/2010 | Natsume et al. |
| 7,714,849 | B2 | 5/2010 | Pryor |
| 7,716,572 | B2 | 5/2010 | Beauregard et al. |
| 7,722,450 | B2 | 5/2010 | Onoda et al. |
| 7,747,348 | B2 | 6/2010 | Shim et al. |
| D619,598 | S | 7/2010 | Maitlen et al. |
| D619,609 | S | 7/2010 | Meziere |
| 7,754,961 | B1 | 7/2010 | Yang et al. |
| 7,758,427 | B2 | 7/2010 | Egozy |
| 7,760,908 | B2 | 7/2010 | Curtner et al. |
| 7,772,480 | B2 | 8/2010 | Brennan |
| 7,774,706 | B2 | 8/2010 | Sakai |
| 7,789,741 | B1 | 9/2010 | Fields et al. |
| 7,791,808 | B2 | 9/2010 | French et al. |
| 7,797,641 | B2 | 9/2010 | Karukka et al. |
| D624,932 | S | 10/2010 | Chaudhri |
| 7,806,759 | B2 | 10/2010 | McHale et al. |
| 7,806,764 | B2 | 10/2010 | Brosnan et al. |
| 7,814,436 | B2 | 10/2010 | Schrag et al. |
| 7,823,070 | B2 | 10/2010 | Nelson et al. |
| 7,829,777 | B2 | 11/2010 | Kyuma et al. |
| 7,838,755 | B2 | 11/2010 | Taub et al. |
| 7,840,907 | B2 | 11/2010 | Kikuchi et al. |
| D628,582 | S | 12/2010 | Kurozumi et al. |
| 7,853,896 | B2 | 12/2010 | Ok et al. |
| 7,853,897 | B2 | 12/2010 | Ogawa et al. |
| 7,865,834 | B1 | 1/2011 | van Os et al. |
| 7,877,690 | B2 | 1/2011 | Margulis |
| 7,881,702 | B2 | 2/2011 | Heyworth et al. |
| 7,890,867 | B1 | 2/2011 | Margulis |
| 7,893,337 | B2 | 2/2011 | Lenz |
| 7,895,617 | B2 | 2/2011 | Pedlow, Jr. |
| 7,899,389 | B2 | 3/2011 | Mangum |
| 7,904,814 | B2 | 3/2011 | Errico et al. |
| 7,917,644 | B2 | 3/2011 | Vedantham et al. |
| 7,920,931 | B2 | 4/2011 | Van de Sluis et al. |
| 7,923,620 | B2 | 4/2011 | Foster |
| 7,928,307 | B2 | 4/2011 | Hetherington et al. |
| 7,935,880 | B2 | 5/2011 | Stoddard et al. |
| 7,949,494 | B2 | 5/2011 | Moskowitz et al. |
| 7,973,230 | B2 | 7/2011 | Mahowald |
| 7,979,574 | B2 | 7/2011 | Gillo et al. |
| 7,980,997 | B2 | 7/2011 | Thukral et al. |

(56) References Cited

U.S. PATENT DOCUMENTS

| | | | |
|---|---|---|---|
| 7,982,114 B2 | 7/2011 | Applewhite et al. | |
| 8,003,872 B2 | 8/2011 | Lopiccolo et al. | |
| 8,010,088 B2 | 8/2011 | Cheng | |
| 8,026,435 B2 | 9/2011 | Stoddard et al. | |
| 8,057,290 B2 | 11/2011 | Vance et al. | |
| D650,802 S | 12/2011 | Jang et al. | |
| 8,076,564 B2 | 12/2011 | Applewhite | |
| 8,076,574 B2 | 12/2011 | Irmer et al. | |
| 8,079,901 B2 | 12/2011 | Brosius et al. | |
| 8,079,907 B2 | 12/2011 | Egozy | |
| 8,080,722 B2 | 12/2011 | Applewhite et al. | |
| D651,608 S | 1/2012 | Allen et al. | |
| D651,609 S | 1/2012 | Pearson et al. | |
| 8,176,439 B2 | 5/2012 | Kamen et al. | |
| 8,198,526 B2 | 6/2012 | Izen et al. | |
| 8,202,161 B2 | 6/2012 | Leake et al. | |
| 8,205,172 B2 | 6/2012 | Wong et al. | |
| 8,209,606 B2 | 6/2012 | Ording | |
| 8,214,175 B2 | 7/2012 | Moskowitz et al. | |
| 8,225,227 B2 | 7/2012 | Headrick et al. | |
| 8,230,360 B2 | 7/2012 | Ma et al. | |
| D664,975 S | 8/2012 | Arnold | |
| 8,444,464 B2 * | 5/2013 | Boch et al. | 463/7 |
| 8,449,360 B2 * | 5/2013 | Stoddard et al. | 463/7 |
| 2001/0004861 A1 | 6/2001 | Suzuki et al. | |
| 2001/0007824 A1 | 7/2001 | Fukuda | |
| 2001/0007829 A1 | 7/2001 | Suzuki | |
| 2001/0008844 A1 | 7/2001 | Yamauchi et al. | |
| 2001/0008846 A1 | 7/2001 | Yamauchi et al. | |
| 2001/0012795 A1 | 8/2001 | Asami et al. | |
| 2001/0014440 A1 | 8/2001 | Oyama et al. | |
| 2001/0014620 A1 | 8/2001 | Nobe et al. | |
| 2001/0014621 A1 | 8/2001 | Okubo et al. | |
| 2001/0016510 A1 | 8/2001 | Ishikawa et al. | |
| 2001/0023202 A1 | 9/2001 | Okubo | |
| 2001/0024972 A1 | 9/2001 | Kitao | |
| 2001/0030652 A1 | 10/2001 | Kitao | |
| 2001/0031653 A1 | 10/2001 | Oe et al. | |
| 2001/0033287 A1 | 10/2001 | Naegle et al. | |
| 2001/0035868 A1 | 11/2001 | Uehara et al. | |
| 2001/0036861 A1 | 11/2001 | Uehara et al. | |
| 2001/0037181 A1 | 11/2001 | Matsuura et al. | |
| 2001/0039207 A1 | 11/2001 | Horigami et al. | |
| 2001/0041615 A1 | 11/2001 | Kondo | |
| 2002/0002411 A1 | 1/2002 | Higurashi et al. | |
| 2002/0002900 A1 | 1/2002 | Cho | |
| 2002/0004420 A1 | 1/2002 | Suga et al. | |
| 2002/0005109 A1 | 1/2002 | Miller | |
| 2002/0006819 A1 | 1/2002 | Kubo et al. | |
| 2002/0006823 A1 | 1/2002 | Horio | |
| 2002/0013166 A1 | 1/2002 | Yoshitomi | |
| 2002/0016203 A1 | 2/2002 | Nagata et al. | |
| 2002/0019258 A1 | 2/2002 | Kim et al. | |
| 2002/0022520 A1 | 2/2002 | Oe et al. | |
| 2002/0022522 A1 | 2/2002 | Yamada | |
| 2002/0025841 A1 | 2/2002 | Nobe et al. | |
| 2002/0025842 A1 | 2/2002 | Nobe et al. | |
| 2002/0025853 A1 | 2/2002 | Kojima et al. | |
| 2002/0027899 A1 | 3/2002 | Ikeda | |
| 2002/0032054 A1 | 3/2002 | Hosoya | |
| 2002/0041385 A1 | 4/2002 | Onodera | |
| 2002/0052236 A1 | 5/2002 | Kohira et al. | |
| 2002/0054127 A1 | 5/2002 | Omori et al. | |
| 2002/0055383 A1 | 5/2002 | Onda et al. | |
| 2002/0055386 A1 | 5/2002 | Yotsugi et al. | |
| 2002/0061776 A1 | 5/2002 | Wada et al. | |
| 2002/0065121 A1 | 5/2002 | Fukunaga et al. | |
| 2002/0085833 A1 | 7/2002 | Miyauchi | |
| 2002/0091455 A1 | 7/2002 | Williams | |
| 2002/0091847 A1 | 7/2002 | Curtin | |
| 2002/0094865 A1 | 7/2002 | Araki et al. | |
| 2002/0094866 A1 | 7/2002 | Takeda et al. | |
| 2002/0105229 A1 | 8/2002 | Tanaka | |
| 2002/0119811 A1 | 8/2002 | Yabe et al. | |
| 2002/0128736 A1 | 9/2002 | Yoshida et al. | |
| 2002/0142818 A1 | 10/2002 | Nakatsuka et al. | |
| 2002/0142824 A1 | 10/2002 | Kazaoka et al. | |
| 2002/0142827 A1 | 10/2002 | Aida et al. | |
| 2002/0142834 A1 | 10/2002 | Sobue | |
| 2002/0151337 A1 | 10/2002 | Yamashita et al. | |
| 2002/0160824 A1 | 10/2002 | Goto et al. | |
| 2002/0169014 A1 | 11/2002 | Egozy et al. | |
| 2002/0187835 A1 | 12/2002 | Nakayama et al. | |
| 2002/0198045 A1 | 12/2002 | Okubo | |
| 2003/0000364 A1 | 1/2003 | Deverich | |
| 2003/0003431 A1 | 1/2003 | Maeda | |
| 2003/0003991 A1 | 1/2003 | Kuraishi | |
| 2003/0003992 A1 | 1/2003 | Furuya | |
| 2003/0011620 A1 | 1/2003 | Moriyama | |
| 2003/0014262 A1 | 1/2003 | Kim | |
| 2003/0017872 A1 | 1/2003 | Oishi et al. | |
| 2003/0028598 A1 | 2/2003 | Moller et al. | |
| 2003/0032478 A1 | 2/2003 | Takahama et al. | |
| 2003/0045334 A1 | 3/2003 | Hosokawa | |
| 2003/0069071 A1 | 4/2003 | Britt et al. | |
| 2003/0070159 A1 | 4/2003 | Webb | |
| 2003/0078086 A1 | 4/2003 | Matsuyama et al. | |
| 2003/0078102 A1 | 4/2003 | Okita et al. | |
| 2003/0099461 A1 | 5/2003 | Johnson | |
| 2003/0104868 A1 | 6/2003 | Okita et al. | |
| 2003/0109298 A1 | 6/2003 | Oishi et al. | |
| 2003/0151628 A1 | 8/2003 | Salter | |
| 2003/0164084 A1 | 9/2003 | Redmann et al. | |
| 2003/0195041 A1 | 10/2003 | McCauley | |
| 2003/0199317 A1 | 10/2003 | McCauley | |
| 2003/0214498 A1 | 11/2003 | Gothard | |
| 2003/0218626 A1 | 11/2003 | Greene | |
| 2003/0232644 A1 | 12/2003 | Takahashi et al. | |
| 2003/0232645 A1 | 12/2003 | Suda et al. | |
| 2004/0012540 A1 | 1/2004 | Treibitz et al. | |
| 2004/0021684 A1 | 2/2004 | B. Millner | |
| 2004/0043815 A1 | 3/2004 | Kaminkow | |
| 2004/0054725 A1 | 3/2004 | Moller et al. | |
| 2004/0063479 A1 | 4/2004 | Kimura | |
| 2004/0063480 A1 | 4/2004 | Wang | |
| 2004/0072620 A1 | 4/2004 | Nagata et al. | |
| 2004/0077405 A1 | 4/2004 | Watanabe | |
| 2004/0082380 A1 | 4/2004 | George et al. | |
| 2004/0082386 A1 | 4/2004 | George et al. | |
| 2004/0089139 A1 | 5/2004 | Georges et al. | |
| 2004/0092303 A1 | 5/2004 | George et al. | |
| 2004/0092304 A1 | 5/2004 | George et al. | |
| 2004/0092305 A1 | 5/2004 | George et al. | |
| 2004/0092306 A1 | 5/2004 | George et al. | |
| 2004/0092307 A1 | 5/2004 | George et al. | |
| 2004/0092313 A1 | 5/2004 | Saito et al. | |
| 2004/0092314 A1 | 5/2004 | George et al. | |
| 2004/0093354 A1 | 5/2004 | Xu et al. | |
| 2004/0098582 A1 | 5/2004 | Mori | |
| 2004/0109000 A1 | 6/2004 | Chosokabe | |
| 2004/0113360 A1 | 6/2004 | George et al. | |
| 2004/0116069 A1 | 6/2004 | Fadavi-Ardekani et al. | |
| 2004/0116184 A1 | 6/2004 | George et al. | |
| 2004/0116185 A1 | 6/2004 | George et al. | |
| 2004/0123726 A1 | 7/2004 | Kato et al. | |
| 2004/0127282 A1 | 7/2004 | Naobayashi | |
| 2004/0127285 A1 | 7/2004 | Kavana | |
| 2004/0127291 A1 | 7/2004 | George et al. | |
| 2004/0132518 A1 | 7/2004 | Uehara et al. | |
| 2004/0132531 A1 | 7/2004 | George et al. | |
| 2004/0137984 A1 | 7/2004 | Salter | |
| 2004/0147300 A1 | 7/2004 | Seelig et al. | |
| 2004/0152514 A1 | 8/2004 | Kasai et al. | |
| 2004/0154460 A1 | 8/2004 | Virolainen et al. | |
| 2004/0181592 A1 | 9/2004 | Samra et al. | |
| 2004/0184473 A1 | 9/2004 | Tavli et al. | |
| 2004/0186720 A1 | 9/2004 | Kemmochi | |
| 2004/0193413 A1 | 9/2004 | Wilson et al. | |
| 2004/0204211 A1 | 10/2004 | Suzuki | |
| 2004/0204238 A1 | 10/2004 | Aoki | |
| 2004/0205204 A1 | 10/2004 | Chafe | |
| 2004/0207774 A1 | 10/2004 | Gothard | |
| 2004/0209673 A1 | 10/2004 | Shiraishi | |
| 2004/0229685 A1 | 11/2004 | Smith et al. | |

(56) References Cited

U.S. PATENT DOCUMENTS

| | | |
|---|---|---|
| 2004/0236543 A1 | 11/2004 | Stephens |
| 2004/0239678 A1 | 12/2004 | Tsunashima et al. |
| 2004/0240855 A1 | 12/2004 | Kagle |
| 2004/0243482 A1 | 12/2004 | Laut |
| 2004/0254016 A1 | 12/2004 | Shimazaki |
| 2004/0259631 A1 | 12/2004 | Katz et al. |
| 2004/0259632 A1 | 12/2004 | Crittenden et al. |
| 2004/0259644 A1 | 12/2004 | McCauley |
| 2005/0014554 A1 | 1/2005 | Walker et al. |
| 2005/0027381 A1 | 2/2005 | George et al. |
| 2005/0027383 A1 | 2/2005 | Nagata et al. |
| 2005/0045025 A1 | 3/2005 | Wells et al. |
| 2005/0049047 A1 | 3/2005 | Kitao |
| 2005/0054440 A1 | 3/2005 | Anderson et al. |
| 2005/0059480 A1 | 3/2005 | Soukup et al. |
| 2005/0060231 A1 | 3/2005 | Soukup et al. |
| 2005/0070349 A1 | 3/2005 | Kimura |
| 2005/0070359 A1 | 3/2005 | Rodriquez et al. |
| 2005/0073427 A1 | 4/2005 | Gothard |
| 2005/0075165 A1 | 4/2005 | George et al. |
| 2005/0082559 A1 | 4/2005 | Hasan Zaidi et al. |
| 2005/0101364 A1 | 5/2005 | Onoda et al. |
| 2005/0106546 A1 | 5/2005 | Strom |
| 2005/0115383 A1 | 6/2005 | Chang |
| 2005/0120865 A1 | 6/2005 | Tada |
| 2005/0120868 A1 | 6/2005 | Hinman et al. |
| 2005/0143174 A1 | 6/2005 | Goldman et al. |
| 2005/0159209 A1 | 7/2005 | Fiden et al. |
| 2005/0164779 A1 | 7/2005 | Okuniewicz |
| 2005/0181864 A1 | 8/2005 | Britt et al. |
| 2005/0215319 A1 | 9/2005 | Rigopulos et al. |
| 2005/0221892 A1 | 10/2005 | Takase |
| 2005/0227767 A1 | 10/2005 | Shimomura et al. |
| 2005/0229769 A1 | 10/2005 | Resnikoff |
| 2005/0235809 A1 | 10/2005 | Kageyama |
| 2005/0250565 A1 | 11/2005 | Nojiri et al. |
| 2005/0252362 A1 | 11/2005 | McHale et al. |
| 2005/0255914 A1 | 11/2005 | McHale et al. |
| 2005/0255923 A1 | 11/2005 | Aoki |
| 2005/0273319 A1 | 12/2005 | Dittmar et al. |
| 2006/0003839 A1 | 1/2006 | Lawrence et al. |
| 2006/0009282 A1 | 1/2006 | George et al. |
| 2006/0009979 A1 | 1/2006 | McHale et al. |
| 2006/0026304 A1 | 2/2006 | Price |
| 2006/0030382 A1 | 2/2006 | Okamura et al. |
| 2006/0032085 A1 | 2/2006 | Randall |
| 2006/0052161 A1 | 3/2006 | Soukup et al. |
| 2006/0052162 A1 | 3/2006 | Soukup et al. |
| 2006/0052163 A1 | 3/2006 | Aida |
| 2006/0052167 A1 | 3/2006 | Boddicker et al. |
| 2006/0052169 A1 | 3/2006 | Britt et al. |
| 2006/0058099 A1 | 3/2006 | Soukup et al. |
| 2006/0058101 A1 | 3/2006 | Rigopulos |
| 2006/0063573 A1 | 3/2006 | Ishikawa et al. |
| 2006/0068911 A1 | 3/2006 | Pirich et al. |
| 2006/0107819 A1 | 5/2006 | Salter |
| 2006/0107822 A1 | 5/2006 | Bowen |
| 2006/0135253 A1 | 6/2006 | George et al. |
| 2006/0152622 A1 | 7/2006 | Tan et al. |
| 2006/0154710 A1 | 7/2006 | Serafat |
| 2006/0166744 A1 | 7/2006 | Igarashi et al. |
| 2006/0175758 A1 | 8/2006 | Riolo |
| 2006/0189879 A1 | 8/2006 | Miyajima et al. |
| 2006/0191401 A1 | 8/2006 | Ueshima et al. |
| 2006/0204214 A1 | 9/2006 | Shah et al. |
| 2006/0218239 A1 | 9/2006 | Umezawa et al. |
| 2006/0218288 A1 | 9/2006 | Umezawa et al. |
| 2006/0247046 A1 | 11/2006 | Choi et al. |
| 2006/0252503 A1 | 11/2006 | Salter |
| 2006/0258450 A1 | 11/2006 | Ishihata et al. |
| 2006/0266200 A1 | 11/2006 | Goodwin |
| 2006/0287106 A1 | 12/2006 | Jensen |
| 2006/0288842 A1 | 12/2006 | Sitrick et al. |
| 2006/0290810 A1 | 12/2006 | Mallinson |
| 2007/0010329 A1 | 1/2007 | Craig et al. |
| 2007/0015570 A1 | 1/2007 | Pryzby |
| 2007/0015571 A1 | 1/2007 | Walker et al. |
| 2007/0026943 A1 | 2/2007 | Yoshimura |
| 2007/0059670 A1 | 3/2007 | Yates |
| 2007/0060312 A1 | 3/2007 | Dempsey et al. |
| 2007/0081562 A1 | 4/2007 | Ma |
| 2007/0088812 A1 | 4/2007 | Clark |
| 2007/0111802 A1 | 5/2007 | Ishihara et al. |
| 2007/0119292 A1 | 5/2007 | Nakamura |
| 2007/0140510 A1 | 6/2007 | Redmann |
| 2007/0155494 A1 | 7/2007 | Wells et al. |
| 2007/0162497 A1 | 7/2007 | Pauws |
| 2007/0163427 A1 | 7/2007 | Rigopulos et al. |
| 2007/0163428 A1 | 7/2007 | Salter |
| 2007/0168415 A1 | 7/2007 | Matahira et al. |
| 2007/0175317 A1 | 8/2007 | Salter |
| 2007/0178973 A1 | 8/2007 | Camhi |
| 2007/0201815 A1 | 8/2007 | Griffin |
| 2007/0218444 A1 | 9/2007 | Konetski et al. |
| 2007/0226293 A1 | 9/2007 | Sakurada et al. |
| 2007/0232374 A1 | 10/2007 | Lopiccolo et al. |
| 2007/0234284 A1 | 10/2007 | Tanner et al. |
| 2007/0234885 A1 | 10/2007 | Schmidt et al. |
| 2007/0243915 A1 | 10/2007 | Egozy et al. |
| 2007/0245881 A1 | 10/2007 | Egozy et al. |
| 2007/0256540 A1 | 11/2007 | Salter |
| 2007/0256541 A1 | 11/2007 | McCauley |
| 2007/0260984 A1 | 11/2007 | Marks et al. |
| 2007/0265095 A1 | 11/2007 | Jonishi |
| 2007/0265098 A1 | 11/2007 | Shimada et al. |
| 2007/0270223 A1 | 11/2007 | Nonaka et al. |
| 2007/0273700 A1 | 11/2007 | Nash et al. |
| 2007/0297755 A1 | 12/2007 | Holt et al. |
| 2008/0001950 A1 | 1/2008 | Lin et al. |
| 2008/0009346 A1 | 1/2008 | Jessop et al. |
| 2008/0009347 A1 | 1/2008 | Radek |
| 2008/0026355 A1 | 1/2008 | Petef |
| 2008/0053295 A1 | 3/2008 | Goto et al. |
| 2008/0076497 A1 | 3/2008 | Kiskis et al. |
| 2008/0096654 A1 | 4/2008 | Mondesir et al. |
| 2008/0101762 A1 | 5/2008 | Kellock et al. |
| 2008/0102958 A1 | 5/2008 | Kitamura et al. |
| 2008/0113698 A1 | 5/2008 | Egozy |
| 2008/0113797 A1 | 5/2008 | Egozy |
| 2008/0115657 A1 | 5/2008 | Wakiyama |
| 2008/0125229 A1 | 5/2008 | Jonishi |
| 2008/0141181 A1 | 6/2008 | Ishigaki |
| 2008/0143722 A1 | 6/2008 | Pagan |
| 2008/0146342 A1 | 6/2008 | Harvey et al. |
| 2008/0155421 A1 | 6/2008 | Ubillos et al. |
| 2008/0184870 A1 | 8/2008 | Toivola |
| 2008/0188305 A1 | 8/2008 | Yamazaki et al. |
| 2008/0192736 A1 | 8/2008 | Jabri et al. |
| 2008/0194319 A1 | 8/2008 | Pryzby et al. |
| 2008/0200224 A1 | 8/2008 | Parks |
| 2008/0202321 A1 | 8/2008 | Goto et al. |
| 2008/0220864 A1 | 9/2008 | Brosius et al. |
| 2008/0222685 A1 | 9/2008 | McCarthy et al. |
| 2008/0268943 A1 | 10/2008 | Jacob |
| 2008/0273755 A1 | 11/2008 | Hildreth |
| 2008/0276175 A1 | 11/2008 | Kim et al. |
| 2008/0280680 A1 | 11/2008 | Dutilly et al. |
| 2008/0288866 A1 | 11/2008 | Spencer et al. |
| 2008/0289477 A1 | 11/2008 | Salter |
| 2008/0300053 A1 | 12/2008 | Muller |
| 2008/0311969 A1 | 12/2008 | Kay et al. |
| 2008/0311970 A1 | 12/2008 | Kay et al. |
| 2009/0010335 A1 | 1/2009 | Harrison et al. |
| 2009/0013253 A1 | 1/2009 | Laefer et al. |
| 2009/0015653 A1 | 1/2009 | Baek |
| 2009/0038467 A1 | 2/2009 | Brennan |
| 2009/0069096 A1 | 3/2009 | Nishimoto |
| 2009/0073117 A1 | 3/2009 | Tsurumi et al. |
| 2009/0075711 A1 | 3/2009 | Brosius et al. |
| 2009/0082078 A1 | 3/2009 | Schmidt et al. |
| 2009/0083281 A1 | 3/2009 | Sarig et al. |
| 2009/0088249 A1 | 4/2009 | Kay et al. |
| 2009/0098918 A1 | 4/2009 | Teasdale et al. |
| 2009/0100992 A1 | 4/2009 | Elion |

(56) References Cited

U.S. PATENT DOCUMENTS

| | | |
|---|---|---|
| 2009/0104956 A1 | 4/2009 | Kay et al. |
| 2009/0106667 A1 | 4/2009 | Lyle et al. |
| 2009/0122146 A1 | 5/2009 | Zalewski et al. |
| 2009/0135135 A1 | 5/2009 | Tsurumi |
| 2009/0158220 A1 | 6/2009 | Zalewski et al. |
| 2009/0165632 A1 | 7/2009 | Rigopulos et al. |
| 2009/0177742 A1 | 7/2009 | Rhoads et al. |
| 2009/0186698 A1 | 7/2009 | Ludden |
| 2009/0188371 A1 | 7/2009 | Chiu et al. |
| 2009/0189775 A1 | 7/2009 | Lashina et al. |
| 2009/0191932 A1 | 7/2009 | Chiu et al. |
| 2009/0197665 A1 | 8/2009 | Christensen |
| 2009/0215533 A1 | 8/2009 | Zalewski et al. |
| 2009/0222392 A1 | 9/2009 | Martin et al. |
| 2009/0228544 A1 | 9/2009 | Demers et al. |
| 2009/0231425 A1 | 9/2009 | Zalewski |
| 2009/0233714 A1 | 9/2009 | Toro |
| 2009/0241758 A1 | 10/2009 | Neubacker |
| 2009/0258686 A1 | 10/2009 | McCauley et al. |
| 2009/0258700 A1 | 10/2009 | Bright et al. |
| 2009/0258703 A1 | 10/2009 | Brunstetter |
| 2009/0260508 A1 | 10/2009 | Elion |
| 2009/0262118 A1 | 10/2009 | Arikan et al. |
| 2009/0265668 A1 | 10/2009 | Esser et al. |
| 2009/0282335 A1 | 11/2009 | Alexandersson |
| 2009/0300676 A1 | 12/2009 | Harter, Jr. |
| 2009/0310027 A1 | 12/2009 | Fleming |
| 2009/0317783 A1 | 12/2009 | Noguchi |
| 2009/0318228 A1 | 12/2009 | Hughes |
| 2010/0009749 A1 | 1/2010 | Chrzanowski, Jr. et al. |
| 2010/0009750 A1 | 1/2010 | Egozy et al. |
| 2010/0029386 A1 | 2/2010 | Pitsch et al. |
| 2010/0035682 A1 | 2/2010 | Gentile et al. |
| 2010/0035688 A1 | 2/2010 | Picunko |
| 2010/0041477 A1 | 2/2010 | Kay et al. |
| 2010/0062405 A1 | 3/2010 | Zboray et al. |
| 2010/0064238 A1 | 3/2010 | Ludwig |
| 2010/0080528 A1 | 4/2010 | Yen et al. |
| 2010/0087240 A1 | 4/2010 | Egozy et al. |
| 2010/0100848 A1 | 4/2010 | Ananian et al. |
| 2010/0113117 A1 | 5/2010 | Ku et al. |
| 2010/0120470 A1 | 5/2010 | Kim et al. |
| 2010/0137049 A1 | 6/2010 | Epstein |
| 2010/0138785 A1 | 6/2010 | Uoi |
| 2010/0144436 A1 | 6/2010 | Marks et al. |
| 2010/0151948 A1 | 6/2010 | Vance et al. |
| 2010/0160038 A1 | 6/2010 | Youm et al. |
| 2010/0161432 A1 | 6/2010 | Kumanov et al. |
| 2010/0167823 A1 | 7/2010 | Winkler |
| 2010/0186579 A1 | 7/2010 | Schnitman |
| 2010/0192106 A1 | 7/2010 | Watanabe et al. |
| 2010/0199221 A1 | 8/2010 | Yeung |
| 2010/0209003 A1 | 8/2010 | Toebes et al. |
| 2010/0216598 A1 | 8/2010 | Nicolas et al. |
| 2010/0228740 A1 | 9/2010 | Cannistraro et al. |
| 2010/0238182 A1 | 9/2010 | Geisner et al. |
| 2010/0245241 A1 | 9/2010 | Kim et al. |
| 2010/0247081 A1 | 9/2010 | Victoria Pons |
| 2010/0255398 A1 | 10/2010 | Jacobson et al. |
| 2010/0255827 A1 | 10/2010 | Jordan et al. |
| 2010/0261146 A1 | 10/2010 | Kim |
| 2010/0265398 A1 | 10/2010 | Johnson et al. |
| 2010/0283723 A1 | 11/2010 | Konishi |
| 2010/0299405 A1 | 11/2010 | Socher et al. |
| 2010/0300264 A1 | 12/2010 | Foster |
| 2010/0300265 A1 | 12/2010 | Foster et al. |
| 2010/0300266 A1 | 12/2010 | Stoddard et al. |
| 2010/0300267 A1 | 12/2010 | Stoddard et al. |
| 2010/0300268 A1 | 12/2010 | Applewhite et al. |
| 2010/0300269 A1 | 12/2010 | Applewhite |
| 2010/0300270 A1 | 12/2010 | Applewhite et al. |
| 2010/0300272 A1 | 12/2010 | Scherf |
| 2010/0302155 A1 | 12/2010 | Sands |
| 2010/0304810 A1 | 12/2010 | Stoddard |
| 2010/0304811 A1 | 12/2010 | Schmidt et al. |
| 2010/0304812 A1 | 12/2010 | Stoddard et al. |
| 2010/0304860 A1 | 12/2010 | Gault et al. |
| 2010/0304863 A1 | 12/2010 | Applewhite et al. |
| 2010/0304865 A1 | 12/2010 | Picunko et al. |
| 2010/0306655 A1 | 12/2010 | Mattingly et al. |
| 2011/0010667 A1 | 1/2011 | Sakai et al. |
| 2011/0021273 A1 | 1/2011 | Buckley et al. |
| 2011/0028214 A1 | 2/2011 | Bright et al. |
| 2011/0039659 A1 | 2/2011 | Kim et al. |
| 2011/0047471 A1 | 2/2011 | Lord et al. |
| 2011/0066940 A1 | 3/2011 | Asghari Kamrani et al. |
| 2011/0083106 A1 | 4/2011 | Hamagishi |
| 2011/0083112 A1 | 4/2011 | Matsubara |
| 2011/0098106 A1 | 4/2011 | He et al. |
| 2011/0098109 A1 | 4/2011 | Leake et al. |
| 2011/0105206 A1 | 5/2011 | Rowe |
| 2011/0111850 A1 | 5/2011 | Beerhorst et al. |
| 2011/0118621 A1 | 5/2011 | Chu |
| 2011/0140931 A1 | 6/2011 | Geurts et al. |
| 2011/0151975 A1 | 6/2011 | Mori |
| 2011/0159938 A1 | 6/2011 | Umeda |
| 2011/0185309 A1 | 7/2011 | Challinor et al. |
| 2011/0195779 A1 | 8/2011 | Lau |
| 2011/0197740 A1 | 8/2011 | Chang et al. |
| 2011/0237324 A1 | 9/2011 | Clavin et al. |
| 2011/0238676 A1 | 9/2011 | Liu et al. |
| 2011/0251840 A1 | 10/2011 | Cook et al. |
| 2011/0256929 A1 | 10/2011 | Dubrofsky et al. |
| 2011/0257771 A1 | 10/2011 | Bennett et al. |
| 2011/0283236 A1 | 11/2011 | Beaumier et al. |
| 2011/0306396 A1 | 12/2011 | Flury et al. |
| 2011/0306397 A1 | 12/2011 | Fleming et al. |
| 2011/0306398 A1 | 12/2011 | Boch et al. |
| 2011/0312397 A1 | 12/2011 | Applewhite et al. |
| 2011/0312415 A1 | 12/2011 | Booth et al. |
| 2012/0013493 A1 | 1/2012 | Kato |
| 2012/0021833 A1 | 1/2012 | Boch et al. |
| 2012/0052942 A1 | 3/2012 | Esaki et al. |
| 2012/0052947 A1 | 3/2012 | Yun |
| 2012/0063617 A1 | 3/2012 | Ramos |
| 2012/0069131 A1 | 3/2012 | Abelow |
| 2012/0094730 A1 | 4/2012 | Egozy |
| 2012/0108305 A1 | 5/2012 | Akiyama et al. |
| 2012/0108334 A1 | 5/2012 | Tarama et al. |
| 2012/0143358 A1 | 6/2012 | Adams et al. |
| 2013/0132837 A1 | 5/2013 | Mead et al. |

FOREIGN PATENT DOCUMENTS

| | | |
|---|---|---|
| AU | 200194329 | 10/2001 |
| AU | 2003285918 | 5/2004 |
| AU | 2010229693 A1 | 11/2011 |
| CA | 2587415 A1 | 5/2005 |
| CA | 2609587 A1 | 12/2005 |
| CA | 2720723 A1 | 11/2009 |
| CA | 2757238 A1 | 9/2010 |
| CA | 2760210 A1 | 12/2010 |
| DE | 19716937 A1 | 3/1998 |
| DE | 69804915 T2 | 5/2002 |
| DE | 69726507 T2 | 11/2004 |
| DE | 69832379 T2 | 8/2006 |
| DE | 69739885 | 7/2010 |
| EP | 0903169 A2 | 3/1999 |
| EP | 919267 A2 | 6/1999 |
| EP | 972550 A2 | 1/2000 |
| EP | 974382 A1 | 1/2000 |
| EP | 974954 A1 | 1/2000 |
| EP | 978301 A1 | 2/2000 |
| EP | 982055 A1 | 3/2000 |
| EP | 992928 A2 | 4/2000 |
| EP | 992929 A2 | 4/2000 |
| EP | 993847 A1 | 4/2000 |
| EP | 0997870 A1 | 5/2000 |
| EP | 1003130 A2 | 5/2000 |
| EP | 1022672 A1 | 7/2000 |
| EP | 1029565 A2 | 8/2000 |
| EP | 1029566 A2 | 8/2000 |
| EP | 1029570 A2 | 8/2000 |
| EP | 1029571 A2 | 8/2000 |

(56) References Cited

FOREIGN PATENT DOCUMENTS

| | | | |
|---|---|---|---|
| EP | 1031363 A2 | 8/2000 |
| EP | 1031904 A2 | 8/2000 |
| EP | 1033157 A2 | 9/2000 |
| EP | 1033158 A2 | 9/2000 |
| EP | 1043745 A1 | 10/2000 |
| EP | 1043746 A1 | 10/2000 |
| EP | 1048330 A2 | 11/2000 |
| EP | 1061501 A1 | 12/2000 |
| EP | 1064974 A2 | 1/2001 |
| EP | 1064975 A2 | 1/2001 |
| EP | 1066866 A2 | 1/2001 |
| EP | 1079368 A1 | 2/2001 |
| EP | 1 081 680 A1 | 3/2001 |
| EP | 1081679 A1 | 3/2001 |
| EP | 1082981 A2 | 3/2001 |
| EP | 1082982 A2 | 3/2001 |
| EP | 1082983 A2 | 3/2001 |
| EP | 1088573 A2 | 4/2001 |
| EP | 1 096 468 A2 | 5/2001 |
| EP | 1114659 A2 | 7/2001 |
| EP | 1122703 A2 | 8/2001 |
| EP | 1125607 A2 | 8/2001 |
| EP | 1125613 A2 | 8/2001 |
| EP | 1127599 A2 | 8/2001 |
| EP | 1130569 A2 | 9/2001 |
| EP | 1132889 A2 | 9/2001 |
| EP | 1134723 A2 | 9/2001 |
| EP | 1136107 A2 | 9/2001 |
| EP | 1138357 A1 | 10/2001 |
| EP | 1139293 A2 | 10/2001 |
| EP | 1145744 A2 | 10/2001 |
| EP | 1145745 A2 | 10/2001 |
| EP | 1145748 A2 | 10/2001 |
| EP | 1145749 A2 | 10/2001 |
| EP | 1150276 A2 | 10/2001 |
| EP | 1151770 A2 | 11/2001 |
| EP | 1151773 A2 | 11/2001 |
| EP | 1157723 A2 | 11/2001 |
| EP | 1159992 A2 | 12/2001 |
| EP | 1160762 A2 | 12/2001 |
| EP | 1161974 A2 | 12/2001 |
| EP | 1 174 856 A2 | 1/2002 |
| EP | 1170041 A2 | 1/2002 |
| EP | 1178427 A1 | 2/2002 |
| EP | 1184061 A1 | 3/2002 |
| EP | 1187427 A2 | 3/2002 |
| EP | 1192976 A2 | 4/2002 |
| EP | 1195721 A2 | 4/2002 |
| EP | 1197947 A2 | 4/2002 |
| EP | 1199702 A2 | 4/2002 |
| EP | 1199703 A2 | 4/2002 |
| EP | 1 201 277 A2 | 5/2002 |
| EP | 1206950 A2 | 5/2002 |
| EP | 1208885 A1 | 5/2002 |
| EP | 1214959 A2 | 6/2002 |
| EP | 1220539 A2 | 7/2002 |
| EP | 1228794 A2 | 8/2002 |
| EP | 1245255 A2 | 10/2002 |
| EP | 1249260 A2 | 10/2002 |
| EP | 1258274 A2 | 11/2002 |
| EP | 1264622 A2 | 12/2002 |
| EP | 1270049 A2 | 1/2003 |
| EP | 1270050 A2 | 1/2003 |
| EP | 1271294 A2 | 1/2003 |
| EP | 1279425 A2 | 1/2003 |
| EP | 1287864 A2 | 3/2003 |
| EP | 1306112 A1 | 5/2003 |
| EP | 1413340 A1 | 4/2004 |
| EP | 000181482-0005 | 9/2004 |
| EP | 1503365 A1 | 2/2005 |
| EP | 1533010 A1 | 5/2005 |
| EP | 1542132 A1 | 6/2005 |
| EP | 1552864 A1 | 7/2005 |
| EP | 1552865 A1 | 7/2005 |
| EP | 1569171 A1 | 8/2005 |
| EP | 1604711 A1 | 12/2005 |
| EP | 1609513 A1 | 12/2005 |
| EP | 1630746 A1 | 3/2006 |
| EP | 1666109 A1 | 6/2006 |
| EP | 1696385 A2 | 8/2006 |
| EP | 1699017 A2 | 9/2006 |
| EP | 1731204 A1 | 12/2006 |
| EP | 1743680 A1 | 1/2007 |
| EP | 1 758 387 A1 | 2/2007 |
| EP | 1 825 896 A1 | 8/2007 |
| EP | 000859418-0008 | 2/2008 |
| EP | 000890447-0040 | 4/2008 |
| EP | 000890447-0046 | 4/2008 |
| EP | 2000190 A2 | 12/2008 |
| EP | 2001569 A2 | 12/2008 |
| EP | 2027577 A1 | 2/2009 |
| EP | 2206539 A1 | 7/2010 |
| EP | 2206540 A1 | 7/2010 |
| EP | 2301253 A1 | 3/2011 |
| EP | 2411101 A2 | 2/2012 |
| EP | 2494432 A2 | 9/2012 |
| FI | 200705530 | 1/2009 |
| FI | 20096276 | 12/2009 |
| GB | 2118809 A | 11/1983 |
| GB | 2425730 A | 11/2006 |
| GB | 2465918 A | 6/2010 |
| GB | 2471871 A | 1/2011 |
| HK | 1018021 A1 | 10/2002 |
| HK | 1023734 A1 | 2/2006 |
| IT | IN01685CN201 | 1/2012 |
| JP | 7185131 A | 7/1995 |
| JP | 3014386 B1 | 8/1995 |
| JP | 2552427 Y2 | 11/1996 |
| JP | 11053563 A | 2/1999 |
| JP | 11128534 A | 5/1999 |
| JP | 11128535 A | 5/1999 |
| JP | 11151380 A | 6/1999 |
| JP | 11156054 A | 6/1999 |
| JP | 2922509 | 7/1999 |
| JP | 11219443 A | 8/1999 |
| JP | 2951948 B1 | 9/1999 |
| JP | 2982147 B1 | 11/1999 |
| JP | 11313979 A | 11/1999 |
| JP | 3003851 U | 1/2000 |
| JP | 2000014931 | 1/2000 |
| JP | 2000037490 | 2/2000 |
| JP | 3017986 B1 | 3/2000 |
| JP | 3031676 B1 | 4/2000 |
| JP | 2000107447 A | 4/2000 |
| JP | 2000107458 | 4/2000 |
| JP | 2000112485 A | 4/2000 |
| JP | 2000116938 A | 4/2000 |
| JP | 3053090 B1 | 6/2000 |
| JP | 2000157723 | 6/2000 |
| JP | 3066528 U | 7/2000 |
| JP | 2000218046 | 8/2000 |
| JP | 3088409 B2 | 9/2000 |
| JP | 2000237454 A | 9/2000 |
| JP | 2000237455 A | 9/2000 |
| JP | 2000245957 | 9/2000 |
| JP | 2000245964 A | 9/2000 |
| JP | 2000245967 | 9/2000 |
| JP | 2000250534 | 9/2000 |
| JP | 2000/288254 | 10/2000 |
| JP | 2000293292 A | 10/2000 |
| JP | 2000293294 A | 10/2000 |
| JP | 2000300838 A | 10/2000 |
| JP | 2000300851 A | 10/2000 |
| JP | 2000308759 A | 11/2000 |
| JP | 2000317144 A | 11/2000 |
| JP | 2000325665 A | 11/2000 |
| JP | 2000350861 A | 12/2000 |
| JP | 2001000610 A | 1/2001 |
| JP | 2001009149 A | 1/2001 |
| JP | 2001009152 A | 1/2001 |
| JP | 2001009157 A | 1/2001 |
| JP | 2001046739 A | 2/2001 |
| JP | 2001062144 A | 3/2001 |
| JP | 2001070637 A | 3/2001 |

(56) References Cited

FOREIGN PATENT DOCUMENTS

| | | |
|---|---|---|
| JP | 2001070640 A | 3/2001 |
| JP | 2001070652 A | 3/2001 |
| JP | 2001075579 A | 3/2001 |
| JP | 2001096059 A | 4/2001 |
| JP | 2001096061 A | 4/2001 |
| JP | 2001129244 A | 5/2001 |
| JP | 2001145777 A | 5/2001 |
| JP | 2001145778 A | 5/2001 |
| JP | 3179769 B2 | 6/2001 |
| JP | 2001162049 A | 6/2001 |
| JP | 2001170352 A | 6/2001 |
| JP | 2001175254 A | 6/2001 |
| JP | 3187758 B2 | 7/2001 |
| JP | 2001190834 A | 7/2001 |
| JP | 2001190835 A | 7/2001 |
| JP | 2001190844 A | 7/2001 |
| JP | 2001198351 A | 7/2001 |
| JP | 2001198352 A | 7/2001 |
| JP | 2001198354 A | 7/2001 |
| JP | 3202733 B2 | 8/2001 |
| JP | 2001212369 A | 8/2001 |
| JP | 2001218980 A | 8/2001 |
| JP | 2001222280 A | 8/2001 |
| JP | 2001224850 A | 8/2001 |
| JP | 2001231904 A | 8/2001 |
| JP | 2001232059 A | 8/2001 |
| JP | 2001232062 A | 8/2001 |
| JP | 2001-252470 | 9/2001 |
| JP | 3204652 B2 | 9/2001 |
| JP | 2001252467 A | 9/2001 |
| JP | 2001259224 A | 9/2001 |
| JP | 2001269482 A | 10/2001 |
| JP | 2001273517 A | 10/2001 |
| JP | 2001293246 | 10/2001 |
| JP | 2001293254 A | 10/2001 |
| JP | 2001293256 A | 10/2001 |
| JP | 2001299975 A | 10/2001 |
| JP | 2001312260 A | 11/2001 |
| JP | 2001312740 A | 11/2001 |
| JP | 2001314645 A | 11/2001 |
| JP | 2001321565 A | 11/2001 |
| JP | 2001344049 A | 12/2001 |
| JP | 2001353374 A | 12/2001 |
| JP | 3245139 B2 | 1/2002 |
| JP | 2002000936 A | 1/2002 |
| JP | 2002018123 A | 1/2002 |
| JP | 2002018134 A | 1/2002 |
| JP | 2002028368 A | 1/2002 |
| JP | 3258647 B2 | 2/2002 |
| JP | 3261110 B2 | 2/2002 |
| JP | 2002045567 A | 2/2002 |
| JP | 2002056340 A | 2/2002 |
| JP | 2002066127 A | 3/2002 |
| JP | 2002066128 A | 3/2002 |
| JP | 2002084292 A | 3/2002 |
| JP | 3270928 B2 | 4/2002 |
| JP | 2002116752 A | 4/2002 |
| JP | 2002140727 A | 5/2002 |
| JP | 2002143567 A | 5/2002 |
| JP | 2002153673 A | 5/2002 |
| JP | 3306021 B2 | 7/2002 |
| JP | 2002204426 A | 7/2002 |
| JP | 3310257 B2 | 8/2002 |
| JP | 3317686 B2 | 8/2002 |
| JP | 3317956 B2 | 8/2002 |
| JP | 2002224435 A | 8/2002 |
| JP | 2002239223 A | 8/2002 |
| JP | 2002239233 A | 8/2002 |
| JP | 3320700 B2 | 9/2002 |
| JP | 3321111 B2 | 9/2002 |
| JP | 2002263229 A | 9/2002 |
| JP | 3333773 B2 | 10/2002 |
| JP | 3338005 B2 | 10/2002 |
| JP | 2002282417 A | 10/2002 |
| JP | 2002282418 A | 10/2002 |
| JP | 2002292123 A | 10/2002 |
| JP | 2002292139 A | 10/2002 |
| JP | 2002301263 A | 10/2002 |
| JP | 3345591 B2 | 11/2002 |
| JP | 3345719 B2 | 11/2002 |
| JP | 2002325975 A | 11/2002 |
| JP | 3351780 B2 | 12/2002 |
| JP | 2002360937 A | 12/2002 |
| JP | 3361084 B2 | 1/2003 |
| JP | 3370313 B2 | 1/2003 |
| JP | 3371132 B2 | 1/2003 |
| JP | 2003000951 A | 1/2003 |
| JP | 2003010541 A | 1/2003 |
| JP | 2003010542 A | 1/2003 |
| JP | 2003019346 A | 1/2003 |
| JP | 2003030686 A | 1/2003 |
| JP | 2003058317 A | 2/2003 |
| JP | 3392833 B2 | 3/2003 |
| JP | 2003117233 A | 4/2003 |
| JP | 2003126548 A | 5/2003 |
| JP | 3417555 B2 | 6/2003 |
| JP | 3417918 B2 | 6/2003 |
| JP | 3420221 B2 | 6/2003 |
| JP | 2003175279 A | 6/2003 |
| JP | 3425548 B2 | 7/2003 |
| JP | 3425552 B2 | 7/2003 |
| JP | 3433918 B2 | 8/2003 |
| JP | 3439187 B2 | 8/2003 |
| JP | 2003236244 A | 8/2003 |
| JP | 3442730 B2 | 9/2003 |
| JP | 3448043 B2 | 9/2003 |
| JP | 2003256552 A | 9/2003 |
| JP | 3458090 B2 | 10/2003 |
| JP | 3470119 B2 | 11/2003 |
| JP | 2003334387 A | 11/2003 |
| JP | 3491759 B1 | 1/2004 |
| JP | 2004016315 A | 1/2004 |
| JP | 2004016388 A | 1/2004 |
| JP | 3496874 B2 | 2/2004 |
| JP | 3500379 B1 | 2/2004 |
| JP | 3500383 B1 | 2/2004 |
| JP | 2004033266 A | 2/2004 |
| JP | 2004097610 A | 4/2004 |
| JP | 2004105309 A | 4/2004 |
| JP | 2004121397 A | 4/2004 |
| JP | 3526302 B1 | 5/2004 |
| JP | 2004141261 A | 5/2004 |
| JP | 3534345 B1 | 6/2004 |
| JP | 2004164519 A | 6/2004 |
| JP | 2004166994 A | 6/2004 |
| JP | 3545755 B2 | 7/2004 |
| JP | 3545983 B2 | 7/2004 |
| JP | 3546206 B2 | 7/2004 |
| JP | 3547374 B2 | 7/2004 |
| JP | 2004192069 A | 7/2004 |
| JP | 2004201937 A | 7/2004 |
| JP | 3561456 B2 | 9/2004 |
| JP | 3566195 B2 | 9/2004 |
| JP | 3573288 B2 | 10/2004 |
| JP | 3576994 B2 | 10/2004 |
| JP | 3582716 B2 | 10/2004 |
| JP | 2004283249 A | 10/2004 |
| JP | 2004298469 A | 10/2004 |
| JP | 2004321245 A | 11/2004 |
| JP | 3597465 B2 | 12/2004 |
| JP | 2004337256 A | 12/2004 |
| JP | 3611807 B2 | 1/2005 |
| JP | 2005046445 A | 2/2005 |
| JP | 2005049913 A | 2/2005 |
| JP | 3626711 B2 | 3/2005 |
| JP | 3634273 B2 | 3/2005 |
| JP | 2005095440 A | 4/2005 |
| JP | 3656118 B2 | 6/2005 |
| JP | 3686906 B2 | 8/2005 |
| JP | 3699660 B2 | 9/2005 |
| JP | 2005261586 A | 9/2005 |
| JP | 3702269 B2 | 10/2005 |
| JP | 2005287830 A | 10/2005 |
| JP | 2005301578 A | 10/2005 |

(56) References Cited

FOREIGN PATENT DOCUMENTS

| | | | |
|---|---|---|---|
| JP | 3715513 B2 | 11/2005 | |
| JP | 2005319025 A | 11/2005 | |
| JP | 3727275 B2 | 12/2005 | |
| JP | 2006020758 A | 1/2006 | |
| JP | 3753425 B2 | 3/2006 | |
| JP | 2006075264 A | 3/2006 | |
| JP | 2006116046 A | 5/2006 | |
| JP | 2006116047 A | 5/2006 | |
| JP | 2006192157 A | 7/2006 | |
| JP | 3804939 B2 | 8/2006 | |
| JP | 3816931 B2 | 8/2006 | |
| JP | 3822887 B2 | 9/2006 | |
| JP | 3831695 B2 | 10/2006 | |
| JP | 3869175 B2 | 1/2007 | |
| JP | 2007029589 A | 2/2007 | |
| JP | 3890445 B2 | 3/2007 | |
| JP | 2007504901 A | 3/2007 | |
| JP | 2008018287 A | 1/2008 | |
| JP | 2008168143 A | 7/2008 | |
| JP | 2009531153 A | 9/2009 | |
| JP | 2010509000 A | 3/2010 | |
| KR | 20010027533 A | 4/2001 | |
| KR | 20050047024 A | 5/2005 | |
| RU | 2010146213 A | 5/2012 | |
| SG | 173496 A1 | 9/2011 | |
| TW | 340049 | 3/2009 | |
| TW | 200951764 A | 12/2009 | |
| TW | 201006526 A | 2/2010 | |
| TW | 322023 | 3/2010 | |
| TW | 201116318 A | 5/2011 | |
| WO | WO-9717598 A1 | 5/1997 | |
| WO | WO-9938588 A1 | 8/1999 | |
| WO | WO-01/63592 A2 | 8/2001 | |
| WO | WO-0163592 | 8/2001 | |
| WO | WO-0230535 A1 | 4/2002 | |
| WO | WO-2004002590 A1 | 1/2004 | |
| WO | WO-2004002594 A1 | 1/2004 | |
| WO | WO-2004024256 A1 | 3/2004 | |
| WO | WO-2004024263 A1 | 3/2004 | |
| WO | WO-2004027631 A1 | 4/2004 | |
| WO | WO-2004030779 A1 | 4/2004 | |
| WO | WO-2004039055 A2 | 5/2004 | |
| WO | WO-2004052483 A1 | 6/2004 | |
| WO | WO-2004053800 A1 | 6/2004 | |
| WO | WO-2004082786 A1 | 9/2004 | |
| WO | WO-2004087272 A1 | 10/2004 | |
| WO | WO-2004101093 A1 | 11/2004 | |
| WO | WO-2004107270 A1 | 12/2004 | |
| WO | WO-2005027062 A1 | 3/2005 | |
| WO | WO-2005027063 A1 | 3/2005 | |
| WO | WO-2005030354 A1 | 4/2005 | |
| WO | WO-2005039212 A1 | 4/2005 | |
| WO | WO-2005099842 A1 | 10/2005 | |
| WO | WO-2005107902 A1 | 11/2005 | |
| WO | WO-2005/113096 A1 | 12/2005 | |
| WO | WO-2005114648 A1 | 12/2005 | |
| WO | WO-2006006274 A1 | 1/2006 | |
| WO | WO-2006075494 A1 | 7/2006 | |
| WO | WO-2007/055524 A1 | 5/2007 | |
| WO | WO-2007070738 A2 | 6/2007 | |
| WO | WO-2007078639 | 7/2007 | |
| WO | WO-2007/115299 A2 | 10/2007 | |
| WO | WO-2007111247 A1 | 10/2007 | |
| WO | WO-2007130582 A2 | 11/2007 | |
| WO | WO-2008001088 A2 | 1/2008 | |
| WO | WO-2008145952 A1 | 12/2008 | |
| WO | WO-2009021124 A2 | 2/2009 | |
| WO | WO-2010018485 A1 | 2/2010 | |
| WO | WO-2010036989 A1 | 4/2010 | |
| WO | WO-2011067469 A1 | 6/2011 | |
| WO | WO-2011155958 A1 | 12/2011 | |

OTHER PUBLICATIONS

[VIDEO] MJ the Experience Kinect: release Apr. 2011, http//www.youtube.com/watch?v=N7oyxHIP48A.
[VIDEO] 'Don't Stop' Gameplay Trailer: <http://www.gametrailers.com/video/dont-stop-michael-jackson/707336> (Nov. 10, 2010).
[VIDEO] 'Ghosts' Gameplay Trailer: <http://www.gametrailers.com/video/ghosts-gameplay-michael-jackson/706825> (Oct. 27, 2010).
[VIDEO] Dance Summit 2001: Bust a Groove (Released Nov. 2, 2000 for PS2); <http://www.youtube.com/watch?v=E8NjTGHYQcM>.
[Video] Dancing With the Stars—Activision, Zoe Mode; <http://www.youtube.com/watch?v=C7zBVfEJ0gg> (Oct. 2007).
[Video] Dancing with the Stars: We Dance—Activision, Zoe Mode; <http://www.youtube.com/watch?v=3IG0b-CT8vs> (Oct. 2008).
[Video] DDR Hottest Party; <http://www.youtube.com/watch?v=zk2OhEzGmUY> (Sep. 2007).
[VIDEO] E3 2010 Live Demo <http://www.gametrailers.com/video/e3-2010-michael-jackson/101449>; (Jun. 14, 2010).
[VIDEO] Eyetoy Groove for PS2; <http://www.youtube.com/watch?v=c80aaOU_fuE>. Apr. 2004.
[VIDEO] Gamescom '10—Billie Jean Demo <http://www.gametrailers.com/video/gc-10-michael-jackson/703294> (:58-1:13) (Aug. 20, 2010).
[VIDEO] Gamescom '10—Working Day and Night Demo <http://www.gametrailers.com/video/gc-10-michael-jackson/703295> (Aug. 20, 2010).
[VIDEO] Grease Dance—505 Games: release—Oct. 2011. http://www.youtube.com/watch?v=PaGBHSB2urg.
[VIDEO] Hannah Montana: Spotlight World Tour (Released Nov. 6, 2007 for Wii); <http://www.youtube.com/watch?v=WtyuU2NaL3Q>.
[VIDEO] Britney's Dance Beat (Released May 8, 2002 for PS2); <http://www.youtube.com/watch?v=-KR1dRGNX_w>.
[VIDEO] Dance Dance Revolution: Hottest Party 3 (Released Sep. 27, 2009 for Wii) <http://www.youtube.com/watch?v=zk20hEzGmUY>.
[VIDEO] Dance on Broadway—Ubisoft, Longtail Studios; <http://www.youtube.com/watch?v=eYaP-dT4z-M> (Jun. 6, 2010).
[VIDEO] Dance on Broadway: Jun. 2010 (http://youtu.be/Wi9Y5HHcvtY).
[VIDEO] Dancing with the Stars: Oct. 2007 (http://www.youtube.com/watch?v=8UChG2v5DI).
Amplitude for Playstation. Retrieved from the Internet: www.target.com/gp/detail.hbnl/601-0682676-9911341?asin= B0000859TM&AFID. Retrieved on Feb. 22, 2005. 1 page.
Amplitude Review by Ryan Davis. Retrieved from the Internet: www.gamespot.com/ps2/puzzle/ampli~de /printable_6023980.html. Retrieved on Jun. 11, 2012. 4 pages.
Amplitude. Retrieved from the Internet: www.gamesquestdirect.com/71171972582.htrnl. Retrieved on Jun. 8, 2012. 2 pages.
Amplitude: Sony's Rocking Rhythm Game Outdoes Itself on All Fronts by Douglass C. Perry. Retrieved from the Internet: http://ps2.ign.com/articles/390/390620pl.thml. Retrieved on Jun. 8, 2012. 6 pages.
Association of British Scrabble Players. "Rolling System" ABSP, http://www.absp.org.uk/results/ratings_detail.shtml. Retrieved May 25, 2011 (4 pages).
Beat Planet Music (Import) Review by Christian Nutt. Retrieved from the Internet: www.gamespot.com/ps/ action/beatplanetmusiclprintable_2546762.html. Retrieved on Jun. 11, 2012. 3 pages.
Beatmania IIDX 9 Style. Retrieved from the Internet: www.play-asia.com/paOS-13-71-8-iu.html. Retrieved on Feb. 22, 2005. 2 pages.
Beatmania PlayStation Review from www.GamePro.com/sony/psx/games/reviews/89.shtml. Retrieved on Feb. 22, 2005. 1 page.
Beatmania Review. Retrieved from the Internet: www.gamesarefun.com/gamesdb/review. h?reviewid=294. Retrieved on Jun. 11, 2012. 1 page.
Beatmanla IIDX 7 Style. Retrieved from the Internet: www.lik-sang.com/Info.php?category=27&products id=4061. Retrieved on Feb. 22, 2005. 1 page.
Beatnik Patent Sale Offering, Nov. 2008 (81 pp).
Bishop, Sam; Frequency: If you decide to pick up this game, you better give up ont he idea of getting a full night of sleep. via www.ign.com [online], Nov. 26, 2001 [retrieved on Mar. 1, 2006].

(56) References Cited

OTHER PUBLICATIONS

Retrieved from the Internet <URL: http://ps2.ign.com/articles/166/166450p1.html>. Retrieved on Jun. 8, 2012. 8 pages.
Boombox Icons, http://findicons.com/search/boombox, viewed on Jul. 31, 2012 copyright 2010 (1 page).
Bust a Groove Review by Jeff Gerstmann. Retrieved from the Internet: www.gamespolcom/ps/puzzlebusta groove/printable_2546923.html. Retrieved on Jun. 11, 2012. 9 pages.
Bust a Groove. Retrieved from the Internet: www.buyritegames.com/product_information.asp?rc=frgl&number=PS-BUSTA2. Retrieved on Feb. 22, 2005. 1 page.
Bust a Groove. Retrieved from the Internet: www.estarland.com/index.asp?page=Piaystation&cat=F&oroduct=6257&q. Retrieved on Jun. 11, 2012. 2 pages.
Bust a Groove: 989 Studios Best Game of the Year is a Funky Dance Sim thars Got the Fever by Doug Peny. Retrieved from the Internet http://psx.com/articles/152/152308pl.html. Retrieved on Jun. 8, 2012. 5 pages.
BVH File Specification, Character Studio, http:/lweb.archive.org/web/20060321075406/http:/lcharacterstudio. neUbvh file specification.htm, Mar. 21, 2006 (16 pages).
Dance Dance Revolution Review by Andy Chien. Retrieved from the Internet www.gamingage.com/reviews/archive/old reviews/psx/ddr. Retrieved on Feb. 22, 2005. 3 pages.
Dance Dance Revolution Review by Ryan Davis. Retrieved from the Internet www.gamespolcom/ps/puzzJe/dancedancerevolutionfprintable_2699724.html. Retrieved on Jun. 11, 2012. 9 pages.
Dance Dance Revolution, Konami via wvvw.ign.com [online], Apr. 4, 2001 [retrieved on Mar. 1, 2006]. Retrieved from the Internet <URL: http://psx.ign.com/articles/161/161525p1.html>. Retrieved on Jun. 14, 2012. 7 pages.
Dance Dance Revolution. Retrieved from the Internet: www.ebgames.com/ebxlproduct/224 789.asp. Retrieved on Feb. 22, 2005. 2 pages.
Dave H, et al. StepMania Tutorial. Nov. 3, 2004. <http://web.archive.org/web/200411031145ʌ /vww.stepmania.conVstepmania/wiki.php?pagename=Tutorial>. Retrieved on Jun. 19, 2012. 7 pages.
Def Jam Vendetta Review by Alex Navarro. Retrieved from the Internet www.gamespot.com/ps2/actionf actionfdefjamvendetta/prIntable_6024297 .html. Retrieved on Jun. 11, 2012. 10 pages.
Def Jam Vendetta. Retrieved from the Internet www.ebgames.com/ebx/product/232378.asp. Retrieved on Feb. 22, 2005. 2 pages.
Def Jam Vendetta: Rapper's Delight or Fight-Night Fright? Smash Sumthin' and Find Out by Jon Robinson. Mar. 31, 2003. Retrieved from the Internet http://ps2.ign.com/articles/391/391713pl.html. Retrieved on Jun. 8, 2012. 6 pages.
Digital Play: Reloaded. Opening Reception. Museum of the Moving Image. Mar. 19, 2005. <http://web.archive.Org/web/20050319060247/ http://www.movingimage.us/site/screenings/contenV2005/digital_play_reloaded.ht ml>. 1 page.
Donkey Konga Review by Ryan Davis. Retrieved from the Internet: www.gamespot.com/gamecubelpuzzle/ donkeykonga/printable_6108977.html. Retrieved on Jun. 11, 2012. 11 pages.
Donkey Konga. Retrieved from the Internet: www.ebgames.com/ebx/producV244024.asp. Retrieved on Jun. 11, 2012. 2 pages.
Donkey Konga: Could a Game Featuring Donkey Kong and Mini-Bongos ever Fail? Our Ful Review by Juan Castro. Retrieved from the Internet: cube.ign.com/articles/550/550723pl.html. Retrieved on Jun. 8, 2012. 6 pages.
DrumMana w/ Drum Set. Retrieved from the Internet www.estarland.com/index.asp?page=Playstation2&cat=RD&product=181268 &q. Retrieved on Jun. 11, 2012. 2 pages.
DrumMania (Import) Review by Jeff Gerstmann. Retrieved from the Internet: www.gamespot.com/ps2/actionf drummania/prinlable_2546356.html. Retrieved on Jun. 11, 2012. 9 pages.
DrumMania OST. Retrieved from the Internet www.lik-sang.com/info/php?category=264&products id=4793. Retrieved on Feb. 22, 2005. 2 pages.
DrumMania Review by Wynfwad. Retrieved from the Internet www.gamefaqs.com/console/ps2/review/ R56573.html. Retrieved on Jun. 11, 2012. 2 pages.
ESRB Game Ratings: Game Rating & Descriptor Guide via www.esrb.org[online], Retrived from the Internet: <URL: http:/Arvww.esrb.org/esrbratings_guide.asp#symbols>. Retrieved on Jun. 14, 2012. 3 pages.
Eye Toy Groove with Camera (Playstation 2). Retrieved from the Internet www.jr.com/JRProductPage.process?ProductCode=PS2+97400&JRSource=google. Retrieved on Feb. 22, 2005. 1 page.
Eye Toy Groove with Eye Toy Camera PS2. Retrieved from the Internet: www.walmart.com/catalog/product.gsp?dest=9999999997&product id-2607013&s. Retrieved on Feb. 22, 2005. 1 page.
Eye Toy: Groove—The Little Camera That Could comes Back with a Few New Tricks by Ed Lewis. Retrieved from the Internet: htiʌ y/ps2.ign.corn/artjcles/507/507854pl.html. Retrieved on Jun. 8, 2012. 8 pages.
Eye Toy: Groove Review by Ryan Davis. Retrieved from the Internet: wvm.gamespot.com/ps2/puzzle/ eyetoygroove/printable_6094754.html. Retrieved on Jun. 11, 2012. 10 pages.
Frequency—Pre-Played. Retrieved from the Internet www.ebgames.com/ebx/product/203370.asp. Retrieved on Feb. 22, 2005. 2 pages.
Frequency PS2 Review from GamePro.com, written by Dan Electro on Nov. 26, 2001. Retrieved from the Internet: www.gamepro.com/sony/ps2/games/reviews/18464.shtml. Retrieved on Jun. 11, 2012. 2 pages.
Frequency PS2. Retrieved from the Internet: www.walmart.com/catalog/producLgsp7dests9999999997&product id=1635738&s. Retrieved on Feb. 22, 2005. 2 pages.
Frequency Review by Ryan Davis. Retrieved from the Internet:www.gamespot.com/ps2/puzzle/frequency/ printable 2827476.html. Retrieved on Jun. 19, 2012. 9 pages.
Get on Da Mic Overview by Matt Gonzales. Retrieved from the Internet www.gamechronides.com/reviews/ps2/getondamic/body.htm. Retrieved on Jun. 11, 2012. 3 pages.
Get on Da Mic Review by Jeff Gerstmann. Retrieved from the Internet www.gamespot.cx)rri/ps2/puzzle/getondamic/printable 6110242.html. Retrieved on Jun. 11, 2012. 10 pages.
Get on Da Mic. Retrieved from the Internet: www.ebgames.com/ebx/product/245102.asp. Retrieved on Jun. 11, 2012. 2 pages.
Gitaroo Man. Retrieved from the Internet www.estartand.com/index.asp?page=Piaystation2&cat=PZ&product=676&Q .. Retrieved on Jun. 14, 2012. 2 pages.
Gitaroo-Man Review by David Smith. Retrieved from the Internet htt£yʌ s2.ign.conVara'cles/354/ 354413pjLhtml. Retrieved on Jun. 11, 2012. 4 pages.
Gitaroo-Man Review by Ryan Davis. Retrieved from the Internet: www.gamesrx)t.coiTi/ps2/puzzle/gitaroomart/printable 2847915.html. Retrieved on Jun. 19, 2012. 9 pages.
Gitaroo-Man. Retrieved from the Internet vvvrw.buyritegames.com/productjnformation.asp?re=frgl&number=PS2-GITARO. Retrieved on Feb. 22, 2005. 1 page.
Guitar Freaks (Import) Review by Sam Kennedy. Retrieved from the Internet: www.gamespot.com/pslaction/ guitarfreaks/printable_2545966.html. Retrieved on Jun. 11, 2012. 10 pages.
Guitar Freaks Review by Wade Monnig. Retrieved from the Internet: www.gamesarefun.com/gamesdb/review. php? .reviewid=301. Retrieved on Jun. 11, 2012. 3 pages.
Guitar Freaks Sony. Retrieved from the Internet www.gameexpress.com/product_detail.cfm.?UPC=SCPS45422. Retrieved on Feb. 22, 2005. 1 page.
Guitar Freaks with Guitar. Retrieved from the Internet: www.buyritegames.com/product_informatlon.asp?rc=frgl &number=PSJ-GUiIWG. Retrieved on Feb. 22, 2005. 1 page.
Guitar Hero (video game)—Wikipedia, the free encyclopedia—(Publisher—RedOctane) Release Date Nov. 2005. 25 pages.
Guitar Hero_Wikipedia, the free encyclopedia_Nov. 2005. http://en.wikipedia.org/w/index.php?title=guitaryhero &oldid=137778068. Retrieved on May 22, 2012. 5 pages.
GuitarFreaks—Wikipedia, the free encyclopedia—(Publisher—Konami, Konami Digital Entertainment) Release Date 1998. Accessed on Mar. 19, 2009. 5 pages.

(56) References Cited

OTHER PUBLICATIONS

International Search Report issued for PCT/US2010/054300, dated May 31, 2011 (5 pages).
International Search Report, PCT/US2006/062287, Mailed on May 10, 2007. 2 pages.
Ipodgames.com Tips. Dec. 4, 2004. <http://web.archive.org/web/20041204032612Awww.ipodgames.com/tips.html > 1 page.
Karaoke Revolution Review by Jeff Gerstmann. Retrieved from the Internet www.gamespot.com/ps2/puzzle/ karaokerevolution/printable . . . 6081709.html. Retrieved on Jun. 14, 2012. 10 pages.
Karaoke Revolution. Retrieved from the Internet: www.ebgames.com/ebxlproduct/24806.asp. Retrieved on Feb. 22, 2005. 2 pages.
Karaoke Revolution: The Revolution will be Televised by Ed Lewis. Retrieved from the Internet: http://ps2.ign.com/articles/458/458064p1.html. Retrieved on Jun. 8, 2012. 7 pages.
Kuwayama, Y. Trademarks & Symbols, vol. 2: Symbolical Designs, Van Nostrand Reinhold Company, (Nov. 4, 1980). 4 pages.
Lohman, "Rockstar vs. Guitar Hero," (The Rebel Yell). Nov. 13, 2008, accessed on Mar. 19, 2009. 5 pages.
Mad Maestro!—Pre-Played. Retrieved from the Internet: www.ebgames.com/ebx/product/217604.asp. Retrieved on Feb. 22, 2005. 2 pages.
Mad Maestro! by Ryan Davis. Retrieved from the Internet: www.gamespot.com/ps2/puzzle.madmaestro/ printable__2856821.html. Retrieved on Jun. 19, 2012. 9 pages.
Mad Maestro: The First Orchestra-conducting Sim on US Soil—Is It All It Could Have Been? by David Smith. Retrieved from the Internet http://ps2.ign.com/articles/3551355561 p1.html. Retrieved on Jun. 8, 2012. 6 pages.
Microsoft Office Online Clip Art, http://office.microsoft.com/en-us/clipart/results.aspx?Scope=MC,MM,MP,MS &PoleAssetID=MCJ04316180000&Querty=Icons&CTT=6 &Origin=EC01017435m (Feb. 21, 2007) (1 page).
Microsoft PowerPoint Handbook, (1 page) (1992).
Mojib Ribbon Playtest by Anoop Gantayat. Retrieved from the Internet: htto://os2.ion.com/articles/442/442204p1.html. Retrieved on Jun. 8, 2012. 4 pages.
Mojib Ribbon—Review. Retrieved from the Internet: www.ntsc-uk.com/review.php?platform= ps2&game=MoiibRibbon. Retrieved on Jun. 14, 2012. 2 pages.
Mojib Ribbon. Retrieved from the Internet: www.lik-sang.comlInfo.php?category=27&products id=3805&PHPSESSID=b9eQca. Retrieved on Feb. 22, 2005. 1 page.
Mojib Ribbon. Retrieved from the Internet: www.ncsxshop.com/cgi-bin/shop/SCPS.11033.html. Retrieved on Jun. 14, 2012. 2 pages.
NCSX.com; Game Synpopsys of Guitar Freaks and DrumMania Masterpiece Gold, with a date of Mar. 8, 2007, and with an Archive.org Wayback Machine Verified date of May 17, 2007, downloaded from http://web.archiv.org/web/20070517210234/http://www.ncsx.com/2007/030507/guitarfreaks__gold.htm (4 pages).
Non-Final Office Action as issued by the United States Patent and Trademark Office for U.S. Appl. No. 12/474,899, dated Jan. 19, 2011, 7 pages.
PaRappa the Rapper 2. Retrieved from the Internet:www.amazon.com/exec/obidos/tg/deteil/-/B00005UNWD/ 104-4695527-8827110. Retrieved on Feb. 22, 2005. 2 pages.
PaRappa the Rapper Review by Jer Horwitz. Retrieved from the Internet: www.gamespot.com/pslpuzzlel parappatherapper/printable__2548866.html. Retrieved on Jun. 14, 2012. 9 pages.
Parappa the Rapper. Retrieved from the Internet: wvvw.estarland.com/index.asp?page=Playstation&cat=F&product=6871&q. Retrieved on Jun. 11, 2012. 2 pages.
Parappa the Rapper: PaRapper the Rapper Is finally here, but does it live up to the hype? by Adam Douglas. Retrieved from the Internet http://psx.ign.com/articlesI150/150490p1.html. Retrieved on Jun. 8, 2012. 2 pages.
PopCap Games Site Review via www.download-free-games.com, retrieved on Mar. 3, 2006]. Retrieved from the Internet <URL:http7Avww.download-free-games.com/reviews/popcap__games.htm>. 2 pages.

Ramsey, A. Guitar Freaks and Drum Mania Masterpiece Gold FAQ v. 1.04, Apr. 2, 2007, downloaded from http://www.gamefaqs.com/console/ps2/file/937670/47326. 3 pages.
RedOctane. "Guitar Hero 2 Manual" Activision Publishing, Inc. (2006) (13 pages).
Rez PlayStation^. Retrieved from the internet: http://global.yesasia.com/en/PrdDept.aspx/ pjd-1002847668. Retrieved on Jun. 14, 2012. 1 page.
Rez Review by Jeff Gerstmann. Retrieved from the Internet:www.qamespot.com/ps2/action/rez/printable 2838815.html. Retrieved on Jun. 11, 2012. 9 pages.
Rez. Retrieved from the Internet: www.estarland.com/playstation2.product.5426.html. Retrieved on Jun. 14, 2012. 2 pages.
Rez: You May Not Understand This Review. We May Not Either. But you should certainly play this game by.David Smith. Retrieved from the Internet: http://m.ign.com/articles/2002/01/09/rez. Retrieved on Jun. 11, 2012.3 pages.
SingStar Party (SingStar2) Bundle. Retrieved from the Internet: www.gameswarehouse.com.Au/longpage.asp?gameid=10329. Retrieved on Feb. 22, 2005. 2 pages.
SingStar Party. Retrieved from the Internet: www.argos.co.uk/Webapp/wcs/stores/servlet/ProductDisplay?storeId=10001&langld. Retrieved on Feb. 22, 2005. 1 page.
SingStar Review (PS2) by James Hamer-MortonI. Retrieved from the Internet http://ps2.twomtown.net/en uk/articles/art.print.php?id=5279. Retrieved on Jun. 11, 2012. 5 pages.
SingStar Review by Luke Van Leuveren. Retrieved from the Internet http://palgn.com.aii/article.php7id-1282. Retrieved on Jun. 11, 2012. 5 pages.
Space Channel 5 Special Edition Review by Brad Shoemaker. Retrieved from the Internet: www.gamespot.corn/ps2/puzzle/spacecriannel5pait2/printeble__6085137.h Retrieved on Jun. 11, 2012. 10 pages.
Space Channel 5. Retrieved from the Internet: www.lik-sang.com/info.php?products__is=2050&likref=fro__gle4. Retrieved on Feb. 22, 2005. 1 page.
Space Channel 5: Description. Retrieved from the Internet: www.buyritegames.com/product__information.asp?rc=frgl &number=DC-SPACEC5. Retrieved on Feb. 22, 2005. 1 page.
Space Channel 5: Special Edition by Jason Thompson. Retrieved from the Internet www.popmattere.com/ mulumerJia/reviews/s/space-channel-5.shtml. Retrieved on Jun. 8, 2012. 2 pages.
Taiko Drum Master Review by Justin Calvert. Retrieved from the Internet: www.gamespot.com/ps2 puzzie/taikodrummaster/printable__6111767.html. Retrieved on Jun. 14, 2012. 10 pages.
Taiko Drum Master w/ Drum. Retrieved from the Internet: www.ebgames.com/ebx/product/244015.asp. Retrieved on Jun. 14, 2012. 2 pages.
Taiko no Tatsujin. Retrieved from the Internet htlpy/games.channel.aol.com/review.adp? qameID-7569. Retrieved on Feb. 22, 2005. 3 pages.
Thalmann, "L'animation par ordinateur" http://web.archive.org/web/20060421045510/http://vrlab.epfl.ch/{thalmann/CG/infogr.4.pdf>, Apr. 21, 2006 (52 pages).
Vib Ribbon (PSX): Homepage, Screenshots by James Anthony. http://www.vib-ribbon.com/vibhtml/english/index.html. Retrieved on Jun. 14, 2012. 1 page.
Vib-Ribbon (Import) Review by Jeff Gerstmann. Retrieved from the Internet: www.gamespot.com/ps /puzzle/vibribbon/printabte 2550100.html. Retrieved on Jun. 14, 2012. 9 pages.
Vib-Ribbon. Retrieved from the Internet: www.ncsxshop.com/cgi-bin/shop/SCPS-45469.html. Retrieved on Feb. 22, 2005. 1 page.
Video MJ the Experience Kinect: announce—Oct. 2010: (http://www.youtube.com/watch?v=xLbiPicu0MM).
Video "Dance Online—Dance lessons gameplay" <http://www.youtube.com/watch?v=B4phOjfVNLk>. Last accessed on Nov. 8, 2012.
Video <http://www.bing.com/videos/search?q=dance+instruction+game &mid=E69356CFA1B6719FF5C8E69356CFA1B6719FF5C8 &view=detail&FORM=VIRE5> (uploaded Jul. 27, 2010).

(56) References Cited

OTHER PUBLICATIONS

Video Alvin and the Chipmunks Chipwrecked—Majesco Sales: release—Nov. 2011 (http://www.youtube.com/watch?v=xKeW3CUt14A&feature=related).
Video Dream Dance & Cheer (Released Sep. 13, 2009 for Wii) <http://www.youtube.com/watch?v=oi9vQjT1x5Q>.
Video Just Dance—Ubisoft Paris; <http://www.youtube.com/watch?v=t7f22xQCEpY>; (Nov. 17, 2009).
Video Just Dance 2—Ubisoft; <http://www.youtube.com/watch?v=kpaW9sM_M2Q> (Oct. 12, 2010).
Video Just Dance 2: Oct. 2010 (http://youtu.be/2ChliUgqLtw).
Video Just Dance: Nov. 2009 (http://youtu.be/rgBo-JnwYBw).
Video Kidz Bop Dance Party! The Video Game (Released Sep. 14, 2010 on Wii) <http://www.youtube.com/watch?v=I8VD9EvFdeM>.
Video Let's Cheer—Take 2 Interactive: release—Nov. 2011; announce—Jun. 2011 (http://www.youtube.com/watch?v=uv1IMBIw2Dw&feature=related).
Video MJ—Paris Week game demo—Oct. 29, 2010 http://www.dailymotion.com/video/xfg4oe_pgw-10-michael-jackson-experience-kinect_videogames?start=13#from=embed <http://www.dailymotion.com/video/xfg4oe_pgw10-michael-jackson-experience-kinect_videogames?start=13>.
Video MJ the Experience Wii: Nov. 2010 (http://www.youtube.com/watch?v=8ZA59JY8Y_w).
Video MJ:TE Kinect from Aug. 19, 2010 at <http://www.youtube.com/watch?v=6AjGmSnN6qQ>; Michael Jackson the Experience Video Game—Kinect for Xbox 360—Gamescom 2010 HD.
Video MJ:TE on Wii (Nov. 2010); <http://www.youtube.com/watch?v=gmIMNGWxgvo>.
Video N.Y. Comic Con '10—Billie Jean Gameplay Demo: <http://www.gametrailers.com/video/nycc-10-michaeljackson/706056> (Oct. 13, 2010).
Video Tokyo Game Show '10—'Every Step' Trailer: http://www.gametrailers.com/video/tgs-10-michael-jackson/704548 (Sep. 15, 2010).
VIDEO Victorious: Time to Shine—D3 publishers: Dec. 22, 2011 (http://www.youtube.com/watch?v=ud69OK02KGg&feature=fvst).
VIDEO We Cheer 2 (Released Nov. 3, 2009 for Wii) <http://www.youtube.com/watch?v=-4oalxqnbll>.
Virginia Tech Multimedia Music Dictionary: "P: Phrase" Virginia Tech University, http://www.music.vt.edu/musicdictionary/textp/Phrase.html. Retrieved May 25, 2011 (7 pages).
U.S. Appl. No. 12/913,493, filed Oct. 27, 2010 (69 pages).
U.S. Appl. No. 29/393,964, filed Jun. 10, 2011 (2 pages).
U.S. Appl. No. 29/393,967, filed Jun. 10, 2011 (2 pages).
U.S. Appl. No. 29/393,968, filed Jun. 10, 2011 (2 pages).
U.S. Appl. No. 29/393,970, filed Jun. 10, 2011 (2 pages).
U.S. Appl. No. 29/393,973, filed Jun. 10, 2011 (2 pages).
U.S. Appl. No. 29/393,975, filed Jun. 10, 2011 (2 pages).

\* cited by examiner

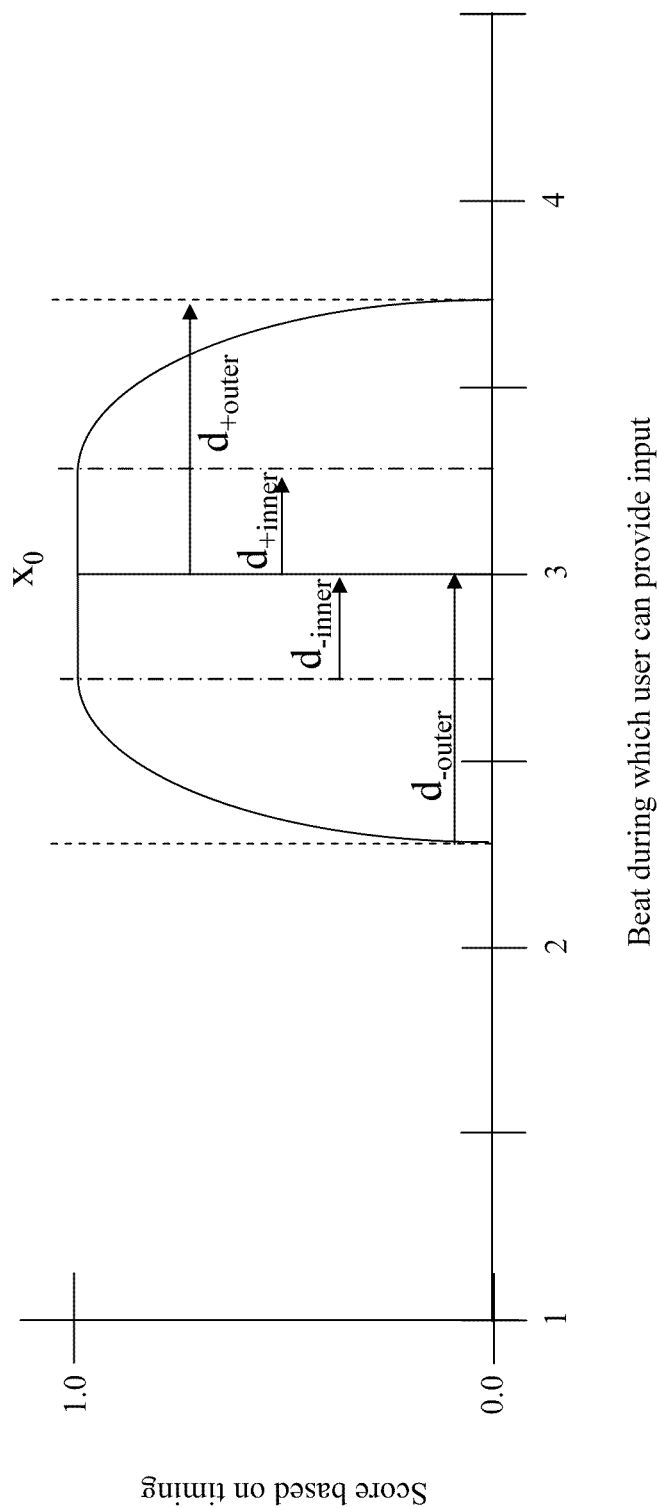

DANCE GAME AND TUTORIAL

CROSS REFERENCES TO RELATED APPLICATIONS

This application claims benefit of priority to U.S. Provisional Patent Application No. 61/354,073, filed Jun. 11, 2010 and entitled "Dance Game and Tutorial" by Flury et al., the disclosure of which is incorporated herein by reference in its entirety.

This application relates to and is assigned to the same entity as co-pending U.S. patent application Ser. No. 12/940,809, entitled "Audio and Animation Blending," filed on Nov. 5, 2010, the disclosure of which is incorporated herein by reference in its entirety.

FIELD OF THE INVENTION

The present invention relates generally to gesture-based video games and, more specifically, to dance video games based on positional input from a user.

BACKGROUND

Although video games and video game consoles are prevalent in many homes, game controllers, with their myriad of buttons and joysticks, are still intimidating and confusing to people that do not often play video games. For these people, using a game controller to interact with the game is an obstacle to enjoying it. Also, where the game is a dance game, often an additional controller is required in the form of a dance mat or dance pad. These dance mats have specific input sections (similar to buttons on a traditional controller) that react to pressure from the user's feet. But these mats take up a lot of space and are often single use controllers—they are used just for dance games and must be rolled up and stored when not in use.

To increase a user's feeling of immersion in the game, as well as to overcome the cumbersome nature of game controllers or dance mats for users not familiar with them, some game platforms forego the use of traditional controllers and utilize cameras instead. The cameras detect a user's physical movements, e.g., the waving of his arm or leg, and then interpret those movements as input to the video game. This allows the user to use a more natural-feeling input mechanism he is already familiar with, namely the movement of his body, and removes the barrier-to-entry caused by the many-buttoned controller.

One example of a camera-based controller is the EyeToy camera developed by Logitech and used with the Sony PlayStation 2 game console. The EyeToy, and similar cameras, typically include a camera and a microphone. The EyeToy sends a 640×480 pixel video stream to the PlayStation, and the game executing on the PlayStation parses the frames of the video, e.g., calculating gradations of color between pixels in the frame, to determine what in the camera's field-of-view is the user ("player") and what is the background ("not player"). Then, differences in the stream over time are used to determine and recognize the user's movements, which in turn drive the user's interaction with the game console.

Other cameras used by game platforms include the DreamEye for the Sega Dreamcast, The PlayStation Eye (a successor to the EyeToy) for Sony's PlayStation 3, and the Xbox Live Vision for Microsoft's Xbox 360. These cameras all provide a typical single-input camera that can stream video or take still photographs, and some, such as the PlayStation Eye, additionally provide a microphone for audio input.

Microsoft is currently developing a depth-aware camera system in the form of Project Natal. A Natal system provides an RGB camera, a depth sensor, a multi-array microphone, and software that processes the inputs from the camera, depth sensor, and microphone. Beneficially, the Natal software provides, based on the input, a three-dimensional skeleton that roughly maps to the user's body. Specifically, rather than just determining a difference between "player" and "not player" like prior game cameras, Natal determines what is the user's right hand, left hand, head, torso, right leg, and left leg. This skeleton is preserved as a user moves his body in the camera's field of view, allowing for the tracking of specific limbs. This skeleton framework, however, is the extent of what Natal provides. Namely, no user interface is provided by Natal, and users must still use a game controller to interact with a game or menu system.

Other systems, based on non-camera technologies, have also been developed that attempt to track a user's movements. For example, the Nintendo Wii provides players with an infrared transmitter "Wii remote" that the user holds in his hand. The Wii remote is used as pointing device and has a built-in accelerometer to track changes in the Wii remote's position. The Wii remote is often paired with a "nunchuk" (which also has an accelerometer) that is held in the player's other hand, allowing the Wii to, in a sense, track the movements—or at least changes in the movements—of the user's hands. Another technology based on a hand-held controller is sixense, which is demonstrated at http://www.sixense.com High-end motion capture ("mocap") systems have also been used to track a user's movements. Typically mocap systems involve the user wearing a body suit that has dozens of white spheres located at relevant locations. The mocap cameras detect these spheres and use them to infer positional information about the user's body. Mocap systems, however, are expensive and not practical for the average user.

SUMMARY OF THE INVENTION

The invention includes methods, systems, computer program products and means for providing a dance video game that, by utilizing a camera-based system, obviates the need for, or use of, a typical game controller or dance mat for input. Though Natal is used as an example herein, the invention is not limited to a Natal implementation.

In one embodiment, there is a filter system for capturing and scoring what a user is doing. The user's input is normalized to a reference framework and compared against key frames of a target performance, which has also been normalized to the reference framework. The closer the user's input is to the correct move at the correct time, the better the rating awarded to the user.

Advantageously, the game and its filters behave similarly for a short person and a tall person relative to their own bodies. In one embodiment of the invention, appendage and body position determinations are made based on, and relative to, the skeleton of the person interpreted by the system, not on an absolute coordinate system within the camera's field of view. Other embodiments can utilize an absolute coordinate system to infer information about the user's body to create a skeleton for use with the invention.

Typically, ranges are used to determine if a user has successfully performed a move because motion-tracking input is inherently noisy. Determining precisely where a user's appendages are is difficult due to the natural movement of the user over time and the lag between receiving camera input and processing it. This is complicated when the user is trying to perform a particular dance move at a particular time—he may start or end the move too early or too late, or some appendages may be positionally inaccurate, or a combination of these. Therefore, the filter system allows for variation in both timing and position when scoring the user.

The invention can also be used to teach a user how to dance. In some implementations, there is a means for teaching a specific move or series of moves to a user using audible cues and repetition. To facilitate this functionality, an additional aspect of the invention is an animation blending technique that uses animation transitions from an idle state into a move, and from the move into an idle state, along with the animation of the move in the context of the entire dance, to allow the teaching avatar to demonstrate and repeat a single move.

There are also scripted transitions, or "bridge animation segments" that allow for seamless reuse of portions of a motion capture performance, that, in the performance, are not actually adjacent. Beneficially, these bridge animation segments can be used in a variety of contexts. For example, a difficult dance routine with many different moves can be simplified into a lower difficulty routine by repeating a subset of the moves, which requires jumping to non-adjacent animation segments. Also, the bridge animation segments can be used in a practice mode to repeat moves until the player has successfully performed them. And, bridge animation segments can be used to extend the motion capture performance in a multiplayer mode by looping a segment of the motion capture performance.

The invention also provides seamless audio track transition playback during multi-player modes. It is more fun for users to trade off dancing during a song than it is for each user to play all the way through while the other waits. But songs are often written for a single play-through and do not facilitate smooth "rewinding" from an audible standpoint. Specifically, the music at time $t_1$ (later in the song) does not usually lend itself to a smooth transition to $t_0$ (earlier in the song). The invention solves this by providing segments of transition audio to use between different parts of the song, selectively muting the original audio and unmuting the appropriate transition segment when a transition to a different part of the song is necessary. As with bridge animations, these bridge audio segments can be used in a variety of contexts. For example, the bridge audio segments can be used in a practice mode to repeat sections of the song the player is practicing until the player has successfully performed them. And, bridge audio segments can be used to extend the song in a multiplayer mode by looping a segment of the song audio.

In one embodiment, there is a method, executed on a game platform, for scoring a player performance that includes one or more poses in a dance-based video game based on input received via a sensor. The method and the components it interacts with can also be expressed as a system, in the form of a computer program product, or as an apparatus with means for accomplishing the interaction, where the structures correspond to a game platform and a sensor (e.g., a camera) in communication with the game platform. In cases where results are displayed, a display in communication with the game platform may also be used. The method includes receiving a performance 3D skeleton indicating a pose of the player, then calculating a score by comparing a position, a timing, or both, associated with one or more joints of the performance 3D skeleton to a position, a timing, or both, associated with one or more joints of a target pose; and then altering one or more characteristics of the dance-based video game based on the score.

In another embodiment, there is also a method, executed on a game platform, for evaluating a player performance based on input from a sensor. As described above, the method and the components it interacts with can also be expressed as a system, in the form of a computer program product, or as an apparatus with means for accomplishing the interaction, where the structures correspond to a game platform and a sensor (e.g., a camera) in communication with the game platform. In cases where results are displayed, a display in communication with the game platform may also be used. The method includes receiving a performance 3D skeleton indicating a portion of the player performance, providing a target 3D skeleton indicating a portion of a target performance, defining a per joint error function, calculating an error using the per joint error function based on the performance 3D skeleton and the target 3D skeleton, and producing, with the game platform, an audio or visual indication of the error.

In one implementation, there is a method, executed on a game platform, for scoring a player performance that includes one or more poses in a dance-based video game based on input received via a sensor. As described above, the method and the components it interacts with can also be expressed as a system, in the form of a computer program product, or as an apparatus with means for accomplishing the interaction, where the structures correspond to a game platform and a sensor (e.g., a camera) in communication with the game platform. In cases where results are displayed, a display in communication with the game platform may also be used. The method includes providing a target 3D skeleton indicating a target pose and receiving a number of 3D performance skeletons indicating player poses. Then an overall score for a particular 3D performance skeleton is generated by comparing a position associated with one or more joints of the 3D performance skeleton to a corresponding position associated with one or more joints of the target 3D skeleton. Then the score generating step is repeated for each of the of 3D performance skeletons that fall within a predetermined temporal range. This generates a number of overall scores, and an audio or visual indication of the accuracy of the performance, that is based on one or more of the overall scores, is displayed on the display.

In one embodiment, there is a method, executed on a game platform, for scoring a player performance that includes one or more poses in a dance-based video game based on input received via a sensor. As described above, the method and the components it interacts with can also be expressed as a system, in the form of a computer program product, or as an apparatus with means for accomplishing the interaction, where the structures correspond to a game platform and a sensor (e.g., a camera) in communication with the game platform. In cases where results are displayed, a display in communication with the game platform may also be used. The method begins by receiving a performance 3D skeleton indicating a pose of the player. Then a score is calculated by comparing a measurement of one or more reference points, e.g., joints, bones, or derivations of either, of the performance 3D skeleton to a measurement of one or more reference points, e.g., joints, bones, or derivations of either, of a target pose. Some examples of measurements are displacement, velocity, acceleration, but other measurements would be understood by one of skill in the art. Then, one or more characteristics of the dance-based video game are altered based on the score.

Any of the above embodiments may enjoy one or more of the following benefits. In some versions, the target pose, expressed as a 3D skeleton, is generated based on motion capture data. This is then provided during the game for weighting, comparison against the player's performance, and/or scoring. And in some instances, the target pose is selected based on its importance to the target performance, e.g., a transitional movement is not important, but a particular orientation of the player's body at a particular time is for the movement to be recognized as a particular dance move.

Also, in some implementations, the position associated with the one or more joints of the 3D skeleton and the position associated with the one or more joints of the target pose are based on a normalization of the spatial position of the one or more joints of the 3D skeleton and the one or more joints of the target pose, respectively. For example, normalizing the spatial position of a joint can include computing a unit vector reflecting an offset of the joint relative to an origin joint. It can further involve defining a coordinate system originated at the origin joint; and translating the unit vector into the coordinate system. Examples of potential origin points are the left shoulder, the right shoulder, the left hip, or the right hip.

Alternatively, normalizing the spatial position of a joint could be based on computing a first vector reflecting the offset of the joint relative to an origin joint, computing a second vector reflecting the offset of an intermediate joint relative to the origin joint, and then computing a third vector reflecting the offset of the joint relative to the intermediate joint. Then the first vector is divided by the sum of the magnitudes of the second and third unit vectors.

In some implementations, a second target 3D skeleton is provided indicating a second target pose and a second number or group of 3D performance skeletons are received indicating player poses. An overall score is generated for a second particular 3D performance skeleton by comparing a position associated with one or more joints of the second 3D performance skeleton to a corresponding one or more joints of the second target 3D skeleton. Then, the score generating step is repeated for each of the second group of 3D performance skeletons that fall within a second predetermined temporal range to generate a second number of overall scores. Lastly, a second audio or visual indication—based on one or more of the first and second plurality of overall scores—is produced on the display. The overall score can be based on a positional score and/or a timing-based score. Additionally or alternatively, the overall score can be based on a displacement score, a velocity score, or an acceleration score.

In some implementations, the target pose is associated with a target performance timing, and a timing-based score varies inversely as the difference between the target performance timing and a timing of performance of the player pose. In some implementations, the timing-based score is based on a first constant if the difference is less than a first predetermined threshold. In some, it varies inversely as the difference if the difference is between the first predetermined threshold and a second predetermined threshold. And in some implementation, the score is a second constant if the difference is greater than the second predetermined threshold. And in some implementations, computing the timing-based score uses a combination of the foregoing techniques.

In some embodiments, the positional score can include one or more per-joint scores, where the contribution of each per-joint score to the overall score is weighted. Additionally or alternatively, the positional score can include one or more body part scores, with each body part score having one or more per-joint scores. And as above, the contribution of each body part score to the overall score can be weighted.

In some versions, comparing the joints of the 3D performance skeleton to the joints of the target 3D skeleton includes calculating a Euclidean distance between the position associated with the more joints of the 3D performance skeleton and the corresponding position associated with the joints of the target 3D skeleton to generate a per-joint score. And this per-joint score can vary inversely as the Euclidean distance.

In some embodiments, for example, the per-joint score can be a first constant if the Euclidean distance is less than a first predetermined threshold. In some embodiments, it varies inversely as the Euclidean distance if the Euclidean distance is between the first predetermined threshold and a second predetermined threshold. And in some embodiments, it is a second constant if the Euclidean distance is greater than the second predetermined threshold. And in some implementations, computing the per-joint score uses a combination of the foregoing techniques.

Additionally or alternatively, calculating the Euclidean distance can include weighting the contributions of the x, y, and z axes to the Euclidean distance, with the orientations of the x, y, and z axes are relative to each body zone. For example, the x, y, and z axes of an arm body zone can originate at a shoulder connected to the arm and are based on a first vector from the shoulder to an opposite shoulder, a second vector in the direction of gravity, and a third vector that is a cross product of the first and second vectors. Alternatively, the x, y, and z axes of a leg body zone can originate at a hip connected to the leg and are based on a first vector from the hip to an opposite hip, a second vector in the direction of gravity, and a third vector that is a cross product of the first and second vectors. And, the orientations of the x, y, and z axes can also be relative to the target 3D skeleton. That is, the x, y, and z axes are rotated based on an angle between a vector normal to a plane of the target 3D skeleton and a vector normal to a view plane.

In some embodiments, the audio or visual indication comprises a visual indication of a score for a body part, such as flashing the body part green or red for success or poor performance respectively. Or, the audio or visual indication comprises an audible indication of the score for a body part, e.g., "nice arms!" or "you need to move your feet more!" The audio or visual indication can also include one more graphics, with the number of graphics being based on the one or more overall scores. The audio or visual indication can also be a simulated crowd, where one or more characteristics of the simulated crowd varies based on the one or more of the plurality of overall scores, e.g., the number of people in the crowd can grow or shrink. The audio or visual indication can also be a simulated environment, where one or more characteristics of the simulated environment varies based on the one or more of the plurality of overall scores, e.g., there can be fireworks or flashing lights if the player is performing well and destruction or dimming of the environment if the player is performing poorly.

There is also a method of providing a smooth animation transition in a game. As described above, the method and the components it interacts with can also be expressed as a system, in the form of a computer program product, or as an apparatus with means for accomplishing the interaction, where the structures correspond to a game platform and a display in communication with the game platform. The method includes, during gameplay, providing an event timeline with event markers denoting points in time on the event timeline. Each event marker is associated with an animation segment from the number of animation segments. The first marker on the event timeline is provided, which indicates a first animation segment to be displayed on the display (at a point in time with respect to event timeline). A second marker on the event timeline is also provided, which indicates a second animation segment to be displayed on the display (at a second point in time with respect to event timeline). Then as the game progresses, and the second point time on the timeline is approaching, a set of animation segments that need to be blended together is determined, to provide a smooth transition from the first animation segment to the second animation segment. Once the set of animations have been determined, a blend is performed among the set of animation segments. For example, a blend between the first animation segment and the second animation segment may be all that is needed and portions of each are blended together. More specifically, a number of beats at the end of the first animation segment may be blended with a number of beats at the beginning of the second animation. Alternatively, a smoother result may be achieved using a bridge animation segment, where a portion of the first animation segment is blended with the bridge animation segment and then a portion of the bridge animation segment is blended with the second animation segment. In some versions, the existence of a bridge animation segment is determined by the presence of a bridge animation segment or a reference to a bridge animation segment listed in a lookup table, keyed off the animations that are being blended from and to. If the entry in the lookup table exists, the bridge animation segment is used. If not, no bridge animation segment is used, and the first animation segment is blended directly into the second animation segment.

These blending techniques are useful for multiplayer gameplay as well, where a first player is scored before the blend occurs and a second player is scored after the blend. Beneficially, the second animation can be based on the difficulty of the game, so if the first player is very good and is performing a complex move, the transition to the second player's move, which is easier, will not be jarring because of the transition. Or, where a series of animations are recorded and then "cut up" and reused to form progressively easier routines (with animation sequences from the hardest difficulty being arranged for each difficulty level), the transitions can be used to create a dance routine using non-contiguous or looping animation sequences. The technique can also be used to blend an animation with itself, that is, blend the ending position of the dancer with the starting position of the dancer. This can be used for repeated moves.

Another technique is to blend audio segments. In one embodiment, there is a method, executed on a game platform, for providing smooth audio transitions in a song. The method includes providing, during play of a game, an event timeline with event markers denoting points in time on the event timeline. The event timeline is associated with an audio track played during play of the game. The audio track has a first audio segment and a second audio segment. Then, a first marker on the event timeline is provided to indicate a first point in time (that is associated with the first audio segment). Also, a second marker on the event timeline is provided that indicates a second point in time with respect to the event timeline (and is associated with the second audio segment). During game play it is determined that the second time is approaching and a set of audio segments to be blended is determined that will ensure a smooth transition from the first audio segment to the second audio segment. Then, based on the set of audio segments that will be used for blending, a blend is applied among the set of audio segments based on the prior determination made. For example, the set of audio segments that are used for the blend could be just the first audio segment and the second audio segment, and the blend could be accomplished by crossfading between the two. Or, a bridge audio segment may also be necessary, and the blend can be applied to a portion of the first audio segment and blended with a portion of the bridge audio segment, and then a blend can be applied from a portion of the bridge audio segment to a portion of the second animation. As above, a blend can be a crossfade, but can also be an attenuation, e.g., the first audio segment can be reduced in volume or silenced completely (muted) while the bridge audio segment is played and then the bridge audio segment can be reduced in volume or stopped completely and the second audio would be played. For example, the first audio segment can be muted for its final beat, the second audio segment can be muted for its first two beats, and the bridge audio segment is played in the three beat-long "hole", i.e., during the muted last beat of the first audio segment and muted first two beats of the muted second audio segment.

In some implementations, the first audio segment and the second audio segment are the same audio segment, as would be the case of a repeated section of audio. The bridge audio segment or a reference to a bridge audio segment can also be stored in a lookup table that is keyed based on the audio segment that is being transitioned from and the audio segment that is being transitioned to.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which:

FIG. 2B shows a representative window to determine a user's timing error in performing a move;

DETAILED DESCRIPTION

Figure 1A:
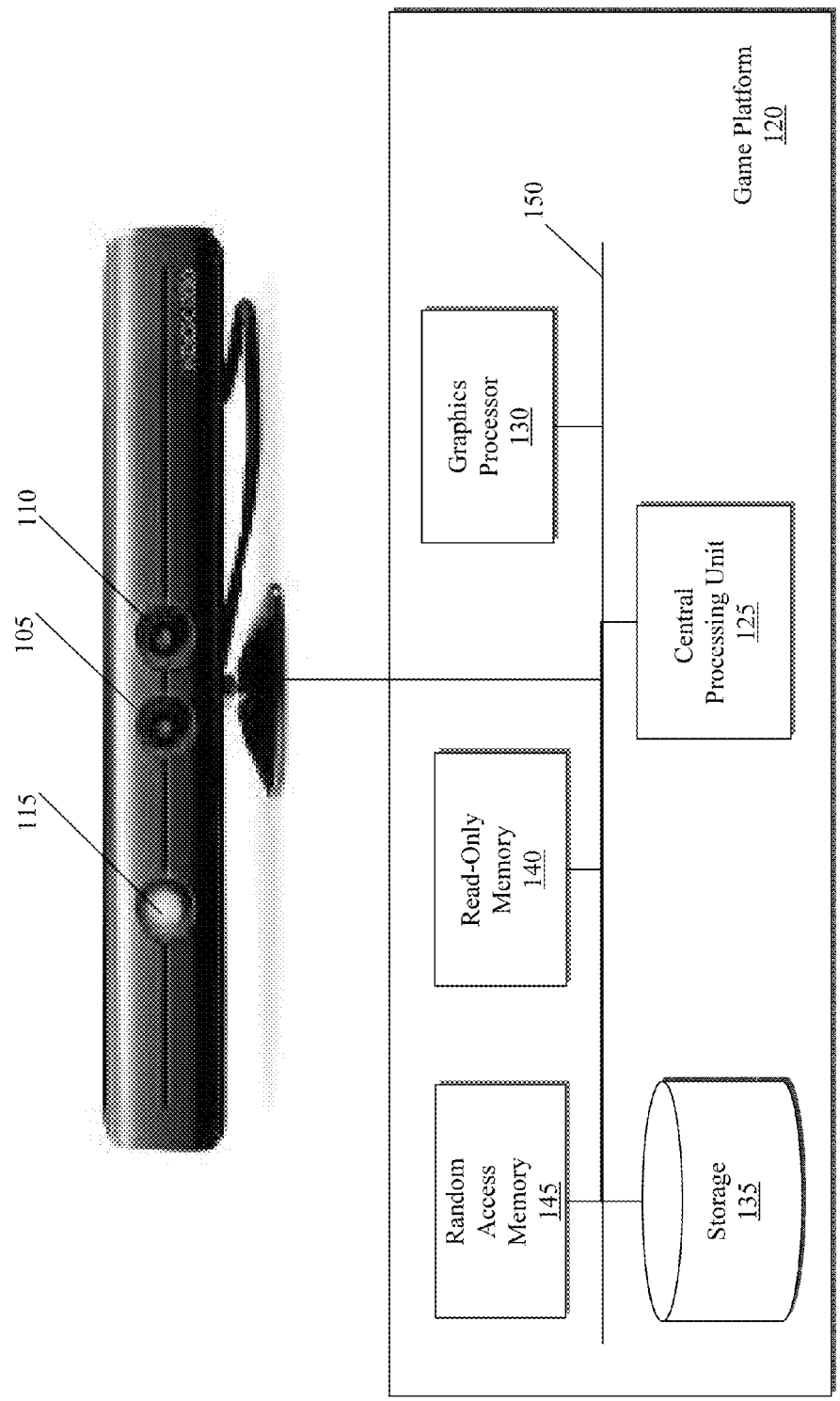
FIG. 1A depicts a game platform with a Project Natal camera system.

One embodiment of the present invention is based on the Project Natal framework developed by Microsoft Corporation of Redmond, Wash. As indicated in FIG. 1A, the Project Natal system includes an RGB camera 105, a depth sensor 110, a multi-array microphone 115, and a processor (not shown). The RGB camera 105 delivers a three-color (Red, Green, Blue) video stream to the game console, enabling facial recognition and full-body tracking. The depth sensor 110 is an infrared projector combined with a monochrome CMOS sensor. This allows a game console 120 utilizing Natal to recognize objects in the camera's field of view in three dimensions instead of forcing the game console to parse a two-dimensional video-stream. The multi-array microphone 115 parses voices and sound input, while simultaneously extracting and nullifying ambient noise. Project Natal also features a processor with proprietary software that coordinates the inputs of the Natal system and provides a three-dimensional, skeleton-based system to game developers. Developers can use this system to utilize three-dimensional position information of the joints in the user's body to interact with the game platform.

Although Project Natal provides a framework for determining positional information of a user's body, it does not provide a means for grading a dance performance or teaching a user to dance. While in some embodiments, a camera-based system is used to determine positional information about the user's body in three dimensions to produce a skeleton model, in other embodiments, transducers attached to the user's body are used to detect the positions of the user's limbs and produce a skeleton model. Other embodiments use infrared pointing devices or other motion tracking peripherals. All that is required is a system than can parse movement in two dimensions to produce a skeleton model; adding dimension information from a third dimension, typically depth, simply makes the invention easier to implement due to the additional information provided to the system. In embodiments where the system is already provided a skeleton, such as Natal, relative body scale mapping is easier to accomplish.

Also shown in FIG. 1A is an exemplary game platform 120. The game platform typically includes a Central Processing Unit (CPU) 125, a graphics processor 130, storage component 135 such as a hard drive, Read Only Memory (ROM) 140, Random Access Memory (RAM) 145, all in signal communication via a bus 150. The bus 150 also connects to an input for the Project Natal System. In some embodiments, the Natal system connects to the game platform 120, e.g., an Xbox 360, via a Universal Serial Bus (USB) connection.

Figure 1B:
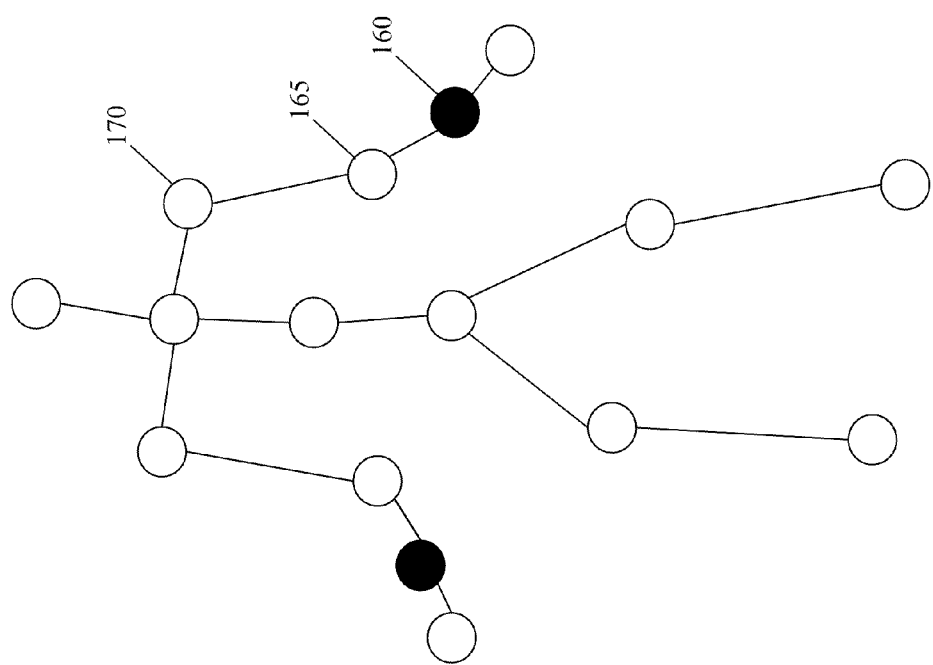
FIG. 1B depicts an example of a skeleton provided by Project Natal.

As used herein, the terms "joint", "bone", and "skeleton" are intended to have the meaning one of skill in the art of motion capture and animation would ascribe to them. For example, a skeleton can comprise bones, but the number of bones and their positions are a function of the motion capture equipment and the animation rig and do not necessarily correlate to the number and positions of bones in a human skeleton. Similarly, a joint can be at the distal endpoint of a single bone (e.g., a fingertip or the head), and need not be at a point where two bones come together. An example of the Natal skeleton is shown in FIG. 1B. The skeleton provided by the Natal system provides a framework for the dance game, and allows for tracking of not only limbs generally, but specific joints as well. For example, the wrist joint 160 on the right arm is treated separately from the right elbow 165, which is treated differently than the right shoulder 170. Additional portions of the body are also recognized, such as the pelvis, middle of the torso, the head, the neck, and the knees and feet.

One of the benefits provided by the skeleton-based system is that the skeletal model can be used to calculate scale vectors based on two or more joints. This provides a spatially relative system, i.e., what is the positional distance from body part X to body part Y compared to the positional distance from body part X to body part Z, instead of an absolute coordinate system.

A "filter" as used herein, is in effect a test, e.g., is the user's right hand in a particular position at time $t_n$? Although typically a producing a Boolean outcome, e.g., if the condition is true, the filter is satisfied and registers a success, and if not, then the filter is not satisfied. Filters may also output a contiguous score indicating the degree to which the condition is being satisfied spatially or temporally. Advantageously, multiple filters can be checked simultaneously, e.g., is the user's right hand in position x and is his left foot in position y? These filters can then be combined to determine if a user has successfully completed a pose. But pose-matching, in and of itself, is not a complete solution to scoring a sequence of dance moves.

Creating a Target Representation

The process of one implementation begins by using motion capture technology (known in the art as "mocap") to create a three-dimensional model of a target performance of a dance or part of a dance. Motion capture is a recording of human actor which can be used by a computer to reproduce the actor's performance. When the mocap session is recorded, sensors at various points on the actor's body provide the recording computer with information such as joint and limb position data over time. In the case of a dance game, the mocap is typically a recording of a dancer performing a particular dance move, or series of movements that makes up a dance move, and in one implementation, the mocap is a recording of an entire dance routine for a song. The mocap performance becomes a representation of the dance in a form usable by the game system (i.e., a "target performance"). Beneficially, the positional information received during mocap is similar to the positional information received by a camera-based game system when a user is playing a game. This similarity can be exploited to grade a user on how well he is dancing at a particular time by comparing a user's performance (the input performance) to a keyframe of the target performance. Also beneficially, the mocap data can be used to drive on-screen animations of avatars, thus demonstrating to the user the exact movements he must perform to maximize his score.

At least one notable problem arises though that prevents a direct comparison between the user's performance and the target performance: because the user and the mocap actor could have different heights and appendage lengths, or have different body types, a direct comparison of positional information of the input performance and the target performance could result in the user scoring poorly, even if he is performing the moves correctly. For example, the actor in the target performance could have an arm fully extended which, based on the dimensions of the actor's body, positions the actor's wrist two and a half feet in front of his shoulder. The user's input, also reflecting a fully extended arm, could have the (shorter-in-stature) user's wrist positioned two feet in front of his shoulder. In a purely comparative system, the user has not satisfied a test of "is the user's wrist in the same position as the wrist of target performance actor?" because the user's wrist, even though his arm is fully extended, is still a half foot closer to the reference point, i.e., the shoulder. Therefore, it is advantageous to express both the target performance and the user's performance in the same frame of reference.

Normalizing the Input Performance and Target Performance

To create a consistent frame of reference, the mocap data, which is expressed in its own representation (in some implementations even its own skeleton), and the user's input are both normalized, creating a normalized target performance and a normalized input performance. In one implementation, normalization of each joint is achieved by deriving unit vectors reflecting offsets of one specific joint relative to another specific joint.

In one embodiment, there are four different player-normalized coordinate systems: left arm, right arm, left leg, and right leg. The left arm coordinate system's origin is at the left shoulder, the up vector is away from gravity (in Natal systems, based on Natal's accelerometer). The right vector is from the left shoulder to the right shoulder, the forward vector is the cross product of the up vector and the right vector. The right arm coordinate system is just the mirror of this. The left leg coordinate system's origin is the left hip, the up vector is gravity, the right vector is from the left hip to the right hip, and the forward vector is the cross product of the up vector and the right vector. The right leg coordinate system is the mirror of this.

Figure 1C:
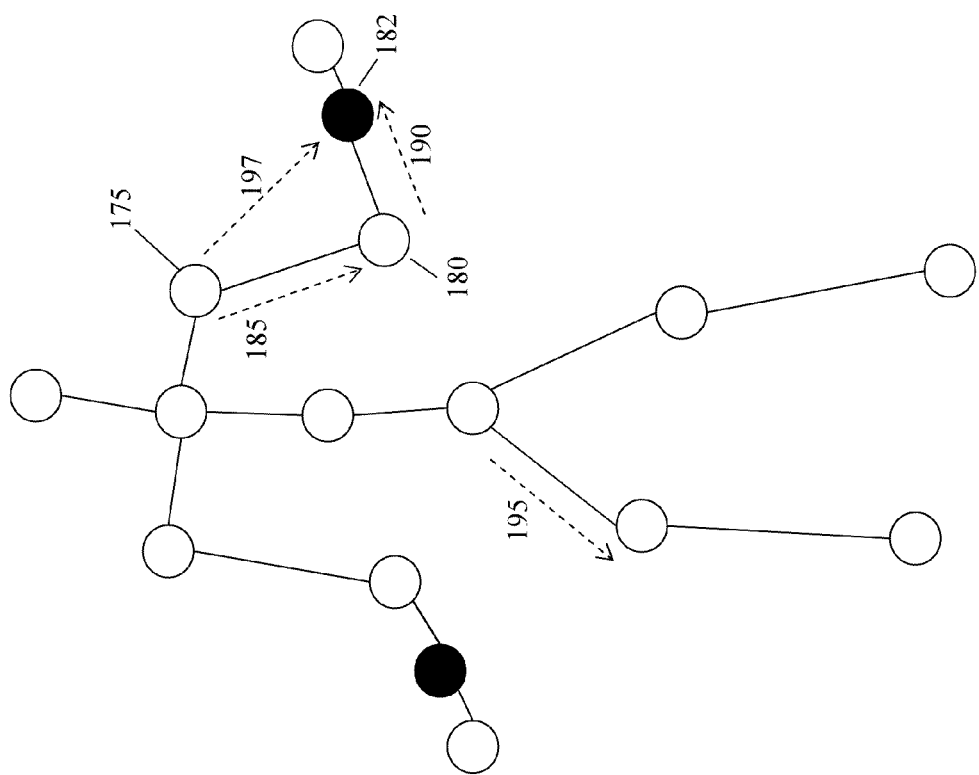
FIG. 1C depicts an example of a skeleton that includes vectors used in determining normalized joint position.

As an example, referring to FIG. 1C, the normalized position of joints on the left arm can be determined as follows. The left shoulder joint 175 is treated as the origin of the vector 185 from the shoulder to the elbow 180 and that vector 185 is transformed from the skeleton's coordinate system into the left arm coordinate system. The vector is then normalized by dividing it by its magnitude. The resulting vector is a "normalized elbow position." A similar process is applied to the input skeleton to determine a normalized elbow position for the user. This method can be used for other joints as well, e.g., the wrist position can be normalized by determining the vector 190 from the elbow 180 to the wrist 182, transforming that vector from the skeleton's coordinate system into the left arm coordinate system, and dividing it by the magnitude of that vector 190. A knee's position can be normalized based on the vector 195 between the hip and the knee, transformed from the skeleton's coordinate system into the appropriate-side leg coordinate system, and divided by the magnitude of that vector. An ankle's position can be determined based on the vector from the knee to the ankle, and so forth. Other joints such as hips are usable as well: foot raises are determined as a "squish" from foot to waist where the foot's position is drawn in towards the waist. In one embodiment, the normalized joint positions in the entire skeleton are computed, using the joint more proximal to the body core as the reference joint. In other embodiments, only a subset of the joints that have a correspondence in both skeletons are normalized, and normalization occurs on a limb-by-limb basis. In either embodiment, the normalization of the target performance can be carried out in advance of gameplay, or can be carried out during gameplay.

There are several options for normalizing joints that are not directly connected to an origin joint. Continuing the previous example with the shoulder 175 being the origin joint, the wrist's position could be normalized by determining the vector 197 from the shoulder 175 to the wrist joint 182, transforming the vector 197 from the skeleton's coordinate system into the left arm coordinate system, and dividing the resulting vector by the sum of the magnitude of the vector 185 from the shoulder to the elbow and the magnitude of the vector 190 from the elbow to the wrist. Alternatively, the vector 197 from the shoulder to the wrist could be determined, transformed, and divided by the magnitude of that vector 197. For legs, an ankle position could be based on foot position, transformed from the skeleton's coordinate system into the appropriate-side leg coordinate system, and divided by the sum of the magnitudes of the vector from the hip to the knee and from the knee to the ankle.

Typically, normalizing the target performance and the input performance yields positional information analogous to both, e.g., both have elbow position representations, both have wrist position representations, etc. Where data is not available in the mocap data or the user input for a particular joint though, in some embodiments, the game interpolates between two joints to create a "pseudo-joint" that maps to a joint in the other skeleton. For example, if the mocap skeleton has a left hip joint and a right hip joint, but a user skeleton only has a mid-pelvis joint, a mid-pelvis pseudo-joint can be synthesized for the mocap skeleton at the midpoint of the two hip joints, and used in further normalization and scoring. Alternatively, pseudo-joints could be interpolated from both data sets/skeletons to map to a third idealized skeleton. Additionally, where the input camera system is a Project Natal system, adjustments are typically made to conform the mocap skeleton to the Natal skeleton, or vice versa, e.g., dropping the hips, adjusting the shoulder height, and others. In some embodiments, the game creates a "pseudo-joint" even when data is available in both the mocap data and the user input, in order to provide a reference point or measurement that is more stable than a joint in the existing skeleton.

Comparing the Input Performance to the Target Performance

In one embodiment of the invention, every "frame" of the input performance is compared with the corresponding frame of the target performance to produce a score for that frame. This strategy, however, does not allow the game to account for inaccuracies in the user's timing, such as dancing a move with perfect position but slightly late or early. In another embodiment, the invention addresses this issue by scoring each frame of the input performance against the corresponding frame of the target performance and a range of adjacent frames. The scoring process incorporates positional and temporal score using a technique described below. For a given target frame, a score is determined by finding the maximum score of all input frames scored against that target frame.

This approach, however, can be prohibitively expensive computation-wise on some game consoles. To alleviate this, in some embodiments, only a fraction of the input frames are compared with target frames (e.g., half of the input frames). The specific frames in the input performance that are chosen for comparison can be regularly spaced, or the frames can be chosen randomly with a probability matching that fraction.

This approach, however, does not capture the intent behind a dance move where certain intermediate poses are more important and the transition movements into or out of those poses are less important. In a preferred embodiment, the input frames should be compared to the target frames most important to the dance itself.

In one embodiment, each frame of the target performance is assigned a weight (e.g., in the range 0.0 to 1.0). As stated above, each target frame receives a score based on the maximum score of all input frames scored against that target frame. In this embodiment, that score is multiplied by the weight to produce a weighted score for each target frame. The score for a move is determined by combining the weighted scores using a sum or average.

In one embodiment, each frame of the target performance is assigned a weight (e.g., in the range 0.0 to 1.0) that is computed based on the target performance. The weight for a frame of the target performance may be computed based on any number of neighboring frames of the target performance. The computation determines which target frames are the most important to the dance by detecting inflections in direction of parts of the target skeleton, or inflections in distance between parts of the target skeleton.

For example, the initial weight for a frame may be 0.0. A velocity vector can be computed for each joint in a target frame by subtracting its position in the previous frame from its position in the current frame. Whenever any joint's velocity experiences a derivative of zero with respect to time, along the x, y, or z axis in the camera-based coordinate system, or along the x, y, or z axis in the skeleton-based coordinate system (see below for a technique for computing a skeleton-based coordinate system), that frame's weight is increased. For example, if the weight of the target frame before considering the joint was w0, the new weight might be (1+w0)/2, or it may be set to a predetermined "one joint zero-derivative" value such as 0.5. If another joint's velocity simultaneously experiences a derivative of zero, the frame's weight is increased by substituting the previous weight into (1+w0)/2 again, or it may be set to a predetermined "two joint zero-derivative" value such as 0.75. Likewise, additional joints that experience simultaneous derivatives of zero make the current frame have a higher weight using the formula or a lookup table that references number of contributing joints to a weight value between 0.0 and 1.0.

Although derivatives of joint positions can be used to determine the weight for a frame of the target performance, other measurements can also contribute to the weight. For example, distances between specific joints can be computed for each frame and tracked across frames, and zero-derivative measurements can contribute to the weight. For example, the distance between wrist joints may be measured for each frame. Frames in which the distance experiences a zero derivative would increase the frame's weight by substituting its previous weight into (1+w0)/2 or looking up a value from a table as above.

Other measurements can also contribute to the weight, such as zero-derivative measurements of the overall bounding rectangle of the skeleton along x, y, or z axes in a camera-centered coordinate system or x, y, or z axes in a skeleton-based coordinate system.

However the target weight is computed, the final weight assigned to each target frame is used in the same way as described previously.

In a preferred implementation, a subset of the frames of the target performance are marked as keyframes, each keyframe representing a specific frame in the target performance with which the input performance should be compared. The target performance—comprising an entire dance routine—is aligned with a timeline, the performance being divided into moves, each move having a start time and an end time relative to the beginning of the dance, measured in units of measures/beats/ticks. Alternatively, each move can have a start time and a duration.

All times and durations are typically measured in units of measures, beats, and ticks, but alternatively can be measured in units of seconds. Times are measured relative to the beginning of the dance, but alternative reference points are possible, such as the end of the dance, the start of the previous move, the end of the previous move, or any other moment in time within the timeline.

Each keyframe includes a time offset relative to the beginning of the move. In addition to timing information, each keyframe can include weighting information for x, y, and z axes relative to the camera (explained below). Additionally or alternatively, each keyframe can include weighting information for x, y, and z axes relative to the entire skeleton in the target performance, or weighting information for x, y, and z axes relative to each "body zone" (limb-centered coordinate systems) in the target performance (explained below). In one implementation, relaxing the scoring is achieved by unevenly weighting the contributions of the x, y, and z axes to the Euclidean distance measurement above, where x, y, and z are taken to be in the left arm coordinate systems, right arm coordinate system, left leg coordinate system, or left leg coordinate system.

In addition to weighting information for the axes, the keyframe also includes weights for different bone groups themselves to emphasize performing a particular motion, e.g., moving the user's arms during the "shopping cart," or deemphasizing other motions one, e.g., ignoring or forgiving poor leg position during "the shopping cart".

Keyframes are placed wherever necessary on the timeline to capture the most important poses in the dance sequence. Often, keyframes are placed at eighth-note boundaries, but they may be spaced irregularly depending on the dance or move to be tested.

In a preferred embodiment, the target performance is expressed as mocap data associated with a Milo file. The Milo file contains a timeline and allows for events, tags, or labels to trigger events in the game. Advantageously, the target performance is aligned to the timeline. The Milo file is also typically associated with a music track, which is also aligned to the timeline. This allows the developer to assign events to certain portions of the music track. The Milo file also has instructional timelines for providing audio cues to the user (explained below). Another benefit of using the Milo file is the ability to mark parts of the timeline, and therefore parts of the target performance, as keyframes. Keyframes are placed at specific measures or beats on the timeline and represent times to test user input.

Comparing the input performance to the target performance input at a particular keyframe may be accomplished in several ways. In one embodiment, each keyframe has a time window associated with it, beginning before the keyframe and extending beyond it. The time window is typically symmetrical around the time of the keyframe, but may be adjusted for a longer intro if a move is difficult to get into or a longer outro if the move is harder to get out of. The time window is typically of a fixed width in seconds. Alternatively, the time window can be expressed as fixed width in a variable unit of time such as beats, so that the window expands and contracts as the dance tempo slows down or speeds up, respectively.

Figure 2A:
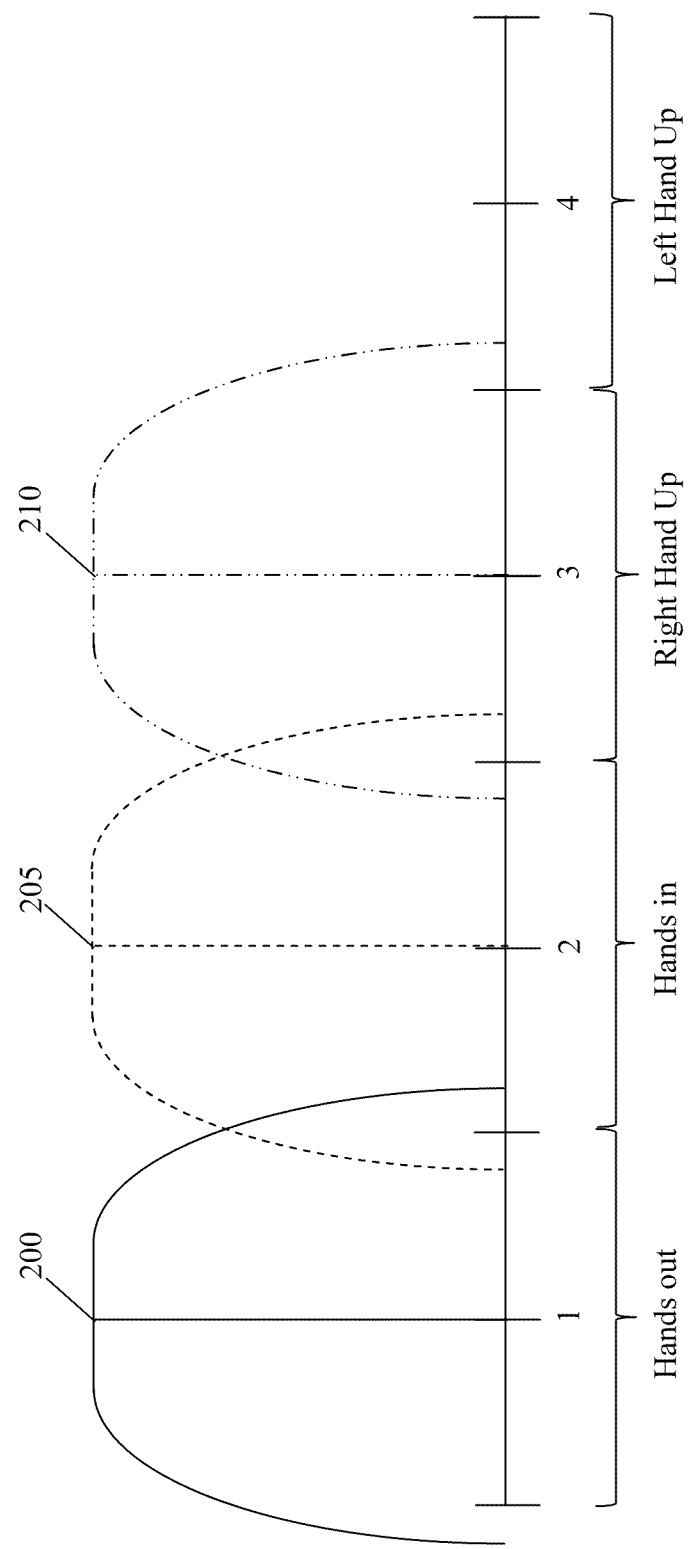
FIG. 2A shows a series of movements spread over four beats that begin a representative dance move.

FIG. 2A provides an illustrative example. FIG. 2A shows a series of movements spread over four beats that begin a move called "Push It." The first beat is a move marked "hands out", the second is a move marked "hands in," the third is a "right hand up", and the fourth is "left hand up" move. In FIG. 2A, three keyframe windows are displayed, each centering on a beat: the first keyframe 200 is for the "Hands out" move at beat 1, the second keyframe 205 is for the "Hands in" move on beat 2, and the third 210 is for the "Right hand up" move on beat 3. The user's input, sampled a certain number of times per second, e.g., 30, is examined to determine if it matches the target performance. For example, on beat 1 (and for a period before and after beat 1 illustrated by the umbrella around 200) the user's input is sampled to determine if, in this case, the user's hands are stretched out in front of him in a way that matches the target input which is based on the mocap performance. Then, on beat 2 (and before and after), the user's input is sampled to determine if it matches the target performance where the user's hands are pulled back in. The windows around each keyframe are to allow for variation in time for the user to complete the move. Variation is allowed for in both time and positional displacement because rarely will the user have their limbs exactly in the expected position at exactly the right time. Additionally, as stated above, some leeway is provided because the camera is an inherently noisy input.

Allowing for Variation in Time

Referring to FIG. 2B, if any of the user's inputs match the target performance within a certain inner time window around the keyframe, e.g., in the range $d_{-inner}$ to $d_{+inner}$, the user is given full score for performing that portion of the move that aligns with that keyframe (+/− to allow for the user to reach the move early or late, and the allowances either before or after are not necessarily symmetrical). This is accomplished by examining each frame of input during the window and selecting the closest match.

Between an inner time window and an outer time window, e.g., in the range $d_{-outer}$ to $d_{-inner}$ and the range $d_{+inner}$ to $d_{+outer}$, a score is still given for performing the move, but the score for that performance is reduced as the temporal "distance" outside the inner window increases. Outside the outer windows, i.e., before $d_{-outer}$ and after $d_{+outer}$, respectively, no score (or a score of zero) is given for performing the move because the user is just too early or too late. The fall off function for the score during the periods of $d_{-outer}$ to $d_{-inner}$ and $d_{+inner}$ to $d_{+outer}$ is typically a variation of $1-x^2$. This yields a parabolic shape that starts from 0 and builds to 1 between $d_{-outer}$ and $d_{-inner}$, and then falls from 1 to 0 between $d_{+inner}$ to $d_{+outer}$. More specifically, in one embodiment, the scoring curve is assembled piecewise:

For frames before $d_{-outer}$, $y(x)=0$.
For frames between $d_{-outer}$ and $d_{-inner}$:

$$y(x) = 1 - \left(\frac{x - x_0 + d_{-inner}}{d_{-outer} - d_{-inner}}\right)^2.$$

For frames between $d_{-inner}$ and $d_{+inner}$ (including $x_0$), $y(x)=1$.
For frames between $d_{+inner}$ and $d_{+outer}$:

$$y(x) = 1 - \left(\frac{x - x_0 - d_{+inner}}{d_{+outer} - d_{+inner}}\right)^2$$

For frames after $d_{+outer}$: $y(x)=0$.

But other variations are possible as well, e.g., a linear function, a constant, a parabolic function, a square-root, 1/x, 1/(x") (e.g., inverse square, inverse cube, etc.), polynomial, exponential, logarithmic, hyperbolic, Gaussian, sine, cosine, tangent, or any combination or piecewise combination thereof.

Beneficially, in some embodiments, as shown in FIG. 2A, the windows for keyframes can overlap, e.g., keyframe 205 overlaps 200. In these cases, an input frame in the overlapping area is scored against both keyframes. The maximum score of all input frames that are scored against a given keyframe is assigned as the score for that keyframe. Any keyframe that the user can match, i.e., that his input falls within an umbrella for, is considered an "active keyframe" for that input frame.

Allowing for Variation in Position

As discussed above, the user's positional success is determined based on comparing the normalized input performance to the normalized target performance. When comparing the input performance to a keyframe (again, preferably done for each sampling of the input performance), the aggregate distance is taken between the two to determine how close the normalized input performance is to the normalized target performance of the keyframe. This can be done for the whole skeleton of the target performance or can be done on a limb by limb basis. Distances are calculated as the Euclidean distance between the normalized input performance's joint position in the input frame and the normalized target performance's joint position in the keyframe.

Figure 3A:
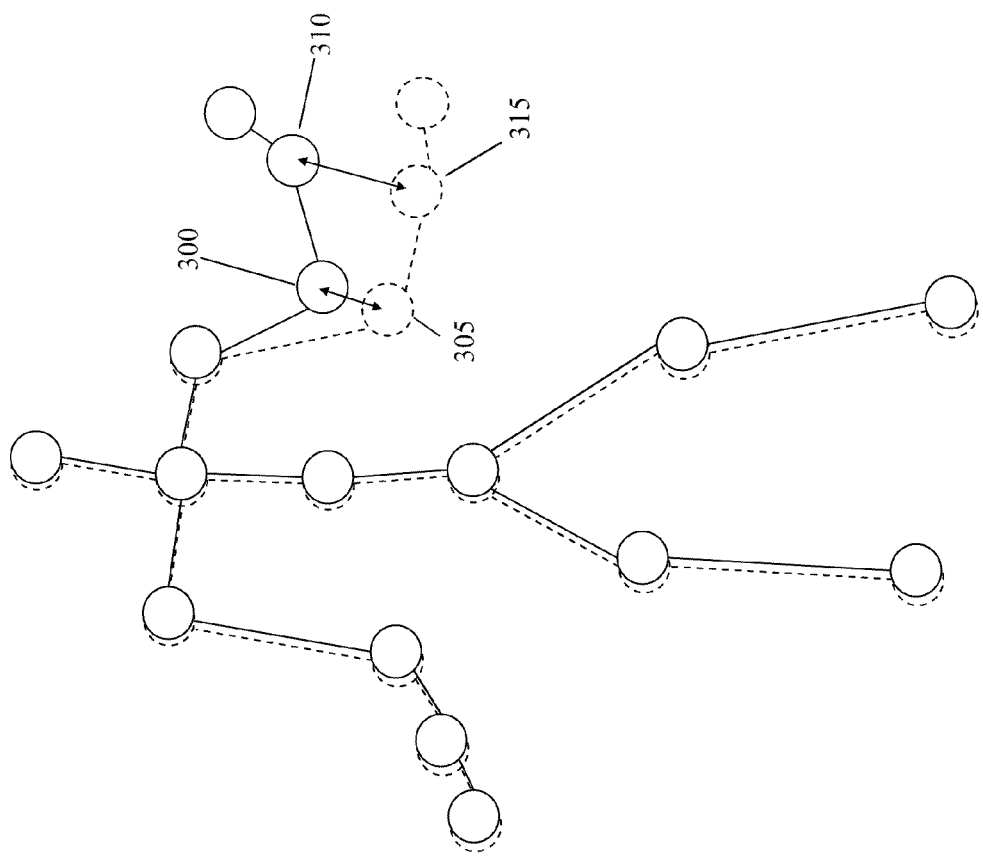
FIG. 3A shows a distance calculation between the target performance skeleton (shown in outline) and the user's input (shown solid)

FIG. 3A shows a distance determination between the target performance skeleton (shown in outline) and the user's input (shown solid). The distance between the user's elbow joint 300 and the target performance skeleton's elbow 305 is determined, reflecting the error the user is committing in terms of positioning his limb. If a filter is just testing elbow position, the analysis stops with comparing 300 and 305. If the filter also tests wrist position, the distance is determined between the user's wrist position 310 and the target performance skeleton's wrist position 315. As shown in FIG. 3A, the user's elbow position is only slightly off the target performance's elbow, whereas the user's wrist significantly out of position. These differences are then used to determine how well the user is satisfying the filter. Although arms are shown in FIG. 3A, differences between the user's leg and the target performance's leg are determined similarly.

For hips, hip velocity is a vector from the hip position in the previous keyframe to the hip position in the current keyframe. The vector is divided by the amount of time elapsed between the keyframes. To normalize the hip velocity, the velocity vector is then divided by the length of the spine. Then the resulting vector is then used for Euclidean comparison similar to that described with respect to arms and legs. Advantageously, dividing by the length of the spine normalizes the velocity measurement to account for the size of the user, e.g., a child needs to displace his hips a smaller amount than a taller adult, in order to receive the same score.

In some embodiments, the total skeleton score is an aggregate (e.g., sum) of five different scores, i.e., left arm score, right arm score, left leg score, right leg score, and hip velocity score. These are each made up of score calculations themselves for the individual joints and represent how well the user performed the move for each "body zone". For example, the left arm score is an aggregate of the wrist score and elbow score, and the leg score is an aggregate of the knee score and ankle score. Beneficially, displacement of the body, measured by hip velocity, may also be incorporated into the score calculation. Also beneficially, contributions to the aggregate skeleton score by the aggregate body zone score may be weighted per keyframe to enhance the contribution from zones that are more important to executing the keyframe pose. For example, if the left arm is most important to a particular pose, the weight of its contribution to the score can be increased, or contributions of other body zones' scores can be decreased, or some combination thereof. Beneficially, contributions to aggregate body zone score by individual joint score may be weighted per keyframe, to enhance contribution from individual joint positions that are more important to executing the keyframe pose. For example, the elbow is more important than the wrist for the "Funky Chicken" pose, so the weight of the elbow joint's score can be increased, or the weight of the wrist joint score can be decreased, or some combination thereof. Typically though, if a user's joint or body zone is in the correct position, the user will be given full credit for the correct position and the weight of that limb's contribution will not be decreased.

Figure 3B:
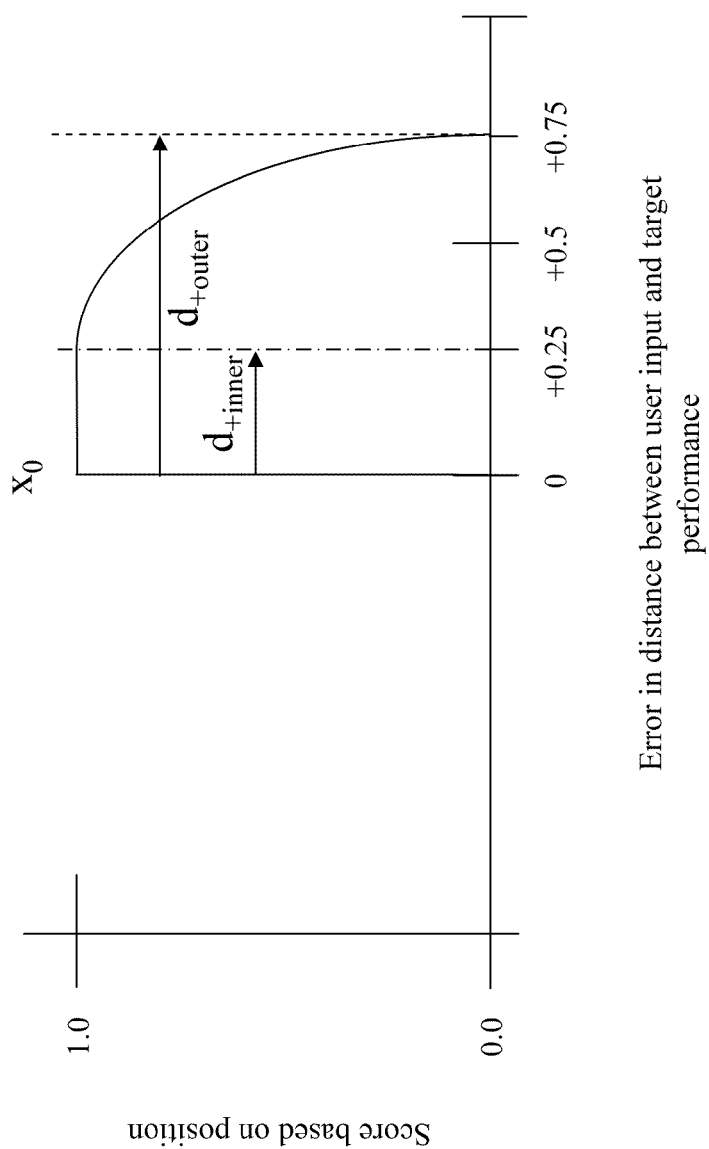
FIG. 3B shows a window of acceptable error for position when performing a move.

Referring now to FIG. 3B, like timing, there is a window of acceptable error for position. The error for position is determined based on the distance between the normalized input joint position and the normalized target joint position. If the distance is below a threshold (using the same convention as timing: $d_{+inner}$), e.g., 0.25 or less, the error is considered zero for that joint, so input frame receives a 100% score. If the distance is greater than the $d_{+inner}$, the score will fall off quickly as the distance increases to some outer boundary, $d_{+outer}$. Between $d_{+inner}$ and $d_{+outer}$, the input frame still receives some score, but the further the scored limb or joint is from the target position, i.e., the closer it is to $d_{+outer}$, the less score the user receives. Once the joint's position is so far off position that the distance falls outside $d_{+outer}$, the user receives no score (or zero score) for that frame. Unlike timing errors, which may represent times before or after the keyframe and may therefore be positive or negative, distances are always positive.

The score of an input from for a particular keyframe is determined aggregating the positional score and the timing score. In a preferred embodiment, the positional score for an input frame compared against a particular keyframe is then multiplied by the timing score for that input frame to produce an overall score for the input frame for that keyframe. If the score for an particular input frame is greater than the score of any other input frame for a particular keyframe, i.e., that input frame is the "closest" to the keyframe in terms of the combination of weighted timing and position scores, that score is the assigned score for that keyframe and is used to determine the player's overall score for the move. When the user has satisfied a certain percentage of the filters for the bar, e.g., 80%, the user is considered to have successfully performed the entire move for that bar (because it is unlikely that a user will satisfy 100% of the filters). In implementations with graduated feedback (discussed below), completing 80% may be "Perfect," 60% may be "Good," 40% may be "Fair," and 20% may be "Poor."

Compensating for the Limits of the Camera and User

The present invention overcomes one limitation of the user's ability to parse input presented on the display. Certain movements of the on-screen dancer along the z axis (into and out of the screen) are difficult for the user to parse precisely. For example, when the avatar's arm is held out directly in front of its body, and the wrist is then moved closer to or further from the avatar's body along the z axis, the degree of that motion is hard to see from the user's perspective. This is problematic for a dance game because the game may require the user to replicate this movement, and the user cannot easily judge the distance well enough to execute the movement well.

In one implementation of the present invention, this is overcome by unevenly weighting the contributions of the x, y, and z axes to the Euclidean distance measurement above. This has the effect of "flattening" the error space in a dimension if that dimension is difficult to detect visually. This is typically expressed as a front-to-back relaxing of the scoring along the z axis, because movements in a camera-based system towards the camera (forward) or away from the camera (back) are the ones being compensated for. The relaxation of scoring along an axis is automatically provided by the invention by reducing the contribution along that axis by a coefficient in the Euclidean distance calculation. The developer may also specify, for a given keyframe, coefficients for one or more axis to reduce or enhance the contribution of error along that axis to the final score.

The present invention also overcomes the limitation caused by occlusion that is inherent to any camera-based input. When a dance move requires one or more parts of the body to be moved behind other parts of the body, the occlusion of the joints makes it very difficult to determine their positions with accuracy. This is problematic because joints can be occluded in normal dance moves, such as when an arm goes behind the back, or when a move requires the user to turn sideways to the camera.

The present invention additionally overcomes a limitation with a user attempting to reproduce the target performance when the mocap for the target performance was executed by a professional dancer who is very flexible. This is problematic because a professional dancer can place his body in positions that cannot be achieved by a casual user, and therefore the user cannot score well on the move. For example, a professional dancer can touch his elbows together behind his back, but it would be unfair to penalize a typical user for this lack of flexibility, so the scoring for these moves can be relaxed.

In one implementation of the present invention, relaxing the scoring is achieved by unevenly weighting the contributions of the x, y, and z axes to the Euclidean distance measurement above, where x, y, and z are taken to be in the mocap performer's frame of reference. The frame of reference of the mocap skeleton is computed per-frame as a rotation about the z axis of the camera's frame of reference. The angle of rotation can be computed by finding the plane created by the shoulders and the center of the pelvis, finding the forward-facing normal, and rotating the frame of reference through the angle from the view plane normal to the forward-facing normal. Alternatively, the frame of reference of the mocap skeleton can be computed by starting with the plane created by both hips and the head.

In one implementation, relaxing the scoring is achieved by unevenly weighting the contributions of the x, y, and z axes to the Euclidean distance measurement above, where x, y, and z are taken to be in the left arm coordinate systems, right arm coordinate system, left leg coordinate system, or left leg coordinate system.

One the frame of reference has been rotated, relaxing scoring along an axis has the effect of "flattening" the error space in a dimension. For example, if a move requires the elbows to be pulled back very far, relaxing scoring along the z axis in the frame of reference of the mocap performer will reduce the distance the elbows need to be pulled back in order to achieve a good score. The relaxation of scoring along an axis is specified with the keyframe information as coefficients for the Euclidean distance calculation.

Beneficially, the game developer can manually weight certain moves to be more forgiving along any axis simply because a move is hard to perform.

In some implementations, weighting is based on the "confidence" that the camera system may provide for detecting a joint's position. For example, in some versions of Project Natal, the camera system provides "tracked" positional information in the form of a position for a joint and a confidence level that the position is correct. When the joint is off-screen, Natal also provides an "inferred" position. When a joint's position is inferred, e.g., when the joint is clipped or occluded, neighboring joints can be examined to better assess where the inferred joint is. For example, if an elbow is raised above the user's ear, there are only a few possible locations of the user's wrist, e.g., straight up above the elbow, down near the user's chin, or somewhere in between. In these scenarios, because the object of the game is to be fun, the maximum positional window, e.g., 0 to $d_{+outer}$, is widened so that the filtering is looser to allow for greater variation in positional differences. Additionally, the inner window of "perfect" position, zero to $d_{+inner}$, may also be widened.

In some embodiments, the invention will suspend the game if too much of the skeleton is occluded or off-screen for more than a threshold amount of time, e.g., 10 second, or 6 beats, rather than continuing to reward the user for incorrect positioning.

To assist the user in completing moves correctly, per-limb feedback is given to the user when performing a move. In some embodiments, if the user is not satisfying a filter for a limb, the game renders a red outline around the on-screen dancer's corresponding limb to demonstrate to the user where they need to make an adjustment. In some embodiments, the per-limb feedback is on the mirror-image limb from the limb that is not satisfying the filter. For example, if the user is satisfying the filter for both feet, the hips, and the left arm, but not satisfying the filter for the right arm, the game renders a red outline around the on-screen dancer's left arm. This indicates to the user that his right arm is not correct, since the user is facing the on-screen dancer and mimicking the on-screen dancer in mirror image.

Other per-limb feedback is also possible. In some embodiments, an indicator such as a "phantom" limb is drawn in the target location. Alternatively or additionally, an indicator is anchored on the errant limb and its direction and length are based on the direction and degree of error in the user's limb position. For example, if the user's wrist is below the target location, the game draws an arrow starting from where the user's wrist is located in the input performance and ending where the on-screen dancer's wrist is in the target performance. Alternatively, in embodiments where a representation of what the user is doing is displayed on-screen, the arrow is drawn starting from the user representation's wrist. In some embodiments, the indicator persists until the user satisfies the filters for the target performance's arms. In some embodiments, the intensity, geometry, material, or color characteristic of the indicator may be changed based on the degree of error for that limb. For example, the color of the indicator may become a more saturated red if the error for a limb becomes greater. Other highlighting may also be used, as may verbal cues such as "get your <limbs> movin'" where <limbs> is any body zone that is not satisfying the filter.

In some embodiments, there is an additional indicator showing how well the user is cumulatively satisfying all filters in a move, such as a ring of concentric circles under the on-screen dancer's feet. If the user has satisfied a certain percentage of the filters, e.g., 20%, the inner ring of circles is illuminated. When the user successfully performs the next threshold percentage of filters, e.g., 40%, the next set of rings is illuminated. This is repeated such that when the user has successfully performed the entire move, the outermost set of rings is illuminated. A notable side effect is that as the user is satisfying filters, the ring grows under the on-screen dancer's feet. In some embodiments, the success indicator moves with the on-screen dancer, e.g., is based on the position of the mid-point of the pelvis of the skeleton of the target performance, so that the user does not have to look at a different part of the screen to determine how well he is performing. While described in terms of discrete rings, the effect can occur continuously. Also, other shapes or graphical effects may be used, e.g., a meter indicating how many filters are satisfied, and bigger and bigger explosions or fireworks may be displayed to indicate the user satisfying more and more filters. Beneficially, in some embodiments, a qualitative evaluation is also displayed, e.g., good!, great!, or awesome!

Beneficially, the setting of the game may react to changes in the user's performance. For example, as the user is satisfying filters, a crowd of spectators may begin to circle or gather near the on-screen dancer. Or the venue in which the on-screen dancer is performing may become brighter, more colorful, or transform into a more spectacular, stimulating, or elegant venue. Correspondingly, if the user is performing poorly, on screen crowds may dissolve and walk away or the venue may become darker, less colorful, or transform into a less spectacular, stimulating, or elegant venue. Changes in venue and setting can based on the consecutive number of moves completed, e.g., after five successful moves the venue and dancers on screen change to an "improved mode." After ten successful moves the venue and dancers may change to a "more improved mode" and so forth. Changes in venue and setting can also be based on the overall score of the input performance, or on the overall score of the input performance as compared to an average performance.

Dance Training

In some implementations, there is a trainer mode to assist the user in learning a dance. In trainer mode, a dance move is demonstrated using the on-screen dancer and audible cues and no score is kept. The user is then expected to mimic the on-screen dancer's movements. If the user performs the move correctly, an indicator indicates he has performed the move correctly, the next move is demonstrated, and the user may continue practicing. If the user does not perform the move correctly, the move is repeated and the user must keep trying to perform the move before he is allowed to continue.

When the user does not perform the movement correctly, additional instruction is provided. In some embodiments, a verb timeline, normal_instructions, runs simultaneously with the target performance, and has multiple verb labels indicated on it. The verb labels refer to pre-recorded audio samples that have both waveform data and offsets. The offset indicates where the stress—or important accent—is located in the waveform data. For example, if the wave form data represents the spoken word "together," the offset indicates the first "e" sound such that playback of "together" begins before the point of the verb label on the timeline and the playback of the "e" sound aligns with the point of the verb label on the timeline. This allows the developer to specify which point on the timeline a particular syllable of the audible cue falls on. As the target performance is displayed, the waveform data is played back according to the positions of the verb labels and the offsets to provide instruction to the user that is synchronized with the movement of the on-screen dancer.

In some embodiments, a second verb timeline, slow_instructions, runs simultaneously with the target performance and may have a different or more detailed set of verb labels indicated on it. These verb labels also refer to pre-recorded audio samples with waveform data and offsets, similar to those described above. When the user cannot successfully perform a particular move after a threshold number of attempts, the game slows down and the slow_instructions timeline is used to provide additional, more detailed instruction to the user. For example, on the normal_instructions timeline, there may be a verb label that refers to an audio cue of "step and clap." On the slow_instructions timeline, this may be represented by three labels, "left foot out," "right foot together," and "clap." When the game is slowed down, rather than referencing verb labels on the normal_instructions timeline to trigger audio cues, the game references the verb labels on slow_instructions timeline. Beneficially, when the game is slowed down, there is enough time between body movements that the additional instructions can be played. In some implementations, the slowed down audible cues are stored in a different file or a different audio track than the normal speed audible cues. When the user has successfully reproduced the move, the game is sped back up and the normal_instructions timeline is used, or alternatively, the additional instructions are muted or not played.

Fitness Mode

In some embodiments, there is a calorie counter displayed on the display during the dance game to encourage users to dance. As the user dances, the calorie counter is incremented based on the Metabolic Equivalent of Task ("MET", and generally equivalent to one kcal/kg/hour) value of what the user is doing. As an example, sitting on the couch has a MET value of 1. Dancing and most low impact aerobics have a MET value of approximately 5. High impact aerobics has a MET value of 7. To determine the MET for a frame of input skeleton data, the joint velocities for all joints on the user's input skeleton are summed. To determine a joint's velocity, the joint's position (in three dimensional space) in the previous frame is subtracted from its position in the current frame. This yields a vector. The vector is divided by the elapsed time between the previous frame and the current frame. The length of the resulting vector is the velocity of that joint.

Once the sum is determined, it is exponentially smoothed to reduce transient noise. The result is a mapped to a MET scale of 1 to 7 with, in some embodiments, a sum of 0 mapping to 1 and a sum of 40 mapping to 7, with 1 representing no movement and 7 being a large or vigorous movement. Beneficially, any sum less than five can map to 1 to account for the noise inherent in the input. The mapping can be linear, piecewise linear, or any interpolation function. Using the MET value, and knowing the user's body weight (which can be input via a menu, or can be inferred based on the camera's input and a body/mass calculation), calories burned can be estimated.

METs are converted to calories-consumed-per-second using the equation of (METs*body weight in kilograms)/seconds in an hour=calories/second. This value can then be displayed on the screen, or summed over time to produce a value displayed on the screen for total calories. The value for calories/second or total calories can stored as a "high score" and, in some embodiments, can be used to increase or decrease the tempo of a song or the difficulty of a series of moves. Advantageously, this allows the user to track total calories burned, average rate burned, and other statistics over time.

Reusing Elements of a Mocap Performance

Figure 4:
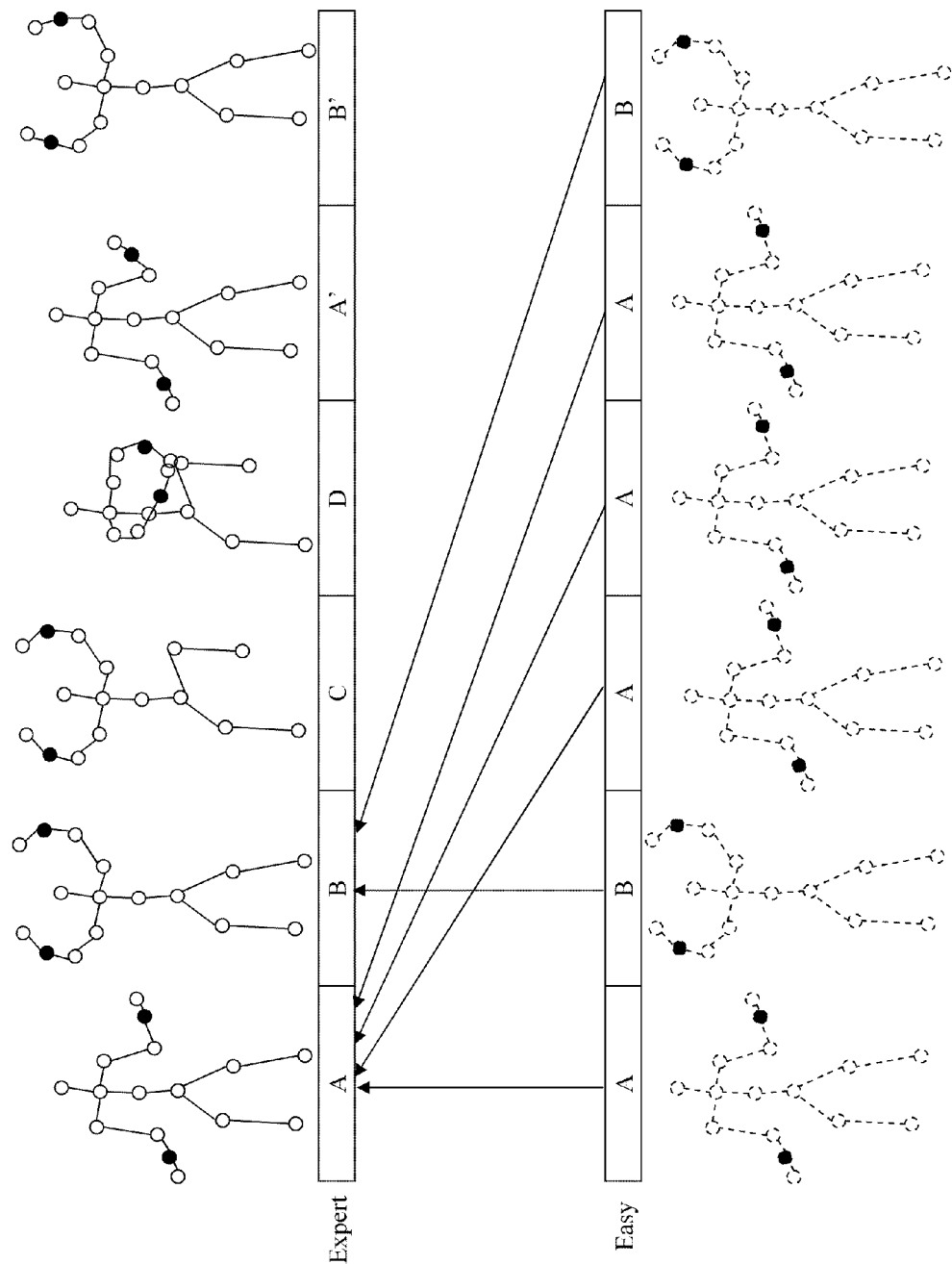
FIG. 4 depicts how a mocap for a dance routine may be refactored to create a dance routine of an easier difficulty.

In some embodiments of the dance game, the most difficult or complex target performance is recorded as one linear mocap session and only parts of the recorded performance are used to simulate easier versions of the performance. For example, in FIG. 4, the most difficult or "expert" dance routine comprises a series of movements following pattern of A, B, C, D, A, B, D, C. In some embodiments, these moves are marked on the expert timeline using "move labels," which each denote the name of a move animation and where in the timeline the move animation begins. In other embodiments, these moves are marked on a timeline that parallels the expert timeline, called "anim_clip_annotations." Rather than capture multiple target performances for each difficulty level, e.g., a dance with the previous pattern for "expert," and progressively simpler sequences for "hard," "medium," and "easy," the game can re-use the motion capture recorded for expert to simulate a pattern for any of these difficulty levels by referring to the move labels on the expert timeline. For example, given the expert sequence above, the easy sequence might be A, B, A, A, A, B, A, A. In other words, for the easy routine, a repetition of the A move replaces both the C and D moves.

The easier routines can be created programmatically, e.g., the game determines how often to repeat a movement based on a difficulty value for the move, favoring easier moves for easier difficulty levels. The easier routines can also be authored by the game developer by creating an "easy" timeline and referencing the move labels on expert track. An example of this is the "easy" track in FIG. 4, where the A sections reference the A move in the expert track and the B sections reference the B move. C and D sections, that involve a more complicated knee raise (C) and knee slap (D), are omitted from "Easy" so the user only needs to repeat the "arms out" move of A or "arms up" move of B.

Reusing moves allows space savings on the storage medium (only one target performance needs to be stored) and it allows the game developer to later change the performances of the other difficulties after the game is released if it is later determined that the performance for a difficulty setting is too hard or too easy or is boring. Since the expert performance is linear, each A section in expert will be slightly different because the mocap actor likely did not have his limbs in the exact same position every time. Examples of this are A' and B' where the skeletons are similar to A and B respectively, but the arm positions are slightly different. To make an easier difficulty target performance, the A move that is repeated in the easier difficulties can be A or it can be A', or some combination. In some embodiments, a move that is repeated in an easier difficulty uses the most recent version of that move in the timeline. In some embodiments, a move that is repeated in an easier difficulty uses the earliest version of that move that appeared in the routine. Beneficially, the animations from the expert track can also be reused when creating the "easy" performance.

A sequence of moves for an easier routine may correspond to a sequence of moves in the original expert linear mocap such that a specific pattern of moves is present in both (although they may not correspond on the timeline). In this case, the sequence of moves may be copied from the expert performance into the desired position in the easier routine's timeline. But if a sequence of moves for an easier routine does not correspond to a sequence of moves in the original expert linear mocap, individual moves may be separately copied from the expert performance into the desired position in the easier routine's timeline. Beneficially, copying larger sequences of moves from the linear mocap produces sequences with fewer animation artifacts.

Animation Blending

When moves or sequences of moves are used in easier difficulties, the moves can abut other moves that were not adjacent in the linear mocap. The transitions in the move animations between these moves can be jarring, since the skeleton in the last frame of one move can be in a completely different pose than the first frame of the next move, which would produce a sudden, nonlinear animation. Animation blending can be used to transition smoothly from the end of one move to the beginning of the next move in the sequence, if the two moves were not adjacent in the linear mocap. Using the example above of an expert performance following the pattern of A, B, C, D, A, B, D, C, when creating the easier difficulty performance, there may be a pattern of A, A that is not part of the linear mocap. Animation blending is used to transition from the end of the first A animation to the beginning of the same A animation to produce an A, A pattern. In one embodiment, the last beat of the move before an animation transition is blended with the beat before the beginning of the next move. In the example of the A, A pattern, the last beat of the A move is blended with the beat before the A move for the duration of one beat. Then the animation continues with the first beat of the second A move.

In some cases, the animation blending technique described above produces animations that are still jarring. This is often due to the large differences between the pose at the end of one move and the pose at the beginning of the next move, that can't be overcome through simple blending. In these cases, the animation can appear to jerk from one position to another during the transition, or to move in a way that's physically impossible. In some embodiments, additional mocap is recorded to produce bridge animation segments. A bridge animation segment is designed to make the transition between two other animations smooth. For example, using the example above, if the end of the A move was a very different pose than the beginning of the A move, a simple animation blend might produce a poor result. An A, A bridge animation segment would be recorded, wherein the actor would actually perform the transition from the end of the A move to the beginning of the A move. In one embodiment, the bridge animation segment is three beats long. The next-to-last beat of the first A move is blended with the first beat of the bridge animation segment in such a way that contribution from the bridge animation segment is interpolated linearly over the course of the beat from 0% to 100%. The second beat of the bridge animation segment is played without blending, then the first beat of the second A move is blended with the third beat of the bridge animation segment in such a way that contribution from the bridge animation segment is interpolated linearly over the course of the beat from 100% to 0%.

The bridge animation segment may be any number of beats long, for example two beats, and the blending can also be done over the course of any number of beats, for example two beats. The interpolation may be done in a way that is not linear, such as parabolic, inverse-squared, etc.

In some embodiments, a table is provided that is keyed by the start and end move labels associated with two animations that may abut. If a bridge animation segment is required to produce a smooth transition between the associated animations, the table will contain an entry indicating the bridge animation segment that should be used. This table is consulted for all pairs of animations that are displayed.

Beneficially, the move animations and the results of the animation blending, e.g., from A to A, or from prior move to first A or from second A to next move, can be used as the target performance, and can therefore be scored similarly to the normal gameplay performance. This provides a fluid game experience and rewards users that accurately mimic the dancer on the screen.

In a training mode, it is often necessary to isolate and repeat a move or series of moves, with a gap in between the repetitions. For example, when demonstrating the A move, it is useful for the game to count in the beat while the animation is in an idling state, then execute the move animation, then return to an idle animation. This can be accomplished in a way that is similar to the bridge animation segments described for gameplay above. In one embodiment, a three beat bridge animation segment of the transition from an idle state to the first beat of a move is recorded as mocap data. This is blended with the idle animation and move animation as described above.

Figure 5:
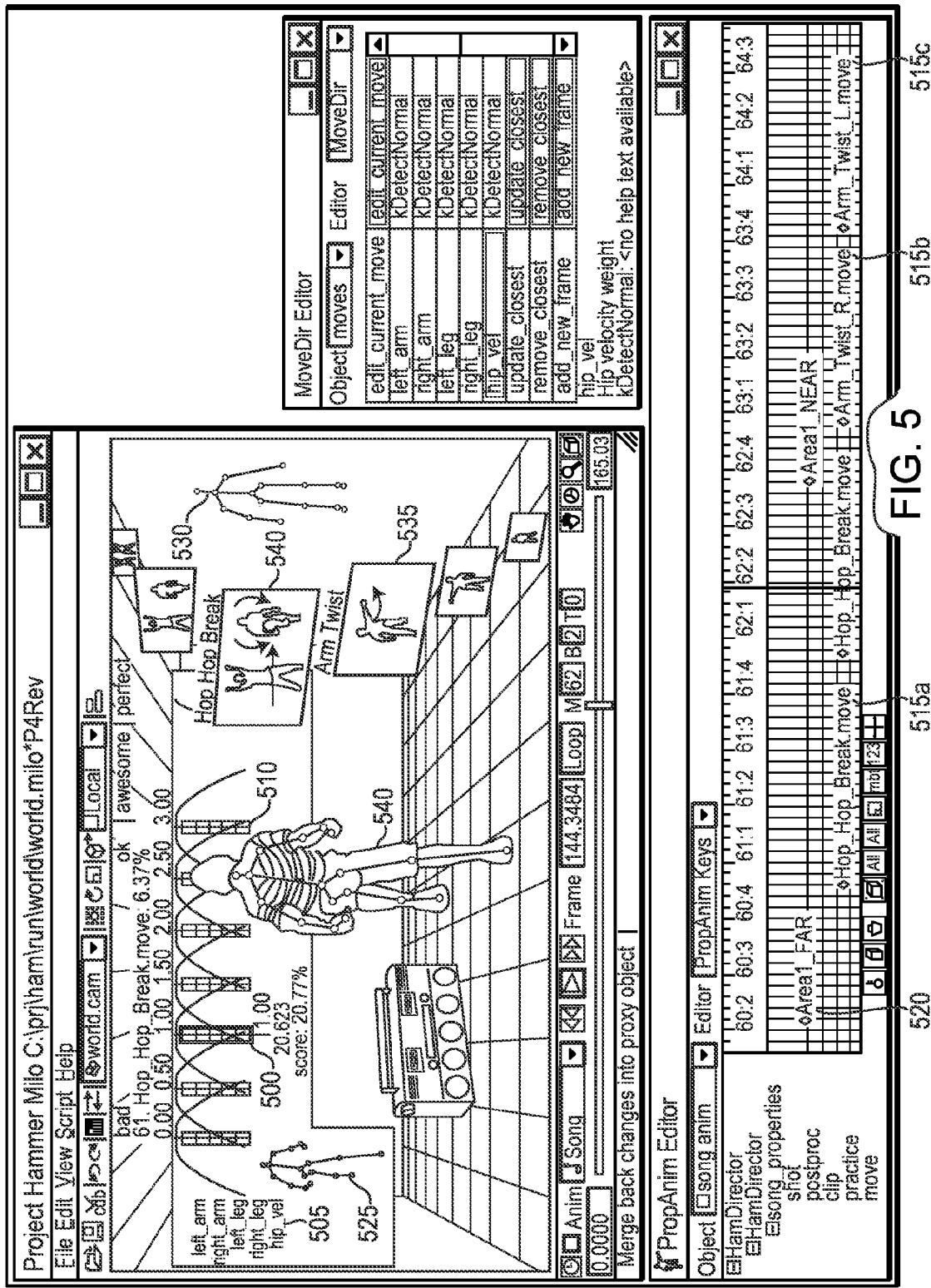
FIG. 5 depicts one embodiment of an authoring system for the dance game.

FIG. 5 shows one embodiment of an authoring system for the dance game. In FIG. 5, the keyframes 500 are depicted with their respective timing umbrellas. Each body zone being tested 505 is shown as having a corresponding portion of the filter to be satisfied (each square in the rectangle 510). The move is completely satisfied when all body zone filters are satisfied (although in some difficulty settings, only a percentage of the body zone filters need to be satisfied). The labels 515a, 515b, 515c (Hip_Hop_Break.move, Arm_Twist_R.move, and Arm_Twist_L.move, respectively) applied to each move are shown on the timeline 520. As stated above, these labels can be reused to create easier dance routines based on the mocap recording. The mocap skeleton 525 shows the desired joint movements, and the input skeleton 530 shows what the user is currently inputting. Look-ahead icons show the user what move is coming next, e.g., Arm Twist, and the current move icon 535 is displayed prominently. The dancer 540 on screen is a representation of what the user is supposed to input and the skeleton of the on-screen dancer 540 resembles that of the mocap skeleton 525.

Determining an Active Player With Multiple Skeletons Available

When more than one player is within the field of view of the camera, the system must determine which player is the active player, and which player is the inactive player, for the purposes of shell navigation and gameplay.

For this discussion of determining the active player, it is useful to define two terms. A skeleton is considered "valid" if it is not sitting and it is facing the camera. Also, "queuing a skeleton for activation" means setting a timer to go off at particular time, at which point the active skeleton is set to be inactive and the queued skeleton is set to be active.

In some embodiments, queuing a skeleton for activation does not set a timer if that skeleton is already queued for activation. In some embodiments, queuing a skeleton for activation does not set a timer if any skeleton is already queued for activation. In some embodiments, the timer is always set for 1 second in the future.

In some embodiments, determining the active player begins when a frame of skeleton data is received by the system. In some embodiments, a frame of skeleton data is received and processed every thirtieth of a second. In each frame, there may be any number of distinct skeletons in the skeleton data. At any time, one of the skeletons in the skeleton data is considered active, and the rest, if any, are considered inactive.

In some embodiments, if the active skeleton is behind—further from the camera than—an inactive skeleton, or the active skeleton is near the edge of the camera's view, then the system can search for an inactive skeleton to activate. In some embodiments, the active skeleton is considered near the edge of the camera's view if its centerline is in the left or right fifth of the camera's view. If there is an inactive skeleton nearer to the center of the camera's view than the active skeleton, the inactive skeleton can be queued for activation.

In some embodiments, if an inactive skeleton that is queued for activation is not present in the current frame, or is not valid, or is crossing its arms, or is behind the active skeleton, the queued activation of that skeleton is cancelled. In some of these embodiments, the queued activation of the inactive skeleton is not cancelled if the active skeleton is near the edge of the camera's view.

In some embodiments, if the active skeleton is not in the frame, or if the active skeleton is invalid, but there is at least one inactive skeleton, the system immediately activates one of the inactive skeletons.

In some embodiments, if an inactive skeleton's hand is raised and the active skeleton's hand is not raised, the inactive skeleton is queued for activation or scoring for dancing. Beneficially, this allows a user to express intent to control the shell or have their performance be the one that is graded by raising their hand.

Multi-Player Modes—Animation

A dance game can be more satisfying if it provides multi-player competitive or cooperative game modes. One difficulty that arises is that the original song and the choreography for the song may not be balanced such that two players can have equal opportunities to contribute to their competing or combined scores (for competitive and cooperative modes, respectively). In addition, the song may be too short to give either player sufficient opportunity to perform for a satisfying duration.

In one embodiment, the invention addresses these shortcomings by artificially extending the song and its choreography by looping back to previous parts of the song to give multiple players an opportunity to dance the same section. Beneficially, this provides the same potential scoring for all players in a multi-player mode. Although animation blending in this context is primarily intended for looping back to previous parts of a song, the mechanism applies equally well to any non-contiguous jump between points in the song, or jumps between jumps points in more than one song.

In one embodiment, a section that is to be repeated in multi-player mode is indicated in a MIDI file, in a track called multiplayer_markers, aligned with the audio timeline. Alternatively, the markers can be located in the same MIDI track as other MIDI data, or can be indicated across multiple MIDI files, in respective tracks called multiplayer_markers, or can be located in the same MIDI track as other MIDI data, spread across multiple MIDI files. The section indicators are special multiplayer text events, MP_START and MP_END. During gameplay, when the game time reaches the time of the MP_END text event the first time, the game time jumps to MP_START and the other player begins play. When the game time approaches the time of MP_END the second time, it continues without jumping.

In one embodiment, when the game jumps to a non-contiguous point in the song, for example to the point designated by MP_END, animation blending can be used, as described above for creating easier difficulties, to make the transition less jarring. For example, if it is determined that a single section should be repeated, the animation of the last beat of the section can be blended with the animation the beat before the beginning of the first beat of the section. The animation blending can take place over two beats, or it can extend over multiple beats. In all cases, the animation for the end of the section is blended with the animation before the beginning of the section such that the blend begins with 100% contribution from the end of the section and ends with 100% contribution from before the beginning of the section. The interpolation can be linear, or can use any other interpolating function such as polynomial.

As in animation blending for easier difficulties, the blend from the end of a section to the beginning of the section can produce an unrealistic movement. In this case, bridge animation segments can be used, as discussed above regarding producing an easy difficulty.

Multi-Player Modes—Audio

Extending a song by looping back to previous sections brings with it some inherent difficulties in animation. The invention addresses these difficulties using animation blending and bridge animations. Non-contiguous jumps in the timeline of the song, or jumps between songs, also cause difficulties with continuity of the audio track. As with animation, the audio for the end of a section does not always merge smoothly into the audio for a section that is not adjacent in the song's timeline. Jarring discontinuities in the audio track can interfere with the users' enjoyment of multi-player modes. The invention provides seamless audio track transition playback during multi-player modes to address this difficulty. For example, if the audio follows the sequence of sections A, B, C, it may be desirable in a multiplayer mode to loop from the end of the B section back to the beginning of the B section. The invention allows this extension to happen seamlessly.

In one embodiment, a section that is to be repeated in multi-player mode is indicated in a MIDI file in a track called multiplayer_markers, with MP_START and MP_END text events, as described above. In the example above, an MP_START text event in the MIDI file would be aligned with the beginning of the B section, and an MP_END text event would be aligned with the end of the B section, indicating that the entire B section is to be repeated in multi-player mode. Alternatively, a section that is to be repeated in multi-player mode can be indicated across multiple MIDI files, in respective tracks called multiplayer_markers, or can be located in the same MIDI track as other MIDI data, spread across multiple MIDI file.

In one embodiment, when there will be a transition from one part of the song to a non-adjacent part of the song, the audio track for a period of time before the origin of the transition is blended with the audio track for the same duration before the target of the transition, or the audio track for a period of time after the origin of the transition is blended with the audio track for the same duration after the target of the transition, or some combination. This is similar to how animations are blended when producing an easy difficulty. For example, one beat worth of audio before the MP_END event could be blended with one beat worth of audio before the MP_START event, then one beat worth of audio after the MP_END event could be blended with one beat worth of audio after the MP_START event. The blending is done such that at the beginning of the blend, the contribution from the audio before the MP_END event is 100%, and at the end of the blend, the contribution of the audio from after MP_START is 100%. This can be a linear crossfade, or it can use any other interpolating function, such as polynomial.

In some cases, as with animation blending, the result of audio blending is still jarring. This is often due to the discontinuity in the harmonic progression of the song when moving to a different place in the music, or presence or absence of vocal or instrument parts before or after the transition. In some embodiments, as with bridge animation segments, additional audio is recorded to produce waveform data for a bridge audio segment. The bridge audio segment is designed to make the audio transition between two non-adjacent parts of the song sound smooth. Using the example above with sections A, B, and C, if the game will repeat section B, a bridge audio segment can be provided that smoothly transitions from the last part of section B into the first part of section B.

In one embodiment, the waveform data for bridge audio segments are included in one or more additional bridge audio tracks in the multi-track audio data, and the bridge audio tracks are muted unless non-sequential looping is taking place. However, each bridge audio segment could be located in its own file referenced by the game authoring, or all bridge audio segments could be located in a single file, and the offset and duration of each segment of bridge audio in the single file would be stored as unique text events in the MIDI file.

In some embodiments, all bridge audio segments are of a fixed duration in beats, with a fixed number of beats before the transition. In these embodiments, the original song audio is played until a fixed amount of time in beats before the end of the transition. Then the original song audio track or tracks are muted, and the bridge audio segment is played until the transition point. Then the "current time" is moved to the target of the transition and the remainder of the bridge audio segment is played. At this point, the bridge audio track is muted and the original song audio track or tracks are unmuted. For example, all bridge audio segments might be three beats long, with one beat before the transition. Using the example above with sections A, B, and C, if the game will repeat section B, a 3-beat-long bridge audio segment from the end of B to the beginning of B may be provided. One beat before end of B, the original audio tracks are muted and the B-to-B bridge audio segment is played. When the end of B is reached, the current time is moved to the beginning of B, and the bridge audio segment continues playing for two more beats. After two beats, the bridge audio track is muted and the original tracks are unmuted. Beneficially, aligning the audio and changing the current time in this way allows for a single, consistent timeline for audio playback, animation, and other aspects of gameplay. Alternatively, the current time may be changed at the end of the bridge audio segment's playback, and moved directly to two beats after the beginning of B section. This example discusses bridge audio segments that are all 3 beats long, which start playing one beat before the transition, but other embodiments may have bridge audio segments that are all longer or shorter, or that all begin earlier or later with respect to the transition.

In some embodiments, the song audio and bridge audio segments may be muted and unmuted, as described. Alternatively, the song audio and bridge audio segments may be mixed, such as by lowering the normal song audio volume to 10% and playing the bridge audio segment at 90%. It is also possible to cross-fade the song audio and bridge audio segments. For example, the last beat of the B section would start with 100% of the song audio and end with 100% of the bridge audio segment, then the bridge audio segment would play at 100%, then the second beat of the B section would start with 100% of the bridge audio segment and end with 100% of the second beat of the song audio. The interpolation can be linear, but it can also use any other interpolating function, such as polynomial.

In some embodiments, as described above, the bridge audio segments can be of a fixed duration in beats or seconds. In other embodiments, each bridge audio segments can be of different durations. Beneficially, the ability to specify bridge audio segments of different durations makes it easier to provide a musically seamless transition, using more time if necessary, to achieve the proper harmonic and orchestration transitions, and less if possible, so that the playback departs as little as possible from the original music.

In one embodiment, all the waveform data for bridge audio segments is located on a single bridge audio track, bridge_audio, in the multi-track audio data file. The bridge audio waveform data for a given transition is divided into the sub-segment before the transition and the sub-segment after the transition. The sub-segment before the transition is positioned in the bridge_audio track so that it ends exactly at the transition point, corresponding to the MP_END text event in the associated MIDI file. The sub-segment after the transition is positioned in the bridge_audio track such that it begins exactly at the target of the transition, corresponding to the MP_START text event in the associated MIDI file.

In some embodiments, where the bridge audio segments are of a fixed duration, the beginning and end of the bridge audio segments is implicit in the fixed duration and the fixed amount of time before the transition, as described above.

In the preferred embodiment, the specification of the beginning and end of bridge audio segments is provided in a MIDI file, in the multiplayer_markers track, although the beginning and end of the bridge audio segments could be in their own MIDI track, or in their own MIDI file whose timeline is aligned with the audio timeline. In the multiplayer_markers track, special multiplayer text events, MP_BRIDGE_START and MP_BRIDGE_END, denote the beginning and end of a bridge audio segment. As the game is played in a multi-player mode, when an MP_BRIDGE_START text event is encountered on the timeline of multiplayer_markers, the original audio track or tracks are muted and the bridge_audio track is unmuted. As described above, attenuation of the original track or crossfading with the bridge audio track can be used instead of muting and unmuting. Playback continues until the transition point itself, which is indicated by the MP_END text event. At this point, the "current time" is set to the target of the transition, marked by the MP_START text event, and the bridge audio track continues. When the MIDI MP_BRIDGE_END event is encountered, the original audio track or tracks are unmuted, and the bridge audio track is muted. Note that when the transition is backwards in time, the MP_BRIDGE_END event occurs earlier on the timeline than the MP_BRIDGE_START event, since the current time is modified between them. Beneficially, dividing the bridge audio segments and modifying the current time at the transition point as described allows there to be a single concept of current time for the audio, animation, and gameplay. In other embodiments, the current time is modified only after the playback of the bridge audio segment is complete, and at that point it is set to the location of MP_START plus the length of the second sub-segment of the bridge audio segment. As described above, a section that is to be repeated in multi-player mode also can be indicated across multiple MIDI files, in respective tracks called multiplayer_markers, or can be located in the same MIDI track as other MIDI data, spread across multiple MIDI file.

Additional Variations

The examples given herein of a user satisfying a filter by completing a series of moves can be adapted to satisfy a "mirror mode" as well, where the user provides input that mirrors the target performance, e.g., providing input using a right hand when the target performance uses a left hand, providing right leg input when the target performance uses a left leg, and so forth.

Additionally, where a target performance skeleton is provided, it can be generated beforehand, or can be generated during execution of the game based on the motion capture data.

Any system that can detect movement can be used as long as positions of the scored joints can be determined in either two-dimensional space or three-dimensional space to create or simulate a skeleton. For two-dimensional implementations, scoring is typically adjusted to compare the projection of the target performance and the projection of the input performance onto a plane parallel to the screen. Although the system and technology has been described in terms of a camera input system like Natal, camera systems that utilizes sensors on the user's body, e.g., PLAYSTATION® Move, or systems that use sensors held in the user's hand, e.g., the NINTENDO® Wii, may also be utilized. In those implementations where only hand held sensors are utilized by the user, testing for leg input is ignored or not performed.

Although the embodiments described herein use dancing as an example, and the performance is typically accompanied by a song, the performance can also be movements that occur on a timeline with no musical accompaniment, e.g., a series of yoga poses, movements in a martial arts kata, or the like.

In some implementations, the mocap data is mapped to a skeleton similar to that used to reflect the user's input. Thus, the mocap data is used to generate an ideal skeleton that represents a performance of the dance routine in a format that is directly comparable to the skeleton representing the user's input. Then, during the game, as the user provides input, the user's skeleton is compared to the ideal skeleton, in effect normalizing the target input (the target performance) and actual inputs (the user's performance) to the same frame of reference, i.e., both performances are expressed in terms of the same skeleton-based technology.

In some embodiments, rather than matching position necessarily within a time window as described above, filter types are predefined and used to test user input. For example, proximity filters tests if a joint in a particular position, or close to a particular other joint, e.g., "are the left wrist and right wrist less than, greater than, or within a delta of a certain distance of one another. Another filter is a displacement filter which tests if a joint has moved a certain distance between times $t_0$ and $t_n$. Another example is the angle filter, which tests if a joint is at a particular angle from the origin. One or more of these filters is then hand-inserted (or "authored") into the timeline and bound to joints such that at a particular time, the condition is tested, e.g., "has the RIGHT WRIST moved from $x_0$ to $x_n$ since I began tracking it?" would be a displacement filter. If the user's wrist had, the filter would be satisfied. Yet another filter is an acceleration filter which tests if a joint or bone has accelerated or decelerated between times $t_0$ and $t_n$. An acceleration filter can also test whether the magnitude of the acceleration matches a predetermined value.

In these embodiments, multiple filters can be overlaid on the timeline, and tested, in effect, simultaneously. An overall score for the frame is determined based on contributions from all of the active filters during a given frame. The filters can output a Boolean, and the score is computed from those. Or—in some implementations—the outputs are continuous, and the aggregate score is computed from those. Similar to the system described above, contributions from each active filter can be weighted differently in their contributions to the score. For Boolean filters, successfully completing 3 out of 5 filters gives the user a score of 0.6. In some implementations, each keyframe comparison gives a percentage credit for the move as a whole being correct. The user's score may be adjusted based on the aggregate score for a keyframe. Or the aggregate score for a keyframe may be quantized into groups, each group being compared to one or more thresholds, each group associated with a score that is added to the user's score. In any of these, if the user achieves a threshold score for a move, where if the user meets or exceeds the threshold, e.g., 80%, the user is considered to have successfully performed the move.

In some embodiments, execution of game software limits the game platform 120 to a particular purpose, e.g., playing the particular game. In these scenarios, the game platform 120 combined with the software, in effect, becomes a particular machine while the software is executing. In some embodiments, though other tasks may be performed while the software is running, execution of the software still limits the game platform 120 and may negatively impact performance of the other tasks. While the game software is executing, the game platform directs output related to the execution of the game software to a display, thereby controlling the operation of the display. The game platform 120 also can receive inputs provided by one or more users, perform operations and calculations on those inputs, and direct the display to depict a representation of the inputs received and other data such as results from the operations and calculations, thereby transforming the input received from the users into a visual representation of the input and/or the visual representation of an effect caused by the user.

The above-described techniques can be implemented in digital electronic circuitry, or in computer hardware, firmware, software, or in combinations of them. The implementation can be as a computer program product, i.e., a computer program tangibly embodied in a machine-readable storage device, for execution by, or to control the operation of, data processing apparatus, e.g., a programmable processor, a computer, a game console, or multiple computers or game consoles. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or game console or on multiple computers or game consoles at one site or distributed across multiple sites and interconnected by a communication network.

Method steps can be performed by one or more programmable processors executing a computer or game program to perform functions of the invention by operating on input data and generating output. Method steps can also be performed by, and apparatus can be implemented as, a game platform such as a dedicated game console, e.g., PLAYSTATION® 2, PLAYSTATION® 3, or PSP® manufactured by Sony Corporation; NINTENDO WII™, NINTENDO DS®, NINTENDO DSi™, or NINTENDO DS LITE™ manufactured by Nintendo Corp.; or XBOX® or XBOX 360® manufactured by Microsoft Corp. or special purpose logic circuitry, e.g., an FPGA (field programmable gate array) or an ASIC (application-specific integrated circuit) or other specialized circuit. Modules can refer to portions of the computer or game program and/or the processor/special circuitry that implements that functionality.

Processors suitable for the execution of a computer program include, by way of example, special purpose microprocessors, and any one or more processors of any kind of digital computer or game console. Generally, a processor receives instructions and data from a read-only memory or a random access memory or both. The essential elements of a computer or game console are a processor for executing instructions and one or more memory devices for storing instructions and data. Generally, a computer or game console also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer or game console having a display device, e.g., a CRT (cathode ray tube) or LCD (liquid crystal display) monitor, a television, or an integrated display, e.g., the display of a PSP® or Nintendo DS. The display can in some instances also be an input device such as a touch screen. Other typical inputs include a camera-based system as described herein, simulated instruments, microphones, or game controllers. Alternatively input can be provided by a keyboard and a pointing device, e.g., a mouse or a trackball, by which the user can provide input to the computer or game console. Other kinds of devices can be used to provide for interaction with a user as well; for example, feedback provided to the user can be any form of sensory feedback, e.g., visual feedback, or auditory feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer or game console having a graphical user interface through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing/gaming system can include clients and servers or hosts. A client and server (or host) are generally remote from each other and typically interact through a communication network. The relationship of client and server arises by virtue of computer programs running on the respective computers and having a client-server relationship to each other.

The invention has been described in terms of particular embodiments. The alternatives described herein are examples for illustration only and not to limit the alternatives in any way. The steps of the invention can be performed in a different order and still achieve desirable results.

What is claimed:

1. A method, executed on at least one processor, for scoring a player performance comprising one or more poses in a dance-based video game based on input received via a sensor, the method comprising:
   receiving, by the at least one processor, a performance 3D skeleton indicating a pose of the player;
   calculating, using the at least one processor, a score by comparing a position, a timing, or both, associated with one or more joints of the performance 3D skeleton to a position, a timing, or both, associated with one or more joints of a target pose; and
   altering, using the at least one processor, one or more characteristics of the dance-based video game based on the score.

2. The method of claim 1 further comprising generating, using the at least one processor, the target pose based on motion capture data.

3. The method of claim 1 wherein the position associated with the one or more joints of the 3D skeleton and the position associated with the one or more joints of the target pose are based on a normalization of the spatial position of the one or more joints of the 3D skeleton and the one or more joints of the target pose, respectively.

4. The method of claim 3 wherein the normalizing the spatial position of a joint comprises computing a unit vector reflecting an offset of the joint relative to an origin joint.

5. The method of claim 4 wherein the normalizing the spatial position of the joint comprises:
   defining a coordinate system originated at the origin joint; and
   translating the unit vector into the coordinate system.

6. The method of claim 5 wherein the origin joint is one of left shoulder, right shoulder, left hip, or right hip.

7. The method of claim 3 wherein the normalizing the spatial position of a joint comprises:
   computing, using the at least one processor, a first vector reflecting the offset of the joint relative to an origin joint;
   computing, using the at least one processor, a second vector reflecting the offset of an intermediate joint relative to the origin joint;
   computing, using the at least one processor, a third vector reflecting the offset of the joint relative to the intermediate joint; and
   dividing, using the at least one processor, the first vector by the sum of the magnitudes of the second and third unit vectors.

8. A method, executed on at least one processor, for evaluating a player performance based on input received via a sensor, the method comprising:
   receiving, by the at least one processor, a performance 3D skeleton indicating a portion of the player performance;
   providing, by the at least one processor, a target 3D skeleton indicating a portion of a target performance;
   defining, using the at least one processor, a per joint error function;
   calculating, using the at least one processor, an error using the per joint error function based on the performance 3D skeleton and the target 3D skeleton; and
   producing, using the at least one processor, an audio or visual indication of the error.

9. A method, executed on at least one processor, for scoring a player performance comprising one or more poses in a dance-based video game based on input received via a sensor, the method comprising:
   providing, by the at least one processor, a target 3D skeleton indicating a target pose;
   receiving, by the at least one processor, a plurality of 3D performance skeletons indicating player poses;
   generating, using the at least one processor, an overall score for a particular 3D performance skeleton by comparing a position associated with one or more joints of the 3D performance skeleton to a corresponding position associated with one or more joints of the target 3D skeleton;
   repeating, using the at least one processor, the score generating step for each of the plurality of 3D performance skeletons that fall within a predetermined temporal range to generate a plurality of overall scores; and
   producing, on a display in communication with the at least one processor, an audio or visual indication based on one or more of the plurality of overall scores.

10. The method of claim 9 further comprising:
    providing, by the at least one processor, a second target 3D skeleton indicating a second target pose;
    receiving, by the at least one processor, a second plurality of 3D performance skeletons indicating player poses;
    generating, using the at least one processor, an overall score for a second particular 3D performance skeleton by comparing a position associated with one or more joints of the second 3D performance skeleton to a corresponding one or more joints of the second target 3D skeleton;
    repeating, using the at least one processor, the score generating step for each of the second plurality of 3D performance skeletons that fall within a second predetermined temporal range to generate a second plurality of overall scores; and
    producing, on the display in communication with the at least one processor, a second audio or visual indication based on one or more of the first and second plurality of overall scores.

11. The method of claim 9 wherein the overall score comprises a positional score and a timing-based score.

12. The method of claim 11 wherein the target pose is associated with a target performance timing, and the timing-based score varies inversely as the difference between the target performance timing and a timing of performance of the player pose.

13. The method of claim 11 wherein the timing-based score is a first constant if the difference is less than a first predetermined threshold, varies inversely as the difference if the difference is between the first predetermined threshold and a second predetermined threshold, and is a second constant if the difference is greater than the second predetermined threshold.

14. The method of claim 11 wherein the positional score comprises one or more per joint scores.

15. The method of claim 14 wherein the contribution of each per-joint score to the overall score is weighted.

16. The method of claim 11 wherein the positional score comprises one or more body part scores, each body part score comprising one or more per-joint scores.

17. The method of claim 16 wherein the contribution of each body part score to the overall score is weighted.

18. The method of claim 9 wherein the overall score comprises a displacement score.

19. The method of claim 9 wherein the overall score comprises a velocity score.

20. The method of claim 9 wherein the overall score comprises an acceleration score.

21. The method of claim 9 wherein the comparing step comprises calculating, using the at least one processor, a Euclidean distance between the position associated with the one or more joints of the 3D performance skeleton and the corresponding position associated with the one or more joints of the target 3D skeleton to generate a per-joint score.

22. The method of claim 21 wherein the per-joint score vanes inversely as the Euclidean distance.

23. The method of claim 21 wherein the per-joint score is a first constant if the Euclidean distance is less than a first predetermined threshold, varies inversely as the Euclidean distance if the Euclidean distance is between the first predetermined threshold and a second predetermined threshold, and is a second constant if the Euclidean distance is greater than the second predetermined threshold.

24. The method of claim 21 wherein calculating, using the at least one processor, the Euclidean distance comprises weighting the contributions of the x, y, and z axes to the Euclidean distance.

25. The method of claim 24 wherein the orientations of the x, y, and z axes are relative to each body zone.

26. The method of claim 25 wherein the x, y, and z axes of an arm body zone originate at a shoulder connected to the arm and are based on a first vector from the shoulder to an opposite shoulder, a second vector in the direction of gravity, and a third vector that is a cross product of the first and second vectors.

27. The method of claim 25 wherein the x, y, and z axes of a leg body zone originate at a hip connected to the leg and are based on a first vector from the hip to an opposite hip, a second vector in the direction of gravity, and a third vector that is a cross product of the first and second vectors.

28. The method of claim 24 wherein the orientations of the x, y, and z axes are relative to the target 3D skeleton.

29. The method of claim 28 wherein the x, y, and z axes are rotated based on an angle between a vector normal to a plane of the target 3D skeleton and a vector normal to a view plane.

30. The method of claim 9 wherein the audio or visual indication comprises a visual indication of a body part score.

31. The method of claim 9 wherein the audio or visual indication comprises an audible indication of a body part score.

32. The method of claim 9 wherein the audio or visual indication comprises one more graphics, the number of graphics based on the one or more overall scores.

33. The method of claim 9 wherein the audio or visual indication comprises a simulated crowd and one or more characteristics of the simulated crowd varies based on the one or more of the plurality of overall scores.

34. The method of claim 33 wherein the one or more characteristics of the simulated crowd comprises the number of people in the crowd.

35. The method of claim 9 wherein the audio or visual indication comprises a simulated environment and one or more characteristics of the simulated environment varies based on the one or more of the plurality of overall scores.

36. The method of claim 9 wherein the target pose is selected based on its importance to the target performance.

37. A method, executed on at least one processor, for scoring a player performance comprising one or more poses in a dance-based video game based on input received via a sensor, the method comprising:
receiving, by the at least one processor, a performance 3D skeleton indicating a pose of the player;
calculating, using the at least one processor, a score by comparing a measurement of one or more reference points of the performance 3D skeleton to a measurement of one or more reference points of a target pose; and
altering, using the at least one processor, one or more characteristics of the dance-based video game based on the score.

38. The method of claim 37 wherein the measurement is a displacement.

39. The method of claim 37 wherein the measurement is a velocity.

40. The method of claim 37 wherein the measurement is an acceleration.

41. The method of claim 37 wherein the one or more reference points are one or more joints.

42. The method of claim 37 wherein the one or more reference points are one or more bones.

43. The method of claim 37 wherein the one or more reference points are derived from one or more joints.

44. The method of claim 37 wherein the one or more reference points are derived from one or more bones.

45. A computer program product, tangibly embodied in a non-transitory computer readable storage medium, for scoring a player performance comprising one or more poses in a dance-based video game based on input received via a sensor, the computer program product including instructions being operable to cause a data processing apparatus to:
receive a performance 3D skeleton indicating a pose of the player;
calculate a score by comparing a position, a timing, or both, associated with one or more joints of the performance 3D skeleton to a position, a timing, or both, associated with one or more joints of a target pose; and
alter one or more characteristics of the dance-based video game based on the score.

46. A computer program product, tangibly embodied in a non-transitory computer readable storage medium, for evaluating a player performance based on input received via a sensor, the computer program product including instructions being operable to cause a data processing apparatus to:
receive a performance 3D skeleton indicating a portion of the player performance;
provide a target 3D skeleton indicating a portion of a target performance;
define a per joint error function;
calculate an error using the per joint error function based on the performance 3D skeleton and the target 3D skeleton; and
produce, with the game platform, an audio or visual indication of the error.

47. A computer program product, tangibly embodied in a non-transitory computer readable storage medium, for scoring a player performance comprising one or more poses in a dance-based video game based on input received via a sensor, the computer program product including instructions being operable to cause a data processing apparatus to:
provide a target 3D skeleton indicating a target pose;
receive a plurality of 3D performance skeletons indicating player poses;
generate an overall score for a particular 3D performance skeleton by comparing a position associated with one or more joints of the 3D performance skeleton to a corresponding position associated with one or more joints of the target 3D skeleton;
repeat the score generating step for each of the plurality of 3D performance skeletons that fall within a predetermined temporal range to generate a plurality of overall scores; and produce, on a display in communication with the game platform, an audio or visual indication based on one or more of the plurality of overall scores.

48. A computer program product, tangibly embodied in a non-transitory computer readable storage medium, for scoring a player performance comprising one or more poses in a dance-based video game based on input received via a sensor, the computer program product including instructions being operable to cause a data processing apparatus to:
  receive a performance 3D skeleton indicating a pose of the player;
  calculate a score by comparing a measurement of one or more reference points of the performance 3D skeleton to a measurement of one or more reference points of a target pose; and
  alter one or more characteristics of the dance-based video game based on the score.

49. A system for scoring a player performance comprising one or more poses in a dance-based video game, comprising:
  a sensor to receive an input; and
  a game platform configured to:
    receive a performance 3D skeleton indicating a pose of the player;
    calculate a score by comparing a position, a timing, or both, associated with one or more joints of the performance 3D skeleton to a position, a timing, or both, associated with one or more joints of a target pose; and
    alter one or more characteristics of the dance-based video game based on the score.

50. A system for evaluating a player performance, the system comprising:
  a sensor to receive an input; and
  a game platform configured to:
    receive a performance 3D skeleton indicating a portion of the player performance;
    provide a target 3D skeleton indicating a portion of a target performance;
    define a per joint error function;
    calculate an error using the per joint error function based on the performance 3D skeleton and the target 3D skeleton; and
    produce an audio or visual indication of the error.

51. A system for scoring a player performance comprising one or more poses, the system comprising:
  a display;
  a sensor to receive an input; and
  a game platform configured to:
    provide a target 3D skeleton indicating a target pose;
    receive a plurality of 3D performance skeletons indicating player poses;
    generate an overall score for a particular 3D performance skeleton by comparing a position associated with one or more joints of the 3D performance skeleton to a corresponding position associated with one or more joints of the target 3D skeleton;
    repeat the score generating step for each of the plurality of 3D performance skeletons that fall within a predetermined temporal range to generate a plurality of overall scores; and
    produce, on the display, an audio or visual indication based on one or more of the plurality of overall scores.

52. A system for scoring a player performance comprising one or more poses in a dance-based video game, the system comprising:
  a sensor to receive an input; and
  a-game platform configured to:
    receive a performance 3D skeleton indicating a pose of the player;
    calculate a score by comparing a measurement of one or more reference points of the performance 3D skeleton to a measurement of one or more reference points of a target pose; and
    alter one or more characteristics of the dance-based video game based on the score.

* * * * *

UNITED STATES PATENT AND TRADEMARK OFFICE
CERTIFICATE OF CORRECTION

Page 1 of 1

PATENT NO.        : 8,702,485 B2
APPLICATION NO.   : 12/940794
DATED             : April 22, 2014
INVENTOR(S)       : Marc A. Flury et al.

It is certified that error appears in the above-identified patent and that said Letters Patent is hereby corrected as shown below:

In the Claims

Col. 33, lines 47-50 in claim 32, please correct the claim to read as follows:

32. The method of claim 9 wherein the audio or visual indication comprises one or more graphics, the number of graphics based on the one or more overall scores.

Signed and Sealed this
First Day of July, 2014

Michelle K. Lee
*Deputy Director of the United States Patent and Trademark Office*